United States Patent [19]
Durley et al.

[11] Patent Number: 5,281,949
[45] Date of Patent: Jan. 25, 1994

[54] VEHICULAR SAFETY SENSOR AND WARNING SYSTEM

[75] Inventors: Clarence W. Durley, Bellville; Jerry A. Robson, Mansfield, both of Ohio

[73] Assignee: C.A.R.E., Inc., Mansfield, Ohio

[21] Appl. No.: 918,603

[22] Filed: Jul. 24, 1992

Related U.S. Application Data

[63] Continuation-in-part of Ser. No. 762,981, Sep. 20, 1991.

[51] Int. Cl.$^5$ .............................................. B60Q 1/26
[52] U.S. Cl. .................................... 340/433; 340/436; 340/901; 340/815.21; 340/384 R; 180/167; 180/271
[58] Field of Search ........ 340/433, 436, 435, 901–904, 340/552, 501, 958, 815.21, 384 R, 384 E; 180/167, 169, 271; 364/461

[56] References Cited

U.S. PATENT DOCUMENTS

| | | | |
|---|---|---|---|
| 3,360,775 | 12/1967 | Schroeder | 340/904 |
| 4,117,454 | 9/1978 | Fabry et al. | 340/433 |
| 4,240,152 | 12/1980 | Duncan et al. | 340/901 |
| 4,260,980 | 4/1981 | Bates . | |
| 4,300,116 | 11/1981 | Stahovec . | |
| 4,349,823 | 9/1982 | Tagami . | |
| 4,447,800 | 5/1984 | Kasuya | 340/904 |
| 4,482,889 | 11/1984 | Tsuda et al. | 340/514 |
| 4,549,181 | 10/1985 | Tachibana | 340/904 |
| 4,559,518 | 12/1985 | Latta, Jr. | 340/433 |
| 4,618,948 | 10/1986 | Sakakibara | 367/104 |
| 4,623,032 | 11/1986 | Kemmer | 180/169 |
| 4,797,673 | 1/1989 | Dombrowski | 340/904 |
| 4,822,157 | 4/1989 | Stout | 350/629 |
| 4,864,298 | 9/1989 | Dombrowski | 340/904 |

OTHER PUBLICATIONS

School Bus Fleet, "Introducing the Smart Sensor IV" Apr./May 1989.

*Primary Examiner*—Donnie L. Crosland
*Attorney, Agent, or Firm*—Lon H. Romanski

[57] ABSTRACT

A safety sensor and warning system, for use in combination with a motor vehicle, has sensors for determining if personnel are present in one or more predetermined danger zones proximate to the vehicle, during times when the vehicle is undergoing the loading and/or unloading of personnel; if the presence of such personnel is determined within any one or more of such danger zones related warning apparatus such as lamps and/or horn create a sensory warning signal whereby the driver of the vehicle is made aware of such presence by the personnel as well as warning the personnel within the danger zones and others beyond the danger zone of the presence of such personnel; Microwave Doppler Shift Radar detects objects by reacting to a reflected radio signal of controlled strength and frequency which shifts off its original frequency when reflected off of an object of adequate density moving into, or changing position, within the range of the radiated radio signal and its consequent reflection; the sensors for determining if personnel are present in one or more predetermined danger zones utilize this known Microwave Doppler Shift Radar Technology and are electronically and physically designed to detect objects of only predetermined density or mass which translates to an animate object, as a person, and to not detect small debris-type objects such as, for example, leaves, snowflakes, light rainfall, fog, blowing dust, small tree limbs, rocks and birds.

64 Claims, 14 Drawing Sheets

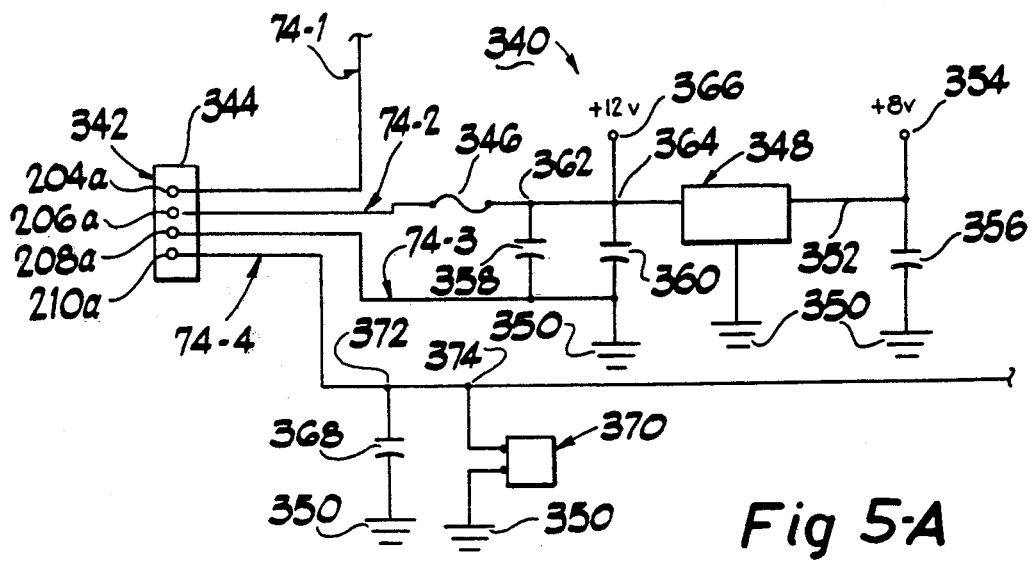
Fig 5-A
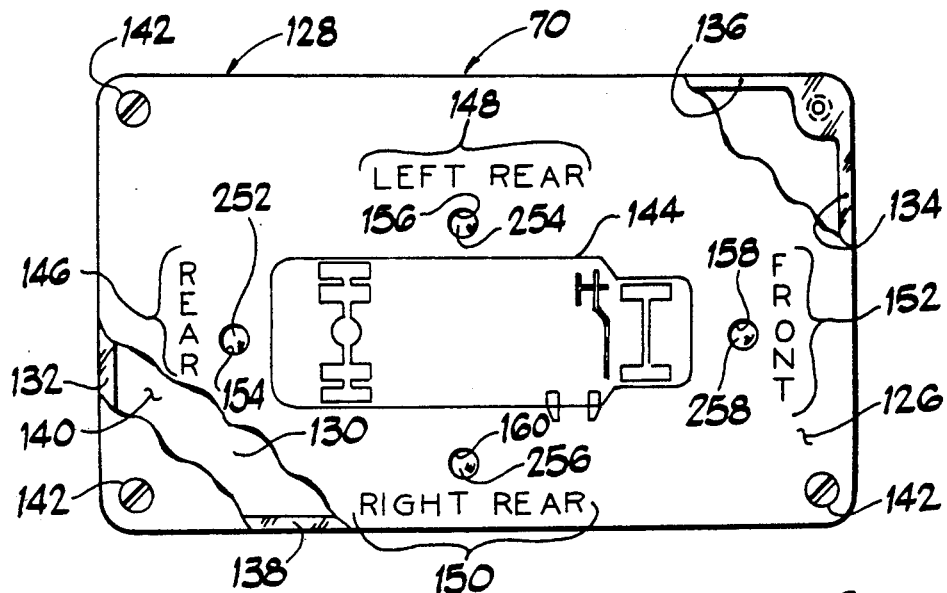
Fig 6
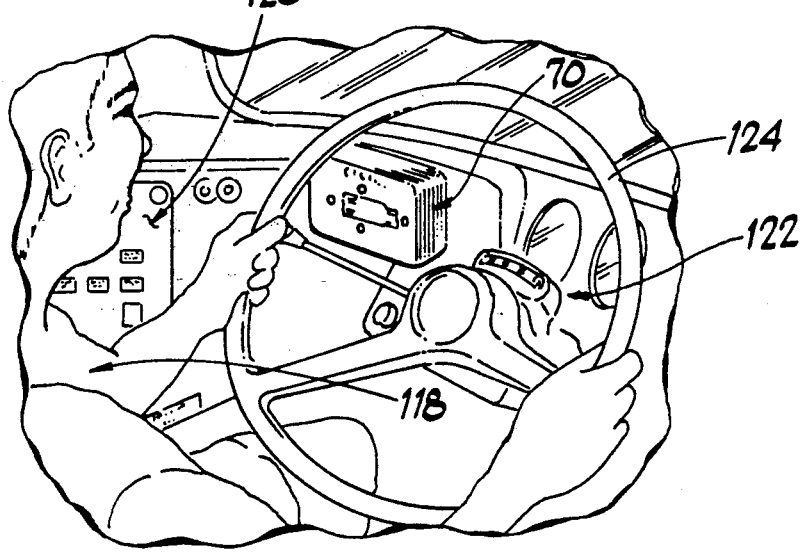
Fig 7

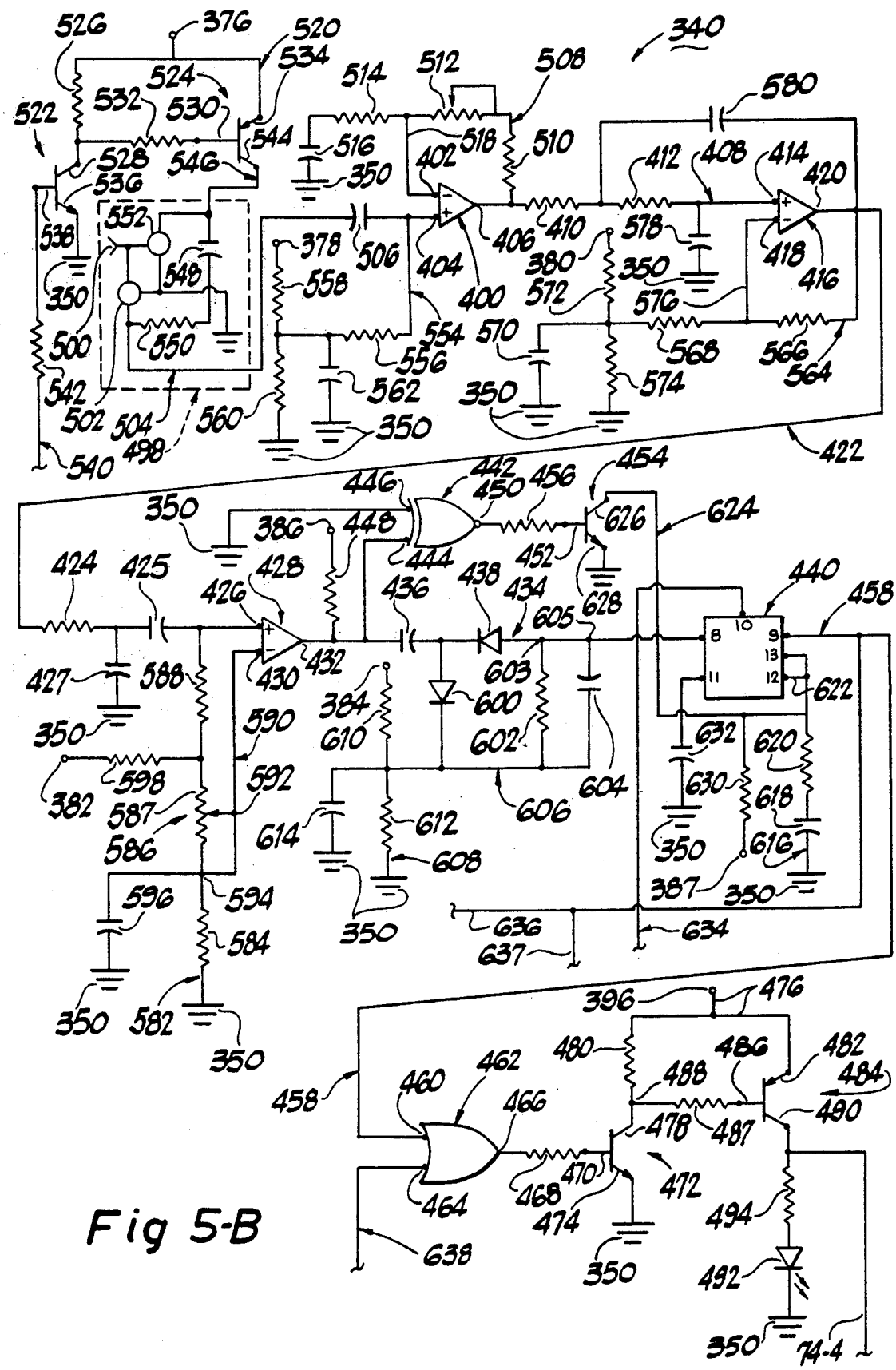
Fig 5-B

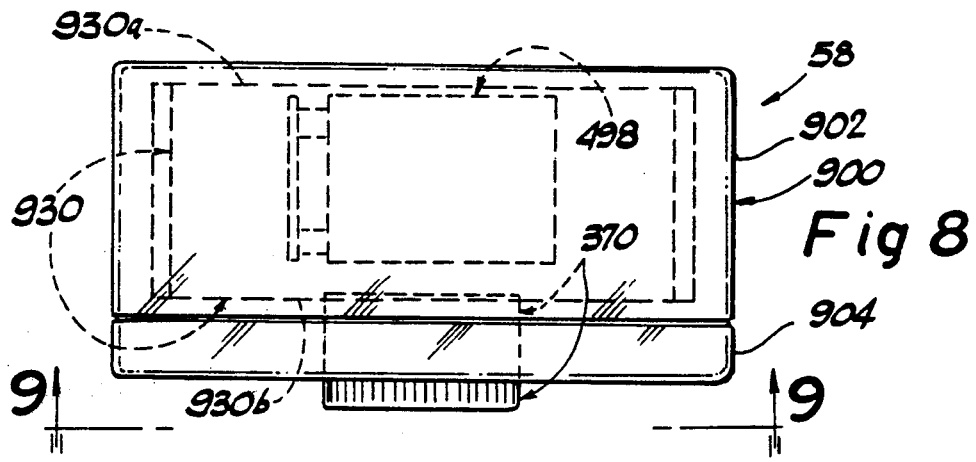
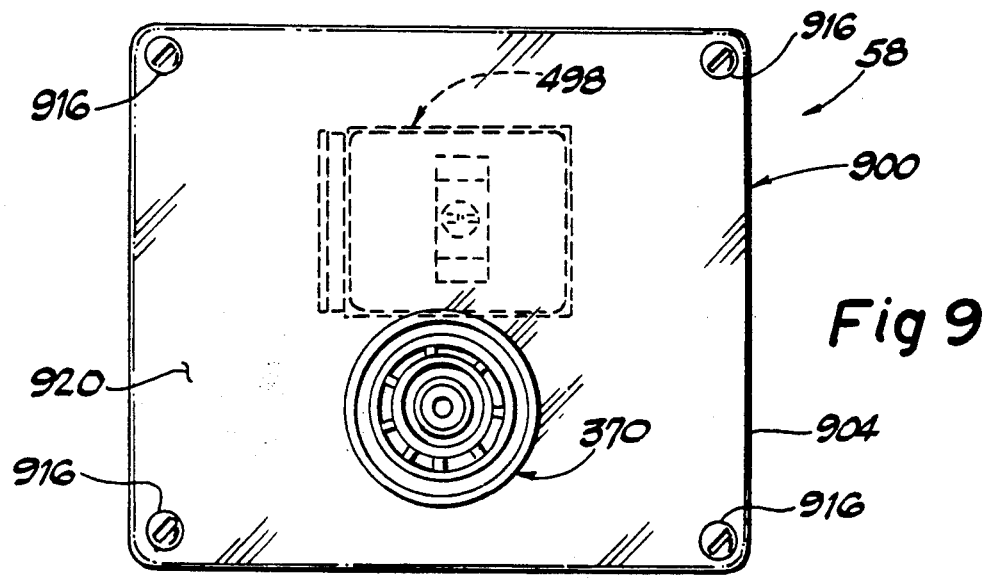
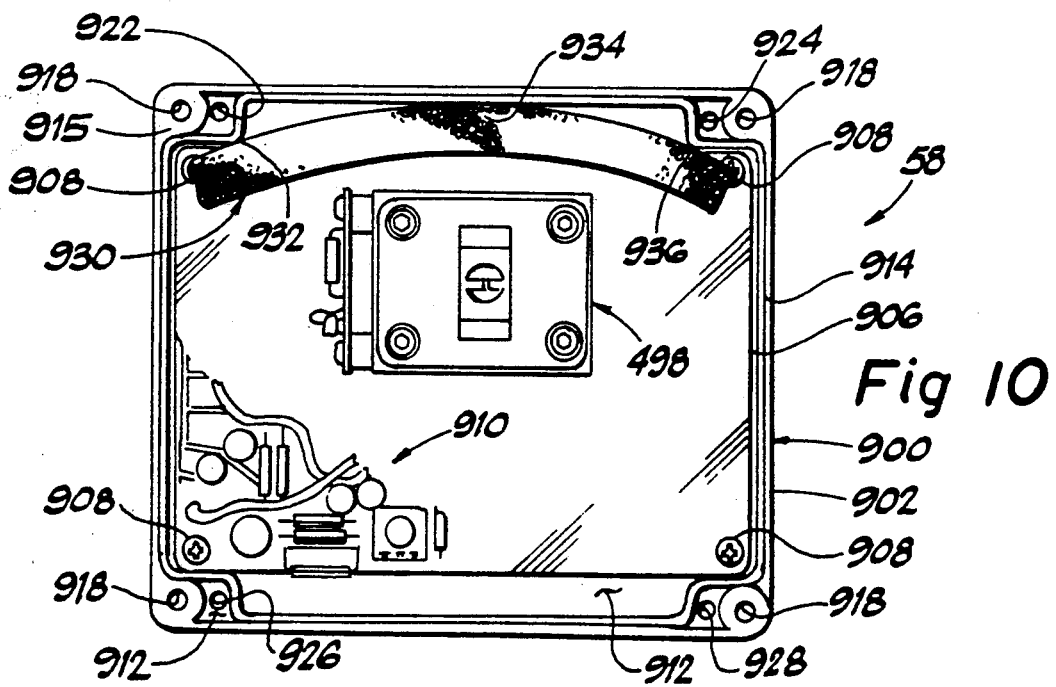

VEHICULAR SAFETY SENSOR AND WARNING SYSTEM

RELATED APPLICATION

This application is a continuation-in-part of our copending application Ser. No. 07/762,981 filed Sep. 20, 1991, for "Vehicular Safety Sensor and Warning System".

FIELD OF THE INVENTION

This invention relates generally to a vehicle which, for reasons of safety, requires that the operator or driver thereof be made aware of the presence of a person or persons within designated areas, outside of the vehicle and relative thereto, so that such driver, even though unable to see such person or persons, can take appropriate action to avoid injuring any such person or persons with the vehicle; and more particularly to apparatus employable in combination with such vehicle for detecting the presence of persons in locations hidden from view of the vehicle operator and, in turn, warning the operator of such presence, if any.

BACKGROUND OF THE INVENTION

School bus transportation of small children, especially, exposes such children to inherent hazards upon the loading and unloading of school children onto and from the school bus. A small child is of limited visibility to the bus driver and a child's state of development, at an early age, may result in that child's inattention and/or lack of understanding of safety considerations pertinent to school bus loading and unloading.

A number of children have been fatally injured when, after unloading from a school bus or before loading, the bus began movement and struck the exiting or entering child. Often such injuries or fatalities occur when, after leaving a danger zone, a child returns to that danger zone to pick up a dropped book, to return to a friend, to greet a pet, or the like.

The prior art has proposed various devices in an attempt to reduce the risk of having any child, loading or unloading, becoming injured due to the untimely movement of the bus. Some of such prior art devices have comprised specially configured and arranged mirrors and system of mirrors by which, it was hoped, the bus driver could see the area in front of the bus and the areas at and alongside the sides of the bus. Such mirrors and systems of mirrors must be in proper adjustment to each other and to each driver as may then be driving the bus. One of the biggest problems with such mirrors and mirror arrangements is that the bus driver must still change from one mirror, or mirror system, to another mirror or mirror system in order to view the danger zones alongside the bus and in front of the bus. This, in turn, means that after making sure that no person is in a particular danger zone, the driver then must switch to a different mirror or mirror system in order to determine whether a person is in a different danger zone and, while thusly switching to such different mirror or mirror system, a person may again, without the driver's knowledge, enter into the said particular danger zone which was previously visually determined by the driver to be free of any person being therein. Further, the usefullness of any mirror or mirror system becomes seriously impaired if not totally useless during weather conditions of fog, rain, freezing rain or icing and by having mud splashed onto the mirror viewing surfaces.

The prior art has also proposed the use of television cameras, carried by the bus, and a television receiver monitor. The concept of such an arrangement is that the television cameras are intended to put into view those children which are in a danger zone or area while the monitor is intended to show such camera-detected child to the bus driver. However, such prior art television systems are afflicted with many of the same problems as exist and hereinbefore discussed with regard to prior art mirrors and mirror systems. That is, just as when the driver changes (in his viewing) from one mirror to another, so too the driver with a television monitor has the same problem. That is, with monitor switched to a first television camera and then determining that no children are in the danger zone shown by such first television camera, the driver then switches the monitor to receive the picture from a second television camera. During the time of thusly switching the monitor from the first television camera to the second television camera a child, unbeknownst to the driver, may again enter the danger zone shown by the first television camera. Further, adverse weather conditions also serve to render the television cameras at least undependable if not effectively useless.

The prior art has also proposed the use of mechanical arms and/or gates, carried by the bus, and intended to be actuated and swung to and from positions extending from the bus as to hopefully physically prevent the children from being in or moving into danger zones about the bus. Ironically, such prior art mechanical arms and/or gates have themselves caused significant physical injuries to the children.

The prior art has also proposed the providing of a generally air-filled forwardly situated deflectable bumper on the school bus and a generally air-filled rearwardly situated deflectable bumper on the school bus. In this arrangement it is intended that if an unseen child is situated, for example, in an area immediately forwardly of the forwardly situated air-filled deflectable bumper and the bus starts to move forwardly striking the child the resulting impact is supposed to be sufficient to cause a deflection of the air-filled deflectable forward bumper which, in turn, produces a pneumatic signal, from the impacted bumper to related sensory means intended to thereupon apply the bus brakes regardless of the bus operating action then undertaken by the driver. Such a system is immediately suspect as being a safe and useful system in that it requires the unseen child to be impacted by the air-filled bumper. Such an impact may itself cause injury to such child. Further, the pliability or deflectability of such air-filled bumpers must become reduced as the ambient temperature decreases and as ice may form upon such bumpers with each of such conditions causing any impact as between such bumper and unseen child to be of greater traumatic significance to that child.

Further, proposals have been made to provide a monitor (person) on the school bus so that the function of the monitor would be to make sure the children are safely away from the bus before the bus driver could again place the bus into motion. Even though such a monitor program has shown a significant reduction in injuries to children, it has become evident that: (1) enough people cannot be found to serve as monitors on school buses and (2) providing monitors on all school buses is too costly.

Except for various mirrors and systems of mirrors, it appears that other prior art safety systems have not been widely adopted, especially for use in combination with a school bus; and as for the prior art mirrors and systems of mirrors, as previously described, such still fail to provide, to the driver, a totally reliable indication of the presence or absence of a person from every area considered to be a danger zone.

Accordingly, the invention as herein disclosed is primarily directed to the solution of the aforestated as well as other related and attendant problems of the prior art.

SUMMARY OF THE INVENTION

According to the invention a safety sensor and warning system, for use in combination with a motor vehicle used for the transport of personnel wherein said vehicle undergoes periods or spans of time for the loading and unloading of personnel onto and off from said vehicle, comprises radar transmitter and receiver means for sensing the presence of a person within a selected area proximate to said vehicle, and warning means for creating a sensory warning signal whenever the presence of a person in said area is sensed.

Various objects, advantages and aspects of the invention will become apparent when reference is made to the following detailed description considered in conjunction with the related drawings.

BRIEF DESCRIPTION OF THE DRAWINGS

In the drawings wherein for purposes of clarity certain details and/or elements may be omitted from one or more views:

FIG. 6 depicts, in elevation, alarm means employing teachings of the invention;

FIG. 7 illustrates the alarm means of FIG. 6 situated as within a bus and located therein for easy view by the bus driver;

FIG. 8 is a top plan view of one of the assemblies comprising K-band radar transceiver, associated circuitry and sensory warning apparatus;

FIG. 9 is a view taken generally on the plane of line 9—9 of FIG. 8 and looking in the direction of the arrows;

FIG. 10 is a view similar to that of FIG. 9 but with a frontal cover member removed;

DETAILED DESCRIPTION OF THE PREFERRED EMBODIMENT

Figure 1:
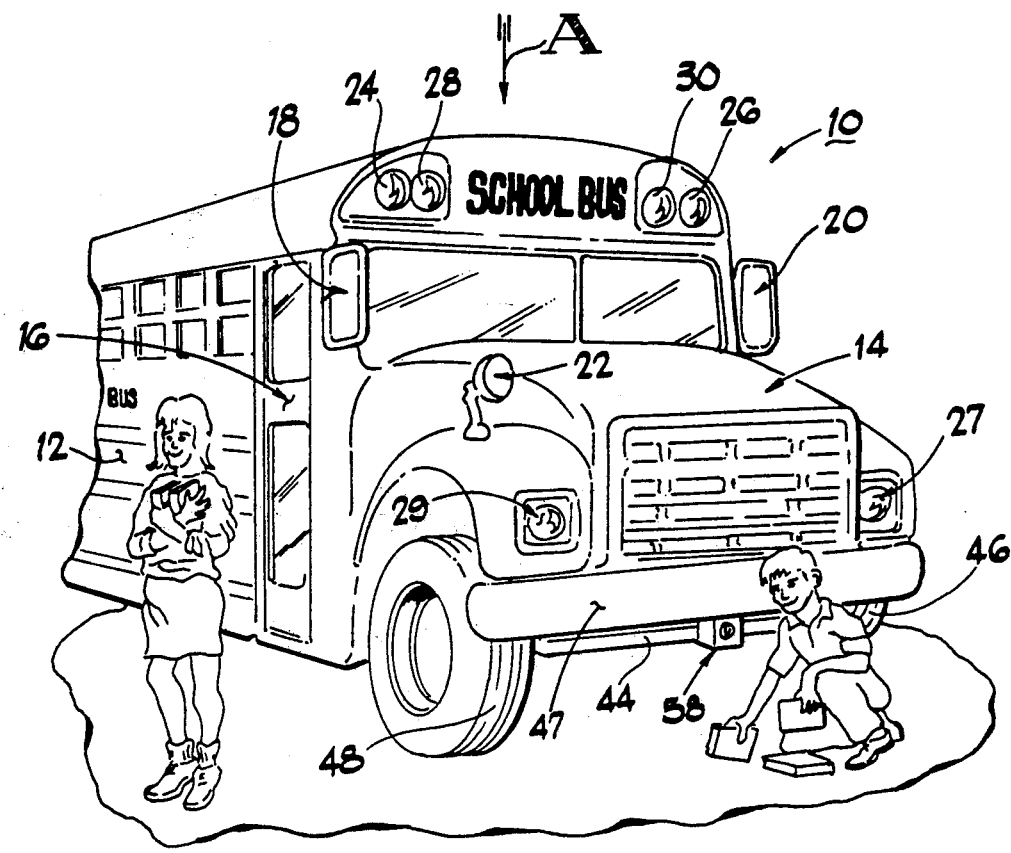
FIG. 1 is a fragmentary elevational perspective view of a school bus, employing teachings of the invention, with relatively small and young children being in close proximity to said bus.

Referring in greater detail to the drawings, FIG. 1 illustrates, fragmentarily, a school bus 10 which may be comprised of a main body portion 12, engine compartment housing 14, a door 16 controlled by the bus driver for permitting school children to enter and exit the main body portion 12. As is usually legally required, such school bus would have an additional emergency exit door (or doors), not shown. As generally well known in the art, the bus 10 may be provided with a plurality of viewing mirrors, some of which are depicted at 18, 20 and 22, for use by the bus driver. As shown in both FIGS. 1 and 2, the bus 10 is provided with indicator lamp assemblies 24 and 26, mounted as at a front or forward portion of the main body portion 12, which when energized preferably emit a red color light. Similarly, indicator lamp assemblies 28 and 30 may be mounted at such forward portion of main body 12 and, when energized, preferably emit a yellow color light.

Figure 2:
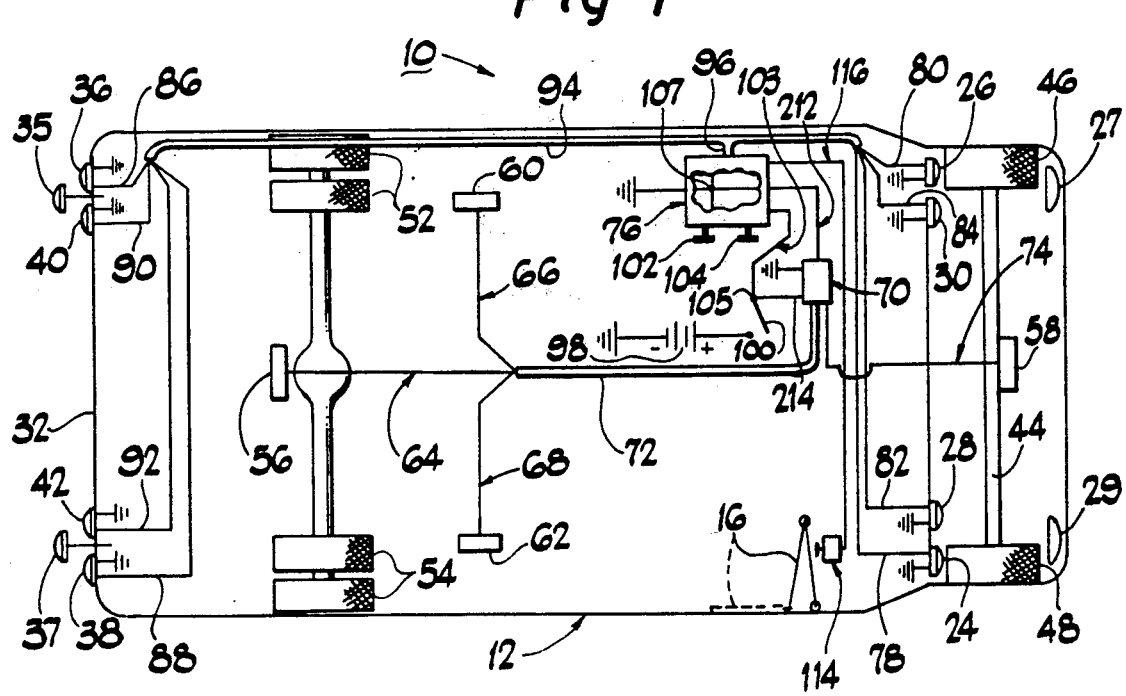
FIG. 2 is a simplified outline-like depiction of the bus, as would appear in a view taken generally in the direction of arrow A in FIG. 1, and with most of the structure removed in order to better illustrate some of the circuitry and sensor means, employing teachings of the invention, in combination with said bus.

As depicted in FIG. 2, additional indicator lamp assemblies are provided at the generally rearward end 32 of the bus 10. More particularly, and as depicted, generally outboard situated lamp assemblies 36 and 38, when energized, preferably emit a red color light while lamp assemblies 40 and 42 are situated generally inboard and, when energized, preferably emit a yellow color light.

Still with reference to FIG. 2, the bus 10 is shown comprising a forward or front axle assembly 44, carrying ground-engaging wheel assemblies 46 and 48, and a rearward or rear axle assembly 50 carrying ground-engaging double drive wheel assemblies 52 and 54. Radar units 56, 58, 60 and 62, positioned as generally depicted, are operatively carried by the bus 10. Electrical cable means 64, 66 and 68, each irrespectively comprising four electrical conductors, are all, at their respective one ends, electrically connected to circuitry as within an assembly 70. The respective other ends of cable means 64, 66 and 68, are therefore the other ends of the respective four electrical conductors respectively comprised by said cable means 64, 66 and 68, are electrically connected to radar generator and sensor or detector means 56, 60 and 62, irrespectively. If desired, electrical cable means 64, 66 and 68 may be bundled and commonly supported as by a suitable sheath-like structure 72. A fourth electrical cable means 74, similarly comprising four electrical conductors, is connected as to have respective one ends of each of such four electrical conductors electrically connected to the radar generator and sensor or detector means 58 and the respective opposite ends electrically connected to the circuitry as within assembly 70.

Figure 3:
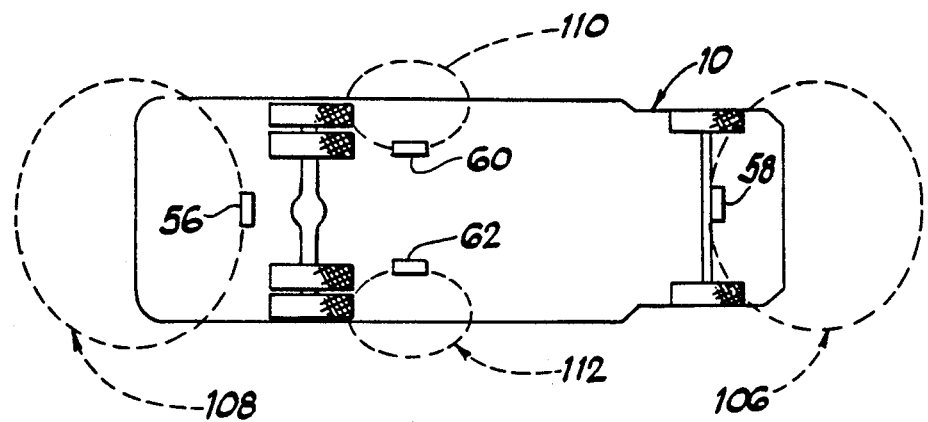
FIG. 3, is a view similar to FIG. 2 and illustrating locations of certain of the elements of FIG. 2 being employed in accordance with teachings of the invention and depicting respective areas monitored for the presence therein of persons.

FIG. 3 depicts, the microwave radar units 56, 60, 58 and 62 and the effective radiation fields respectively generated by such radar units. The effective field of radar unit 58 is illustrated by the dash-line 106 and such may be, for example, approximately 10.0 feet in length (measured as along the longitudinal axis of bus 10) and approximately 10.0 feet to either side of the longitudinal axis of bus 10. A similar field, of generally like or approximately like dimensions is illustrated by the dash-line 108 as being generated by radar unit 56. Radar units 60 and 62, preferably, produce comparatively smaller fields, respectively depicted by dash-lines 110 and 112, with the length of each (measured as generally normal to the longitudinal axis of bus 10) being approximately 3.0 feet, and the width of each (measured as generally parallel to the longitudinal axis of bus 10) being approximately 6.0 feet.

Radar units 56, 58, 60 and 62 each, comprise microwave generating means and detector or sensor means and, as such, respectively comprise microwave Doppler radar systems. Generally, as is well known in the art of radar, any motion within the field of the radar detector or sensor means and in the direction of the field (i.e., towards or away from the radar detector or sensor means) by an object which will reflect the radiation, results in a Doppler signal. The Doppler signal comes about from a frequency shift between the radiated microwaves and the reflected microwaves due to the differential of velocity between the radiator or generator means and the reflector (object) within the radiation field. The frequency of the Doppler signal is in direct proportion to the velocity of the reflecting object moving relative to the radiator in the direction of the field of radiation. The fields illustrated respectively by dash-lines 106, 108, 110 and 112 may be considered as depicting the effective radiation fields in that, in the preferred embodiment, in the areas beyond the bounds of such the intensity of the radiated energy, the intensity of the reflected energy and the gain of the associated internal amplifier means are insufficient to produce an effective signal indicative of motion.

Lamp assemblies 24, 26, 28, 30, 36, 38, 40 and 42 are, at times, made to be intermittently energized thereby creating a flashing-like light output. FIG. 2 depicts suitable flasher controller means 76; many forms of flasher controller means are known in the art and the practice of the invention is not limited to any particular embodiment of such controller means.

Electrical conductor means 78, 80, 82, 84, 86, 88, 90 and 92 serve to electrically connect lamp assemblies 24, 26, 28, 30, 36, 38, 40 and 42, respectively, to the controller means 76. Such conductor means may be bundled and supported as by suitable sheath-like means 94 and 96. Power to lamp assemblies 24, 26, 28, 30, 36, 38, 40 and 42 is provided by suitable vehicular electrical supply means, generally depicted at 98, with such electrical power flowing as through the then closed engine ignition switch means 100 (or electrical switch means opened and closed by the opening and closing of the ignition switch means), through terminal 105 and conductor 103, to internally of the controller means 76 and, intermittently, through the conductor means 78, 80, 82, 84, 86, 88, 90 and 92.

Still referring primarily to FIG. 2, a first manually operated, momentary, electrical switch means is depicted at 102 and a second manually operated electrical switch means is depicted at 104. In operation, the bus driver will actuate the momentary switch means 102 at some selected distance (for example, approximately 200.0 feet) ahead of where the bus driver intends to bring the bus 10 to a stop. Such actuation of switch means 102, in turn, causes activation of flasher controller means 76 resulting in the yellow light producing lamp assemblies 28 and 30 being alternately energized and de-energized creating a side-to-side yellow light flashing pattern, as well as also resulting in the yellow light producing lamp assemblies 40 and 42 being alternately energized and de-energized thereby also creating a side-to-side yellow light flashing pattern. In the event the bus driver, having actuated switch means 102, desires not to bring the bus 10 to a stop, the bus driver merely actuates switch means 104 causing deactivation of flasher controller means 76 and a resulting cessation of the side-to-side flashing of lamp assemblies 28 and 30, and 40 and 42. However, if the switch means 104 is not actuated and the stopping of the bus 10 continues, when the bus 10 is actually stopped the bus driver opens door 16 which upon opening, in turn, causes actuation of electrical switch means 114 which may comprise limit switch means. Actuation of switch means 114 causes a signal to be applied, via conductor means 116, to flasher controller means 76 which requires controller means 76 to cease the intermittent energization of yellow light lamp assemblies 28, 30, 40 and 42 and, instead, through conductor means 78, 80, 86 and 88 respectively energize the red light lamp assemblies 24, 269 36 and 38 in a flashing mode whereby the pairs of red light lamp assemblies are energized in a generally side-to-side flashing manner. Upon closure of bus door 16, switch means 114 again becomes actuated thereby supplying a signal, via conductor means 116, to flasher controller means 76 requiring the controller means 76 to cease such flashing of lamp assemblies 24, 26, 36 and 38 and to return to its quiescent state.

Heretofore, school buses, and possibly other vehicles, have been provided: with yellow and red lamp assemblies (as depicted by 28, 30, 40 and 42 and by 24, 26, 36 and 38); with flasher controller means (functionally equivalent to flasher controller means 76); with actuatable electrical switch means (as depicted by and functionally equivalent to 102 and 104) and with door opening and closing sensor or switch means (as depicted by and functionally equivalent to 114 and 116).

The assembly 70 may be considered as being an alarm means and/or indicator means and/or read-out means for use by the driver of the bus 10. That is, in the preferred embodiment of the invention, the assembly 70 is situated within the bus 10 as to be within the bus driver's view. FIG. 7 illustrates, in elevation, a fragmentary portion of the bus driver's operating location within the bus and such is depicted as comprising, to the left of the driver 118, a switch and/or control panel means 120 which, as a portion thereof, may comprise the flasher controller means 76. A portion of a vehicular instrument panel assembly is shown at 122 and the driver's steering wheel is shown at 124. The assembly 70 is shown operatively mounted as on or near the instrument panel 122 so as to be within the view of the bus driver. In the embodiment shown, assembly 70 is constructed as to be a separate unit which may be suitably secured to the vehicle, as already generally indicated, thereby enabling the easy retrofit thereof to school buses and the like.

FIG. 6 illustrates in elevation the preferred embodiment of the front wall, panel or display 126 of the assembly 70 of FIG. 7. As should be apparent, the assembly 70 of FIG. 6 is in enlarged scale compared to assembly 70 in FIG. 7. Assembly 70 may comprise a housing 128 comprising, for example, chamber means 130 defined as by oppositely situated spaced walls 132 and 134 and integrally formed oppositely situated spaced walls 136 and 138. Such walls 132, 134, 136 and 138 are shown as, in turn, being integrally formed with a back wall 140. The chamber means 130 is covered over as by front display panel or wall 126 which is depicted as being secured to the walls 132, 1349 136 and 138 as by screws 142 threadably engaged in such walls.

In the preferred embodiment of the display panel means 126 a simplified drawing, representation or indicia of a vehicle 144 (intended to represent the vehicle actually carrying assembly 70) is carried thereby as to present to the bus driver a visual sense of relative locations and relationships of elements comprising and/or carried by the vehicle, bus 10. Also, suitable indicia may be provided, as at 146, 148, 150 and 152 to visually affirm the relative positions of portions of the vehicle, bus 10. Further, apertures 154, 156, 158 and 160 may be formed through the display panel 126 to enable indicator lamps to be seen therethrough when energized. If desired, such apertures 154, 156, 158 and 160 may each be provided with a lens with which a respective one of the indicator lamps would be combined. However, the practice of the invention is not limited to either the use or non-use of such lenses and the disclosure herein, for purposes of simplicity and clarity, does not specifically depict the use of such lenses.

Figure 4:
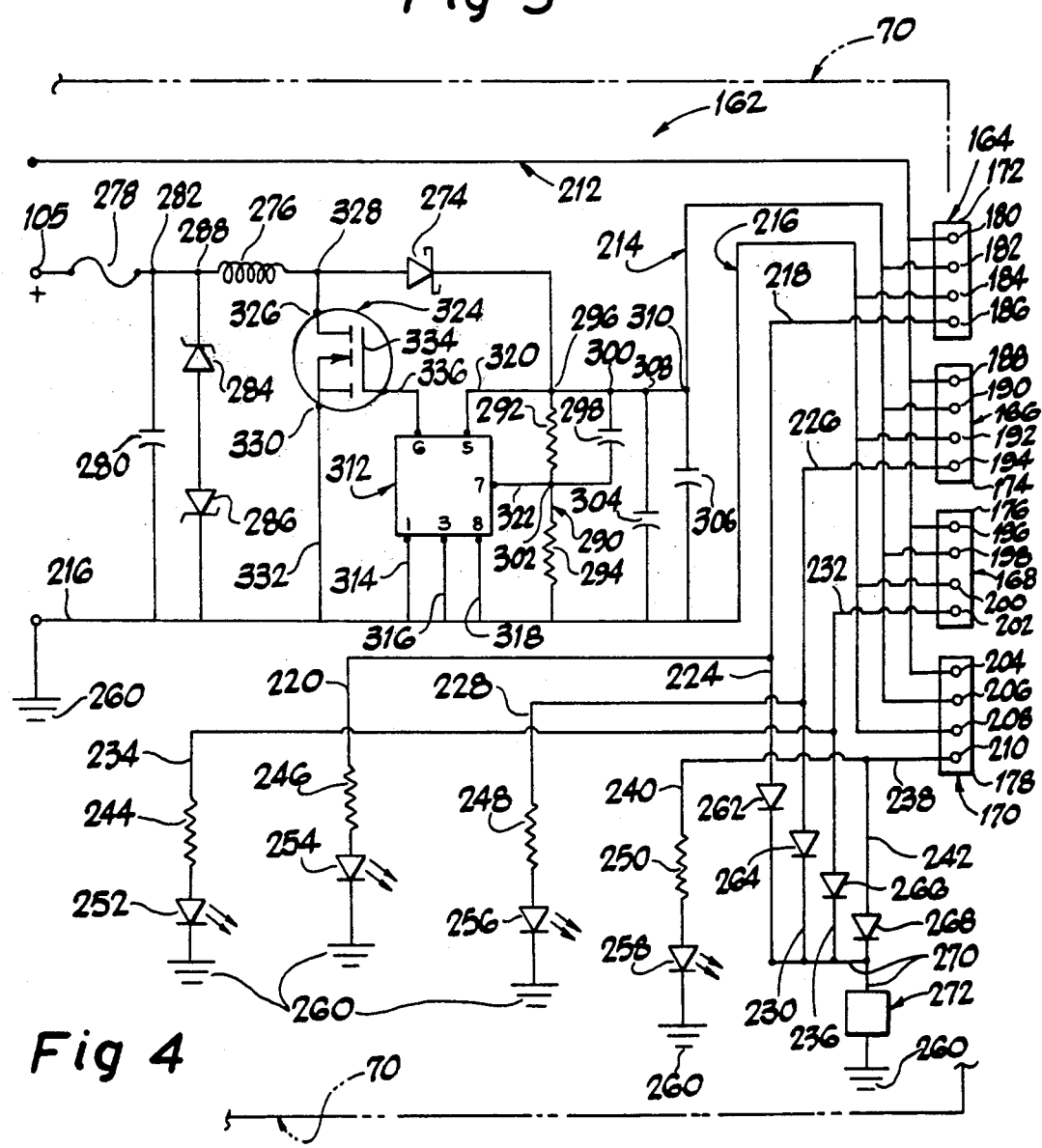
FIG. 4 is an electrical circuit diagram of components comprising one of the elements depicted in FIG. 2.

FIG. 4 illustrates electrical circuit means which may be considered as generally being contained by the housing means 128 (FIG. 6) and comprising the assembly 70 (FIGS. 2 and 6). In FIG. 4, the circuitry 162 is depicted as comprising a plurality of electrical terminal assemblies 164, 166, 168 and 170 which, in turn, may be respectively comprised of dielectric body-like means or holders 172, 174) 176 and 178 which, as generally depicted, may carry a plurality of electrical terminal members; that is: dielectric body means 172 may carry electrical terminal members 180, 182, 184 and 186; dielectric body means 174 may carry electrical terminal members 188, 1902 192 and 194; dielectric body means 176 may carry electrical terminal members 196, 1983 200 and 202; and dielectric body means 178 may carry electrical terminal means 204, 206, 208 and 210. The electrical terminal assemblies 164, 166, 168 and 170 may, for example, be situated within the housing 128 (FIG. 6) for subsequent connection to other cooperating electrical circuit means or be carried as by wall 152 in a manner permitting cooperating electrical terminal assemblies, of such other cooperating electrical circuit means, to be operatively electrically connected thereto.

A first conductor means 212 is electrically connected, by respective branch conductors, to terminal members 180, 188, 196 and 204. Second conductor means 214 is also electrically connected, by respective branch conductors, to terminal members 182, 190, 198 and 206. Similarly, a third conductor means 216 is also electrically connected, by respective branch conductors, to terminal members 184, 192, 200 and 208. Also, as shown, fourth conductor means 218, operatively electrically connected to terminal member 186, is electrically connected to branch electrical conductors 220 and 224. Fifth conductor means 226, operatively electrically connected to terminal member 194, is electrically connected to branch electrical conductors 228 and 230. Sixth conductor means 232, operatively electrically connected to terminal member 202, is electrically connected to branch electrical conductors 234 and 236. Seventh conductor means 238, operatively electrically connected to terminal member 210, is electrically connected to branch electrical conductors 240 and 242.

As generally depicted, conductor means 234, 220, 228 and 240 respectively comprise resistance means 244, 246) 248 and 250 along with light-emitting diode (LED) means 252, 2547 256 and 258, respectively in series with such resistance means, and electrically connected to ground as at 260—260.

Conductor means 224, 2307 236 and 242 are depicted as respectively comprising diode means 262, 264, 266 and 268 and which may be electrically connected as via conductor means 270 to output signal generating means 272, also shown brought to ground 260.

Conductor means 214 is depicted as also comprising serially situated Schottky diode means 274, induction means 276 and fuse means 278 with all of such being electrically connected to a suitable source of electrical energy which, as shown, may comprise the electrical terminal means 105 (also see FIG. 2) so that, preferably electrical current is made available and applied to conductor means 214 upon closure of engine ignition switch means 100, or other switch means controlled thereby.

A first filter capacitor means 280 is electrically connected across conductor means 216 and 214 as to have its one "electrical side connected to conductor 214 as at a point 282 electrically between fuse means 278 and inductor means 276, and, back-to-back, zener diodes 284 and 286, for transient overvoltage protection, are connected to conductor means 214 as at a point 288 electrically between fuse means 278 and inductor means 276.

A conductor means 290, comprising series resistor means 292 and 294 is electrically placed across conductor means 214 and 216 as to be electrically connected to conductor means 214 as at a point 296 electrically between Schottky diode means 274 and the branch conductors leading to terminal assemblies 164, 166, 168 and 170. A capacitor means 298 has its one electrical side connected to conductor means 214, as at 300, and its other electrical side connected to conductor means 290 as at a point 302 generally electrically between resistance means 292 and 294. Additional capacitor means 304 and 306, in parallel, are each electrically across conductor means 214 and 216 as to have their respective one electrical sides electrically connected to conductor means 214 as at points 308 and 310. A solid state integrated circuit chip (I.C.) 312 has its terminals: "1", "3" and "8" electrically connected, as via conductor means 314, 316 and 318, to ground as through conductor means 216. Terminals "5" and "7" of chip 312 are respectively electrically connected to conductor means 214, as at 296 via conductor means 320, and conductor means 290 as at 302, via conductor means 322.

A field-effect transistor 324 is shown having its drain terminal 326 electrically connected to conductor means 214 as at 328 electrically between inductor means 276 and Schottky diode 274. The source terminal 330, of field-effect transistor 324, is connected to ground as via conductor means 332 and 216, while the gate 334, of field-effect transistor 324, is connected, via conductor means 336, to terminal "6" of I.C. chip 312.

The I.C. chip 312 may be a commercially available step-up switching regulator as that identified as model MAX641 produced and sold by Maxim Integrated Products, Inc., having an address of 120 San Gabriel Drive, Sunnyvale, Calif., and disclosed as on page 65 of the catalog entitled "MAXIM 1986 Power Supply Circuits" bearing a United States of America copyright notice, of said Maxim Integrated Products, Inc., dated 1986.

Generally, the purpose of the I.C. chip 312, and associated components, is to provide and maintain, on conductor means 214, a preselected magnitude of voltage, which in the disclosed preferred embodiment is (+) 12.0 volts, even if the magnitude of the voltage at point or terminal 105 should become less than (+) 12.0 volts. That is, the I. C. chip 312 functions, via gate 334, to turn "on" (become conductive) and turn "off" (become nonconductive) transistor means 324 at, in the preferred embodiment, a frequency of approximately 50.0 Khz. Each time that transistor 324 is thusly turned "on", inductor means 276 is electrically charged to a high current level thereby storing energy in its magnetic field. When the transistor 324 is next turned "off", the stored energy (in the magnetic field of inductor means 276) is transferred, via Schottky diode 274, to storage capacitor means 306. Capacitor means 304 serves as a high frequency bypass while resistor means 292 and 294 along with capacitor means 298 are components selected to provide the desired output of I.C. 312, with resistors 292 and 294 comprising a voltage divider feedback to I.C. 312.

As is apparent in FIG. 4, the output voltage of conductor means 214 is applied to each of terminals 182, 190, 198 and 206 of terminal assemblies 164, 166, 168 and 170, respectively, and, as will become even more apparent, through such terminals 182, 190, 198 and 206 to the respective radar units. As should also be apparent, conductor means 216, through its branch conductors, serves to bring each of terminals 184, 192, 200 and 208 to electrical ground.

Conductor means 212, upon energization of the red light lamp means 24, 26, 36 and 38, as previously generally described, supplies a relatively "high" positive (+) voltage, through its branch conductors, to each of terminals 180, 188, 196 and 204.

As already indicated, the circuitry 162 of FIG. 4 may be considered as being within housing 128 and comprising assembly 70. Further, LEDs 252, 254, 256 and 258 are situated as to be seen, as upon energization, in or through apertures 154, 156, 160 and 158, respectively (also see FIG. 6).

Conductor means 218 (and its branches 220 and 224), conductor means 226 (and its branches 228 and 230), conductor means 232 (and its branches 234 and 236) and conductor means 238 (and its branches 240 and 242) may be considered as being, in effect, "return" electrical conductors from the respective radar assemblies 56, 60, 62 and 58. If it is now assumed that whenever one (or more) of the radar units senses the presence of an object within zones 108, 110, 112 and/or 106 (FIG. 3), an output is produced and applied to either terminal 186, 194, 202 and/or 210, such output will be conducted along the corresponding conductor means and branch conductors. For example, if such an electrical output is applied to terminal 186, the electrical output will be conducted via conductors 218 and 220, through limiting resistor 246, LED 254 and to ground 260; also, the electrical output will be conducted from conductor 218 and via conductor 224 through isolation diode 262, conductor means 270, alarm means 272 (causing energization thereof) and to ground 260. Such may be considered as typical of: (a) terminal 194, conductor means 226, 228, 230 and 270 along with resistance 248, LED 256, diode 264 and alarm 272; (b) terminal 202, conductor means 232, 234, 236 and 270 along with resistance 244, LED 252, diode 266 and alarm 272; and (c) terminal 210, conductor means 238, 240, 242 and 270 along with resistance 250, LED 258, diode 268 and alarm 272.

As should now be apparent, in the preferred embodiment, whenever any of the signal lights or LEDs 252, 254, 256 and/or 258 are energized, the alarm means 272 is also energized.

Figure 5C:
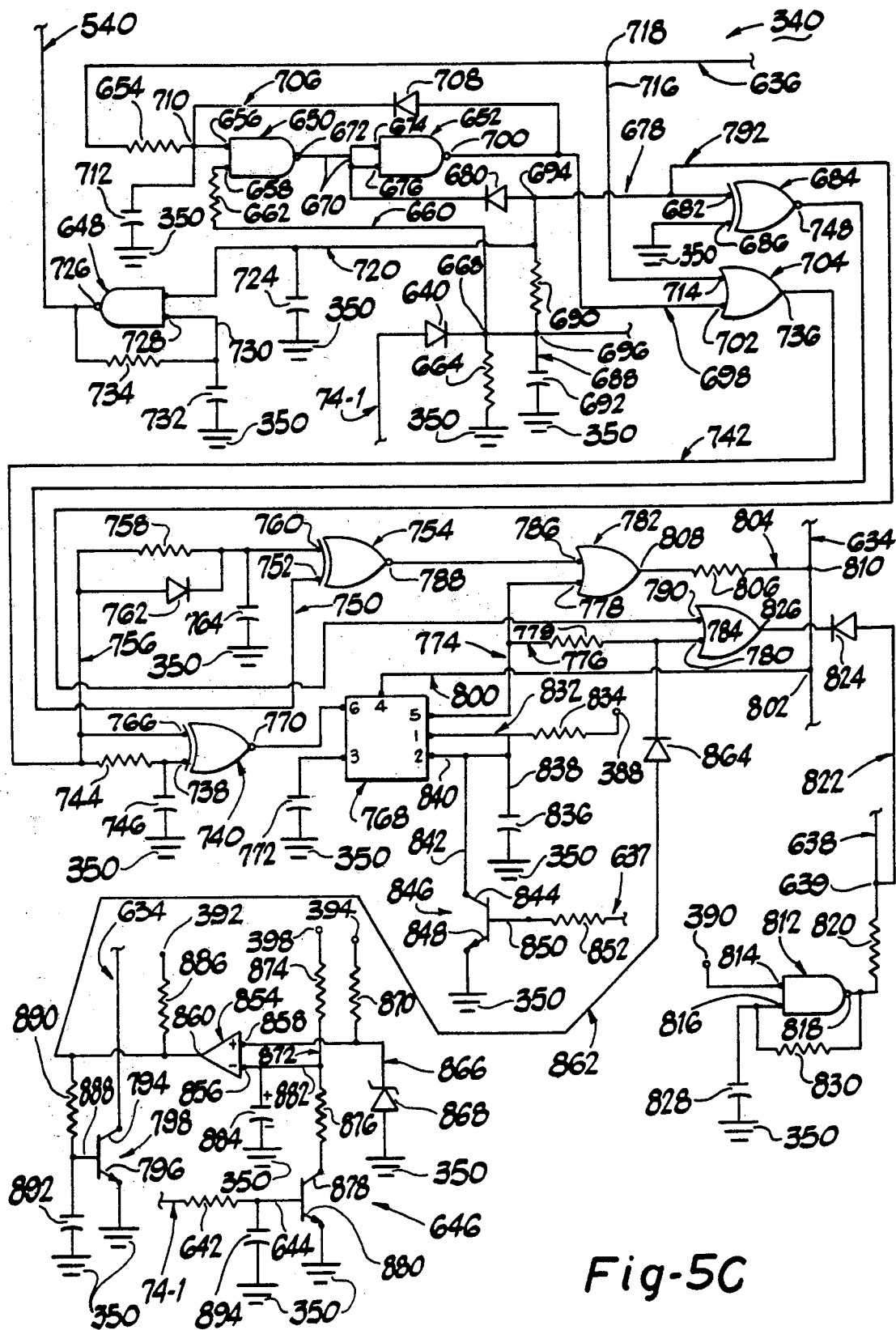
FIGS. 5-A, 5-B and 5-C schematically illustrate respective portions of an electrical circuit employing teachings of the invention.

FIGS. 5-A, 5-B and 5-C, collectively, illustrate electrical circuitry 340 employable as comprising, typically, radar units or assemblies 56, 58, 60 and 62, in the preferred embodiment of the invention.

FIG. 5-A illustrates an electrical terminal assembly 342 which is effective for operative connection as to any of terminal assemblies 164, 166, 168 and 170 of FIG. 4. For purposes of description it is assumed that: (a) terminal assembly 170 (FIG. 4) is placed into operative connection with terminal assembly 342; (b) terminal assembly 342 comprises dielectric body means 344 and (c) such body means 344, in turn, carries electrically conductive terminal members 204a, 206a, 208a and 210a. Terminal assemblies 170 (FIG. 4) and 342 are operatively connected to each other in a manner whereby terminal members 204, 206, 208 and 210 (of assembly 170) may be considered as being operatively connected to terminal members 204a, 206a, 208a and 210a (of assembly 342) thereby completing, therethrough, respective electrical circuits.

As depicted in FIG. 5-A, electrical conductor means 74-1, 74-2, 74-3 and 74-4 are respectively electrically connected to terminals 204a, 206a, 208a and 210a. It was previously described, as with regard to FIG. 2, that in the preferred embodiment of the invention, the respective radar units 56, 58, 60 and 62 were connected as by electrical cable means 64, 74) 66 and 68, to the assembly 70, and that each of such electrical cable means comprised four electrical conductors. In FIG. 5-A, conductor means 74-1, 74-2, 74-3 and 74-4 represent the four conductors of which cable means 74 is comprised.

Conductor means 74-1, partly shown in FIG. 5-A, is continued in FIGS. 5-B and 5-C and will be referred to in the description of such Figures. Conductor means 74-2 is shown as comprising electrical fuse means 346 and integrated circuit (I.C.) voltage regulator means 348 grounded as at 350 and having output conductor means 352 which, in turn, is electrically connected as between terminal means 354, providing a regulated (+) 8 volt supply, and one electrical side of capacitor means 356. Capacitors 358 and 360 each have one of their electrical sides connected to conductor means 74-2, between fuse 346 and regulator means 348 as at 362 and 364, and their opposite electrical sides connected to conductor means 74-3 and ground 350. Terminal means 366, connected to conductor means 74-2 as at 364, provides for a (+) 12 volt supply. Conductor means 74-4 is partly shown in FIG. 5-A and continued in FIG. 5-B. As depicted in FIG. 5-A, capacitor means 368 and signal or alarm means 370 are each electrically connected to conductor means 74-4, as at 372 and 374, and to ground. In FIGS. 5-B and 5-C, the terminals depicted at 376, 378, 380, 382, 384, 386, 387, 388, 390, 392 and 394 are each electrically connected to the regulated source or supply at 354 of FIG. 5-A. Similarly, terminals depicted at 396 and 398 of FIGS. 5-B and 5-C are each electrically connected to the supply terminal 366 of FIG. 5-A.

Referring primarily to FIG. 5-B, the circuitry 340 is illustrated as comprising non-inverting operational amplifier means 400 having input terminal means 402 and 404 and output terminal means 406. Electrical conductor means 408, comprising series situated resistance means 410 and 412, interconnects output terminal 406 of amplifier means 400 to an input terminal 414 of an operational amplifier means 416 which comprises a second input terminal 418 and output terminal means 420. A conductor means 422, comprising series situated resistance means 424 and capacitor means 425, interconnects output terminal means 420 of amplifier means 416 to an input terminal 426 of an amplifier means 428 which comprises a second input terminal 430 and output terminal means 432. A conductor means 434, comprising series situated capacitor means 436 and diode means 438, interconnects output terminal means 432 of amplifier 428 with the input terminal or pin "8" of an I.C. timer means 440.

An Exclusive NOR (XNOR) gate 442 has an input 444 electrically connected to conductor means 434 as at a point electrically between output 432 and capacitor 436. A second input 446 is brought to ground 350. Terminal 386 is also connected to conductor means 434, as between amplifier output 432 and capacitor 436, via resistance 448. Output terminal means 450, of XNOR gate 442, is in circuit with the base 452, of an NPN transistor 454, as via resistance means 456.

A conductor means 458 electrically interconnects output terminal or pin "9" of I.C. timer means 440 with a first input 460 of an OR gate 462 having a second input 464 and an output 466 which is depicted as being in circuit, as through resistance means 468, with the base 470 of an NPN transistor 472 which has its emitter 474 brought to ground 350.

The +12 volt input terminal 396 is depicted as being in circuit, via conductor means 476, with the collector 478 of NPN transistor 472 through resistor 480, and with the emitter 482 of a PNP transistor 484. The base 486 of transistor 484, through a resistor 487, is connected as to a point 488 generally electrically between resistance 480 and collector 478. The collector 490, of NPN transistor 484, is electrically connected to an LED 492 as through resistance means 494. Conductor means 74-4 (also see FIG. 5-A) is connected as to be electrically between collector 490 and resistance means 494.

Still with reference primarily to FIG. 5-B, a radar or microwave transceiver means is depicted at 498 and, in turn, shown as comprising an antenna horn 500, a Gunn diode oscillator 552 and Schottky mixer diode 502. A conductor means 504 interconnects the mixer diode 502 with input terminal 404, of amplifier means 400, and comprises coupling capacitor means 506. Conductor means 508, connected to conductor means 408 generally between output terminal 406 and resistance 410, comprises resistance means 510, 512 and 514 and capacitor means 516 with resistance means 512, preferably, being variably selectively adjustable. Input terminal 402 is electrically connected, via conductor means 518, to conductor means 508 as electrically between resistance means 512 and 514.

The voltage supply terminal 376 is connected, via conductor means 520, to NPN and PNP transistors 522 and 524. Conductor means 520 is illustrated as comprising resistance means 526, connected to the collector 528 of transistor 522. The base terminal 530 of transistor 524 is connected, through resistance means 532, to conductor means 520 as at a point electrically between resistance 526 and collector 528. The emitter 534 of transistor 524 is connected to conductor means 520 while emitter 536 of transistor 522 is at ground 350. The base 538 of transistor 522 is connected to conductor means 540 which comprises resistance means 542.

Transistor means 524 has its collector 544 connected as to conductor means 546, comprising capacitor means 548 and resistance means 550, which is connected to conductor means 504 (as between mixer diode 502 and capacitor means 506). Conductor means 546 may be considered as comprising branch conductor means electrically connecting collector 544 to one electrical side of a Gunn oscillator 552. Both mixer diode means 502 and oscillator means 552 have their other electrical sides brought to ground, as depicted.

A conductor means 554, comprising resistance means 556, is electrically connected to conductor means 504 as between capacitor 506 and input terminal 404 and, at its other end, connected to a point electrically between series resistance means 558 and 560 which, in turn, are electrically across terminal 378 and ground 350. A capacitor means 562 is also placed across ground to a point electrically among resistances 556, 558 and 560.

A conductor means 564, comprising series situated resistance means 566 and 568 and capacitor means 570, may be considered as connected at one end to output terminal 420, via conductor means 422, and, at its other end, to ground 350. Series arranged resistance means 572 and 574, electrically across ground 350 and terminal 380, are connected, as at a point electrically between resistance means 572 and 574, to conductor means 564 as to have such connection also electrically between capacitor means 570 and resistance means 568. Terminal 418 is electrically connected via conductor means 576 to conductor means 564 as at a point electrically between resistance means 566 and 568. A capacitor means 578 has its one electrical side to ground and its other electrical side to conductor means 408 as at a point electrically between resistor 412 and terminal 414. A capacitor means 580 has one of its electrical sides brought to conductor means 408, as to be electrically between resistance means 410 and 412, and has its other electrical side operatively connected, as via conductor means 422, to output means 420 of amplifier means 416.

A conductor means 582 comprising resistance means 584, potentiometer means 586 and 588 is connected to ground and to terminal means 426 as through conductor means 422. A capacitor 427, grounded at its one electrical side, has its other electrical side connected to conductor means 422 as at a point electrically between resistance 424 and capacitor 425. A conductor means 590 is illustrated as being electrically connected to terminal 430 of comparator 428, connected, as at 592, to potentiometer means 586 and connected to conductor means 582 as at a point 594 electrically between resistance means 584 and potentiometer 586. A capacitor means 596 is depicted as having one of its electrical sides connected to conductor means 582, as at 594, and having its other electrical side at ground. A resistance means 598, being connected to voltage supply terminal means 382, is also connected to conductor means 582 as at a point electrically between resistance 588 and potentiometer 586.

Diode means 600, resistance means 602 and capacitor means 604 each have their respective one electrical ends or sides connected to conductor means 434 and their respective opposite electrical ends or sides connected to conductor means 606 which, in turn, is electrically connected to conductor means 608 as to be electrically between resistance means 610 and 612 of which conductor 608 is comprised. The said one end of diode 600 is at a point on conductor means 434 electrically between capacitor 436 and diode 438, while the said one ends of resistance 602 and capacitor 604 are each as at respective points 603 and 605, on conductor means 434 electrically between diode 438 and terminal or pin "8" of I.C. timer means 440. One electrical end of conductor means 608 is connected to voltage supply terminal means 384 while its other end is brought to ground. A capacitor 614 is depicted as being electrically across ground and conductor 608 as at a point electrically between resistors 610 and 612.

A conductor means 616 comprising series situated capacitor 618, and resistance 620, is, as depicted, connected one end to ground and, at its other end connected to terminal or pin "13" of I.C. timer means 440. A branch conductor portion 622 also serves to connect conductor means 616 to terminal or pin "12" of I.C. timer means 440. A conductor means 624 serves to interconnect the collector electrode 626, of NPN transistor 454, with conductor means 616 as at a point electrically between terminals or pins "12" and "13" of timer 440 and resistance 620. The emitter 628, of NPN 454 is brought to ground. A resistance 630 being connected to voltage supply terminal means 387 is also electrically connected to conductor means 624 as to be electrically between resistance 620, collector 626 and terminals or pins "12" and "13". A capacitor 632 is depicted as being electrically across ground and terminal or pin "11" of timer means 440.

A conductor means 634 shown being electrically connected to terminal or pin "10", of timer means 440, is continued in FIG. 5-C. Another conductor means 636 is electrically connected, as via conductor means 458, to terminal or pin "9" of timer means 440 and is continued in FIG. 5-C. Further, gate 462 has its input terminal 464 electrically connected to conductor means 638 which is continued in FIG. 5-C.

Referring, for a moment to FIGS. 5-A and 5-C, collectively, one of the conductors 74-1, comprising the cable Means 74, is depicted as electrically connecting terminal member 204a (FIG. 5-A), from which it extends into the circuitry of FIG. 5-C, and comprising diode means 640 and continuing as to comprise resistance means 642 with such conductor 74-1 being electrically connected to the base 644 of an NPN transistor 646. (For ease of reading and locating, a portion of conductor 74-1 is illustrated in approximately the upper quarter of FIG. 5-C and a further portion of conductor 74-1 is illustrated near the lower part of FIG. 5-C.)

Referring in particular to FIG. 5-C, a plurality of NAND gates are shown at 648, 650 and 652. Conductor means 636, continued from FIG. 5-B, comprising resistance means 654, is electrically connected to input terminal means 656 of NAND gate 650. The other input terminal 658 of NAND gate 650 is in circuit with conductor means 660, comprising resistance means 662 and 664, which, as at a point 668 electrically between resistors 662 and 664, is electrically connected to conductor means 74-1 generally electrically between diode 640 and resistance 642.

Conductor means 670 serves to interconnect output terminal 672 of gate 650 to both input terminals 674 and 676 of gate means 652. A conductor means 678 comprising diode means 680 electrically interconnects conductor means 670, and therefore both input terminals 674 and 676, to an input terminal 682 of an Exclusive NOR (XNOR) gate 684. The other input terminal 686 of XNOR gate 684 is brought to ground.

A conductor means 688 comprising resistance means 690 and capacitor means 692, is operatively connected: (a) to conductor 678, as at a point 694 electrically between diode 680 and input 682; (b) to conductor 74-1 as at a point 696 electrically between resistance 690 and capacitor 692; and (c) to ground.

A conductor 698 serves to operatively interconnect output terminal 700, of NAND gate 652, to an input terminal 702 of an OR gate 704. Conductor means 706 comprising diode means 708 is placed electrically generally across NAND gates 650 and 652 as by operative connection to output terminal 700, via conductor means 698, and operative connection to input terminal means 656 as via conductor means 636. The point indicated at 710 may indicate the operative connection, as between conductors 636 and 706, and, it may also represent the operative connection of one side of capacitor means 712 having its other electrical side brought to ground.

OR gate 704 has its other input terminal 714 operatively connected, via conductor means 716, to conductor means 636 as at a point 718 electrically between resistance 654 and terminal or pin "9" of I.C. timer means 440 (FIG. 5-B).

A conductor means 720 operatively interconnects an input terminal 722, of NAND gate 648, with conductor means 678 as at point 694, via conductor 688. A capacitor 724 has one of its sides operatively connected to input terminal 722, as via conductor 720, and its other electrical side brought to ground.

Conductor means 540, previously shown and identified in FIG. 5-B, is continued in FIG. 5-C (as at the upper left portion thereof) and is operatively connected to output terminal means 726 of NAND gate means 648. The other input terminal 728, of gate 648, is operatively connected via conductor means 730 to one electrical side of a capacitor 732 which has its other side brought to ground. A resistor 734 is operatively connected across NAND gate 648 by having one of its ends electrically connected to output terminal 726, via 540, and its other end electrically connected to input terminal 728 via 730.

Still with reference to 5-C, the OR gate 704 (shown in the right side of the upper third of FIG. 5-C) is depicted as having its output terminal 736 electrically connected to an input terminal 738, of Exclusive NOR (XNOR) gate 740, via conductor means 742 which is shown as comprising resistance means 744. A capacitor 746 has one of its electrical sides operatively connected to input terminal 738 and its other electrical side brought to ground.

The XNOR gate 684 has its output terminal 748 electrically connected, as via conductor means 750, to an input terminal 752 of an XNOR gate 754. A conductor means 756 is shown as comprising resistance means 758 and serving to interconnect an input terminal 760, of gate 754, with conductor means 742 as at a point electrically between resistance 744 and output 736 of OR gate 704. A diode 762 is connected to conductor means 756, as to be generally across resistance means 758, and a capacitor 764 has one of its electrical sides operatively connected to input terminal 760 while its other electrical side is brought to ground. The input terminal 766 of XNOR gate 740 is electrically connected, as through conductor means 756, to conductor means 742 as to be electrically between resistance 744 and output terminal 736.

An integrated circuit (I.C.) timer means 768 has its terminal or pin "6" operatively connected to output terminal 770 of XNOR gate 740. The terminal or pin "3" of I.C. timer means 768 is connected to one electrical side of a capacitor 772 which has its other side brought to ground. The terminal or pin "5" of I.C. timer means 768 is operatively connected, via conductor means 774 and 776, to input terminals 778 and 780 of OR gates 782 and 784, respectively. The other input terminal 786 of gate 782 is electrically connected to output terminal means 788 of XNOR gate 754. The other input terminal 790 of OR gate 784 is electrically connected, as via conductor means 792, to conductor means 678 as to be electrically generally between diode 680 and input terminal 682 of XNOR gate 684.

Referring to both FIGS. 5-B and 5-C, conductor means 634, shown electrically connected to terminal or pin "10" of I.C. timer means 440 is further shown in FIG. 5-C as comprising the collector 794 and emitter 796, brought to ground, of an NPN transistor 798.

Terminal or pin "4" of I.C. timer means 768 is connected, via conductor 800, to conductor means 634 as at a point 802 generally electrically between collector 794, of NPN transistor 798 (FIG. 5-C) and terminal or pin "10" of I.C. timer means 440 (FIG. 5-B). Conductor means 804, comprising resistance means 806, interconnects the output terminal 808, of OR gate 782, to conductor means 634 as at a point 810 generally electrically between 802 and terminal or pin "10" of I.C. timer means 440.

Referring primarily to FIG. 5-C, an AND gate 812 is depicted comprising input terminals 814 and 816 and output terminal 818. Conductor means 638 (shown in lower portion of FIG. 5-B and lower right portion of FIG. 5-C), comprising resistance means 820, electrically interconnects input terminal 464 of OR gate 462 with output terminal 818 of AND gate 812. A conductor 822, comprising diode means 824, interconnects output terminal 826 of OR gate 784 with conductor 638 as at a point electrically generally between resistance 820 and input terminal 464. Input 814 is connected as to terminal means 390, and thereby to a source of electrical power, as previously described, while input 816 is connected to one electrical side of a capacitor 828 having its other electrical side at ground. A resistance 830 is shown as having its opposite electrical ends operatively connected to input terminal 816 and output terminal 818, respectively.

Still referring primarily to FIG. 5-C, a conductor means 832, comprising resistance 834, serves to interconnect terminal or pin "1", of I.C. timer 768, as to terminal 388 leading to a source of electrical power, as previously described. One electrical side of a capacitor 836 is connected, as by a conductor 838, to terminal or pin "1", of timer 768, as via conductor 832. The other electrical side of the capacitor 836 is brought to ground.

Terminal or pin "2" of timer 768 is shown as connected to conductors 832 and 838 as by a conductor 840 which is also connected to a conductor 842 leading to the collector 844 of an NPN transistor 846 having its emitter 848 brought to ground. The base 850 of transistor 846 is connected via conductor means 637, comprising resistance means 852, to conductor 636 (FIG. 5-B) and through conductor 458 (FIG. 5-B) to terminal or pin "9" of I.C. timer 440.

Referring primarily to the lower left portion of FIG. 5-C, terminals 392, 394 and 398 have been previously described as all leading to a source of electrical power. A voltage comparator 854 is shown comprising input terminals 856 and 858 and output terminal 860. A conductor means 862, comprising a diode 864, interconnects output terminal 860 and, as through conductor means 776, input terminal 780 of OR gate 784.

A conductor means 866 serves to place a zener diode 868 electrically between input terminal 858 and ground. A resistance 870 has its electrically opposite ends operatively connected to power supply terminal 394 and to input terminal 858 (as through conductor means 866), respectively.

A voltage divider network, comprised as of conductor means 872, in turn comprising series resistance means 874 and 876, has its electrically opposite ends operatively connected to power supply terminal 398 and to the collector 878 of NPN transistor 646 which has its emitter 880 brought to ground. Input terminal 856 is depicted as being connected to conductor means 872, at a point electrically between resistances 874 and 876, as by a conductor 882. A capacitor 884 shown connected to conductor 882 is also connected to ground.

A resistance 886 has its electrically opposite ends operatively connected to terminal 392, leading to electrical power supply, and to output terminal 860 (as via conductor means 862), respectively. The base 888 of NPN transistor 798 is connected, as by a resistance 890, to conductor means 862. Capacitors 892 and 894, each connected to ground, are also respectively connected to bases 888 and 644, of transistors 798 and 646, respectively.

Operation

Referring to FIGS. 5-A, 5-B and 5-C, the positive 12 volts from the switching power supply (along conductor 214 of FIG. 4) enters as at terminal 206a (FIG. 5-A) and electrical ground (via conductor 216, FIG. 4) is applied as at terminal 208a (FIG. 5-A). A positive voltage signal, from flasher controller 76 (FIG. 2) and transmitted via conductor 212 (FIGS. 2 and 4), is applied as at terminal 204a (FIG. 5-A) and along conductor 74-1 (FIG. 5-A).

To better understand the manner and purpose of a positive voltage signal being applied to conductor 212, reference is made to FIGS. 2 and 4.

It should be made clear that the specific form of the flasher controller 76 forms no part of this invention. In the prior art are various embodiments of flasher controllers and, it is assumed, that the greatest quantity of such are employed in combination with school buses and the like for causing the flashing (intermittent energization) of externally mounted warning lights. Some school buses employ only red warning lights while other school buses employ two sets of warning lights each intended to be controlled and flashed through the control of the associated flasher controller. In such arrangements, as typically specifically disclosed herein, a first set of yellow warning lamps are flashed as the bus is in a mode preparing to come to a stop while the second set of red warning lamps are flashed when the bus is in its stopped condition.

As is known to those of ordinary skill in the a rt, all of such flasher controller assemblies, whether comprised of solid state circuit means or, in the main, comprised of electric motor driven rotary contact means, have at least one portion of the circuitry therein which becomes a relatively high voltage, in the order of +12.0 volts, at a time when the red warning lamps are energized by the flasher controller assembly and such is independent of whether the driver directly actuates the controller assembly or indirectly actuates the controller assembly, as by opening door 16 and closing the circuit through switch means 114. Accordingly, a portion of controller 76 is shown as broken away as to illustrate conductor means 212 being electrically connected to a point (or portion) 107, of the circuitry within flasher controller assembly 76, which is at a +12.0 volts potential when the red warning lamps are energized.

In view of the foregoing, it can be seen that conductor 212 operatively interconnects flasher controller means 76 with operator read-out or indicator assembly 70 and with the circuitry 340 of FIGS. 5-A, 5-B and 5-C and, further, that a positive voltage signal is caused to be applied to conductor 212 to serve as an indication that the bus door 16 is opened and to initiate a sequence of events in indicator assembly 70 and radar units 56, 58, 60 and 62.

Generally, upon the bus door 16 being opened and switch 114 becoming closed causing energization of the red flashing warning lamps 24, 26, 36 and 38, the following occurs. A self-test interval is first initiated and such serves to test all components and also determines that a microwave field is being generated by all the radar units or assemblies 56, 58, 60 and 62. Next, the detection portion of the invention enters a four second span of time during which the alarm or indicator means, comprising a portion of the assembly 70 (FIGS. 2 and 4) are activated. In the preferred embodiment of the invention, the alarm or indicator means comprises sensory indicator means which may be lamp means as at 252, 254, 256 or 258 (FIG. 4), or, which may be auditory indicator or alarm means as at 272 (FIG. 4). Further, the alarm and/or indicator means preferably comprises both the lamps 252, 254, 256 and 258 and the auditory signal generating means 272 and 370. During such four second time span the indicator and/or alarm means undergo electrically pulsed "on" and "off" conditions with an "on" and an "off" comprising a cycle. In the preferred embodiment the lamps 252, 254, 256 and 258 as well as the auditory signal generator 272 would be pulsed as at a rate in the order of three cycles per second. Having all of such indicator means pulsed (into and out of electrical actuation) enables the vehicular driver 118 (FIG. 7) to determine whether the related circuitry and components are properly operatively functional.

If during such four second span of time an object is detected as being within the radiation field of any of the radar units, the auditory alarm or indicator means 272 is continuously energized, preferably producing a continuous auditory signal tone, and the lamp 252, 254, 256 or 258 (or lamps) associated with the particular radar unit 56, 58, 60 or 62 (or radar units) becomes continuously energized and lighted.

Upon the expiration of the four second span of time, the signal generating means, that is, preferably, all of lamps 252, 254, 256 and 258 along with auditory means 272, are caused to become inactive until an object is subsequently detected within one or more radiation fields of the radar units 56, 58, 60 and 62. If such object should be detected, as herein previously described, the related lamp or lamps, whether 252, 254, 256 and/or 258 becomes continuously energized and lighted and the auditory signal means 272 becomes continuously energized. The thusly energized sensory signal generating means, that is, visual signal generating means, lamps 252, 254, 256 and/or 258 and auditory signal generating means 272 remain in an operatively activated state at least for as long as such object continues to be detected in the radiation field of a radar unit. In the preferred embodiment, such activated lamp, 252, 254, 256 or 258, and activated auditory means 272 remain operatively activated for a selected period of time (delay time) extending beyond that moment in time that the object ceases to be detected within a radiation field (of a radar unit). In the preferred embodiment, such selected period of time (delay time) may be approximately 1.0 to 2.0 seconds. Such delay time then prevents the entire warning system from cycling "on" and "off" as an object in the radiation field either momentarily leaves the radiation field and then returns to within the radiation field, or, as an object in the radiation field changes from a moving to a stationary condition and then back to a moving condition.

After passengers have been loaded onto or unloaded from the vehicle 10, the door 16 is closed which, in turn, in the preferred embodiment, causes switch means 114 (FIG. 2) to become opened thereby terminating the flashing of the red lights or lamps 36, 38 and 24, 26 and, further, causing the termination or removal of the positive voltage signal previously applied to conductor means 212. The termination or removal of the positive voltage signal applied to conductor means 212 causes the entire detection system to again operate in a mode wherein the sensory indicator means, that is, visual signal generating means 252, 254, 256 and 258 along with auditory signal generating means 272 are electrically pulsed into "on" and "off" conditions (with an "on" and an "off" comprising a cycle) with such being, preferably, at a rate of three cycles per second for a period of time, preferably, of approximately 4.0 seconds next following opening or deactivation of switch means 114. This pulsed span of time serves to remind the driver 118 that the entire detection and warning system is about to be deactivated. If during this pulsed span of time an object is detected within any of the radiation zones or areas, the corresponding lamp means, 252, 549

256 or 258 becomes lighted continuously and the auditory alarm means 272 also becomes continuously activated. When such detected object leaves the radiation field the entire detection and warning system again reverts to the already described mode wherein the lamps 252, 254, 256 and 258 as well as auditory means 272 are cyclically pulsed "on" and "off" to indicate to the driver 118 that the entire detection and warning system is about to be deactivated.

Further, in the preferred embodiment, each of the radar units 56, 58, 60 and 62 is provided with auditory signal generating means 370 (FIG. 5-A) preferably situated as to be within the housing means of such radar units. By providing an auditory alarm means, actuated when alarm means 272 and any of lamps 252, 254, 256 and 258 are actuated, at each radar unit or assembly, the person in the radiation field is warned of being in that radiation field and, also, indicates to that person that the driver, 118, is being alerted to that person's presence in that particular radiation field.

With the foregoing in mind and referring in particular to the circuitry 340 of FIGS. 5-A, 5-B and 5-C, a positive (+) 12 volts, from the switching power supply of FIG. 4, delivered to terminal 206, is applied, through coacting terminal 206a, to conductor means 74-2, while ground potential from conductor 216 (FIG. 4) is applied to conductor 74-3 (FIG. 4) through cooperating terminals 208 and 208a.

The positive voltage signal produced by flasher assembly 76 and applied to conductor 212 (FIG. 2) is in turn applied to conductor 74-1 as via coacting terminals 204 and 204a. This positive voltage signal, as previously discussed, is an indication that the red lamp assemblies 24, 26 and 36, 38 are functioning in their flashing mode. An output from the detector circuit means of FIGS. 5-A, 5-B and 5-C is carried along conductor means 74-4 (FIGS. 5-A and 5-B) and conveyed, as through cooperating terminals 210a and 210, to conductor means 238, 242 and 240 and through LED 258, diode 268 and auditory signal generating means 272 (FIG. 4).

The +12.0 volts input on conductor means 74-2 flows through fuse 346 and then to the +8.0 volts I.C. voltage regulator 348. Capacitors 358, 360 and 356 are provided for filtering and stability. The regulated +8 volts is applied and provided to point or terminal 354 which terminal becomes effective for supplying +8 volts to all other terminals which as previously described coact with terminal 354.

As soon as the bus (vehicle) 10 comes to a stop and the red light lamp assemblies 24, 26 and 38, 36 start flashing, conductor 74-1 (FIG. 5-A) through terminals 204a and 204 (FIG. 4) becomes the 12.0 volts signal voltage with such being applied via conductor 74-1 to resistor 664 and capacitor 692 through the reverse blocking diode 640 which prevents negative spikes or reverse polarity from being applied to the circuit.

When terminal 204a and conductor means 74-1 are carrying the positive voltage signal (+12.0 volts as previously described), which for ease of reference may be considered a logic "high", the input at 722 of NAND gate 648 (FIG. 5-C) becomes "high". Since the input at 722 was, initially, "low", the output at 726 of NAND gate 648, at that time, would have been "high" causing capacitor 732 to become charged through resistor 734. Therefore, when the input at 722 becomes "high", the output at 726 becomes "low" causing capacitor 732 to discharge. As soon as capacitor 732 discharges to the threshold voltage of gate 648, the output at 726 of gate 648 becomes "high" and again charges capacitor 732. Consequently, NAND gate 648 oscillates (causing output at 726 to be alternately "high" and "low") at a frequency determined by resistor 734 and capacitor 732, which, for example, in the preferred embodiment may be approximately 300.0 hz.

The output at 726 of NAND gate 648 is applied, via conductor means 540 which comprises resistor 542, to the base 538 of NPN transistor 522 (FIG. 5-B). When the output at 726 of NAND gate 648 is "high", such output applied via 540 to base 538 causes the transistor 522 to be turned "on" (become conductive in its collector 528 and emitter 536 circuit) which, in turn, causes PNP transistor 524 to be turned "on". Resistors 526 and 532 are, of course, current limiters.

When the PNP transistor 524 is "on", collector 544 thereof, in the preferred embodiment, is at approximately 8.0 volts and is able to supply electrical power to microwave transceiver 498 which, as previously indicated, is depicted as comprising Gunn oscillator 552, Schottky mixer diode 502 and antenna 500. Capacitor 548 and resistor 550 prevent bias circuit oscillation.

The transceiver 498, preferably K-band radar, is commercially available, in packaged and tuned modules, from many manufacturers or sources. One of such sources is Alpha Industries, Inc. having an address of 20 Sylvan Road, Woburn, Mass., U.S.A. Such motion detector modules are disclosed on pages 4-15 and 4-16 of a catalog captioned "Specifications, Application Notes, Packages—Semiconductor Division", bearing a United States of America copyright notice, by Alpha Industries, Inc., dated 1985 and further identified as Alpha Industries, Inc. Publication No. 50010010.

Even though it has been shown that NAND gate 648 would oscillate (having the output at 726 alternately become "high" and "low") when conductor means 74-1 became "high", for purposes of discussion let it be assumed that NAND gate 648 is not oscillating and that its output at 726 is "high". With electrical power carried (through terminals 206 and 206a) by conductor means 74-2 (FIGS. 4 and 5-A) and with the input at 722 of gate 648 being "low", the output at 726 of NAND gate 648 will be "high" causing transceiver 498 to be operating.

Now, if a moving object enters the radiation field of operating transceiver 498, assumed to be radiation field 106 (FIG. 3), a relatively low audio frequency will be generated by the Doppler effect as previously described. This low audio frequency is also low in amplitude and is therefore amplified by the non-inverting operational amplifier 400 (FIG. 5-B). The audio signal from the transceiver 498 is coupled to amplifier 400 by capacitor 506. Resistors 558, 560 and 556 are bias resistors biasing the non-inverting amplifier 400 to a quiescent voltage of about 4.0 volts, in the preferred embodiment. Capacitor 562 provides an a.c. ground for resistor 556 so that the entire input signal, applied to input terminal 404 of amplifier 400, appears across resistor 556. Feedback resistors 512 and 510 and input resistor 514 collectively determine the gain of the amplifier 400 in a manner well known. Resistor 514 is a.c. grounded by capacitor 516. Resistor 512 is preferably a variable resistor so that the gain of the amplifier 400 may be varied within the range of, for example, about 15.0 to 75.0. This enables the entire system sensitivity to be selectively adjusted.

Operational amplifier 416 and its associated components comprise a low pass active filter with a cut-off frequency of about 60 hz. Resistors 572 and 574 are bias resistors. Resistors 568 and 566 determine the low frequency gain of the stage. Each of resistors 568 and 566 are preferably of 75.0 K ohms thereby yielding a gain of 2. Capacitor 570 provides an a.c. ground for resistor 568. Resistors 410, 412 and 424 along with capacitors 580, 578 and 427 provide the roll-off of the gain with frequency.

Amplifier 428 (FIG. 5-B) and its associated components comprise a voltage comparator. Resistors 598, 584 and 586 are bias resistors having values of approximately 82.0 K ohms, 100 K ohms and 2.0 K ohms, respectively, in the preferred embodiment. Consequently, the inputs at 426 and 430 of amplifier 428 are each at approximately 4.5 volts. Resistor 586 is a 2.0 K ohms potentiometer, and when such is set to 2.0 K ohms the voltage across it will be approximately 90.0 m.v. Obviously, the 2.0 K ohm potentiometer can be set, if desired, to where there is a zero voltage across it. Any voltage across resistor 586 serves to turn comparator 428 "on" and, in the absence of any signal from the active filter, which comprises operational amplifier 416 and its associated cooperating components, the output at 432 of comparator 428 will be at 8.0 volts.

An a.c. signal from such active filter (i.e. amplifier 416 et al.) is coupled to the comparator 428 by capacitor 425. This a.c. signal appears across resistor 588, of 100.0 K ohms, and potentiometer 586. The potentiometer 586 is a.c. grounded by capacitor 596 so that, effectively, the a.c. signal is across resistor 588. Negative going excursions of such a.c. signal will tend to turn comparator 428 "off" and, in fact, any negative excursion in excess of the d.c. voltage across potentiometer 586 will turn comparator 428 "off". Consequently, an a.c. signal in excess of the threshold value selected on resistor 587 will result in a train of pulses varying between 0.0 volts and 8.0 volts. Resistor 448 is a pull-up resistor for the open collector output transistor of which the comparator 428 is comprised. Still referring to FIG. 5-B, capacitor 436, diode 438, capacitor 614, diode 600, capacitor 604 and resistors 610, 612 and 602 comprise a charge pump circuit. The train of pulses, from output 432 of comparator 428, are coupled to the charge pump by capacitor 436. Resistors 610, 612 and 602 comprise a bias network which, in the absence of output pulses from comparator 428, holds the voltage at point 605 at approximately 3.0 volts. Capacitor 614 is an a.c. ground for diode 600. When the output at 432 of comparator 428 becomes "high" capacitor 436 charges through diode 600. When the output at 432 of comparator 428 becomes "low", capacitor 436 discharges through diode 438, resistor 602 and capacitor 604. Capacitor 614 may be considered as an a.c. short to ground 350 and the discharge current of capacitor 436 divides between resistor 602 and capacitor 604. The current flow in capacitor 604 through diode 438 charges capacitor 604 in a direction which reduces the 3.0 volt bias, at point 605, relative to ground. As the train of pulses, at output 432 of comparator 428, continues, a charge continues to accumulate in capacitor 604 until the voltage at point 605 reaches approximately 1.0 volt.

The voltage at point 605 is applied to pin or terminal "8" of I.C. timer 440. I.C. timer 440 and I.C. timer 768 (FIG. 5-C) may each be the generally well known type LM555 integrated circuit manufactured by and commercially available as from Texas Instruments Incorporated of Dallas, Tex., and as disclosed at page 5-21, et seq., of a booklet entitled "T.I. Integrated Circuits—Data Book, 1984" and bearing a United States of America copyright notice, by Texas Instruments Incorporated, dated 1983. Another source for such I.C. timers may include National Semiconductor Co. of Santa Clara, Calif.

In any event I.C. timer 440 is connected in its monostable or one shot configuration. In this configuration, if the trigger input at pin "8" drops below one-third of the supply voltage, which in the preferred embodiment is 8.0 volts, the output of I.C. timer 440, on terminal or pin "9", will go "high" (8.0 volts), provided terminal or pin "10" is, at that time, "high". As will be later described, pin "10" is an external reset.

Therefore, if the voltage at pin "8" decreases to a value below 2.66 volts, the voltage or signal on pin "9" will become "high". Point 605 is biased just above 2.66 volts so that within a few cycles of an input signal to the comparator 428, the voltage at pin "8", of I.C. timer 440, will decrease to a value less than 2.66 volts and trigger or turn I.C. timer 440 "on". Once I.C. timer 440 is triggered "on" it will stay "on" for a period of time approximately equal to the time constant of capacitor 618 and resistors 630 and 620. In the preferred embodiment capacitor 618 is rated at 100 μf, resistor 630 is rated at 12.0 K ohms and resistor 620 is rated at 200 ohms resulting in a time constant of approximately 1.2 seconds. Capacitor 632 is provided in order to prevent false triggering of I.C. timer 440.

XNOR gate 442, resistor 456 and NPN transistor 454 keep the output of I.C. timer 440 "high" once I.C. timer 440 is triggered "on". I.C. timer 440, in its normal mode of operation, starts charging capacitor 618 through resistors 630 and 620, immediately when the voltage at pin "8" decreases to below 2.66 volts, and the I.C. timer 440 is not again re-triggerable to be "on" until its output on pin "9" becomes "low". The XNOR gate 442 and NPN transistor 454 keep capacitor 618 discharged for as long as the train of pulses exists at output 432 of comparator 428. If the output at 432 of comparator 428 is "high", as it is when there is no object present in the radiation field of the associated radar unit, the output at 450 of XNOR gate 442 is "low" and NPN transistor 454 is "off" (nonconductive). However, when an object is detected, in the radiation field, the output (as at 432) of comparator 428 starts pulsing "low" and XNOR gate 442 turns "on", which it does at each "low" output of comparator 428, and discharges capacitor 618 through resistor 620 and collector 626 and emitter 628 of transistor 454. Resistor 620, being only about 200.0 ohms, has practically no effect on the time constant of capacitor 618 and resistor 630; however, it does limit the discharge current, of capacitor 618 through transistor 454, to a value which transistor 454 can safely handle. The intent of I.C. timer 440 is to have its output "high" as long as there is an object detected by the associated radar unit as well as for a span of time thereafter since, as previously indicated, a person in the radiation field (of such associated radar unit) may intermittently move and stop resulting in corresponding variations in the output of the radar detector. I.C. timer 440 and XNOR gate 442 keep the output of I.C. timer 440 "high" for as long as a normal target is in the field of radiation.

With the output of I.C. timer 440 being "high", the output at 466 of OR gate 462 is also "high" and this results in NPN transistor 472 being turned "on" through resistor 468, base 470 and collector resistor 480. The flow of current through the collector 478 and emitter 474 of transistor 472, causes PNP power transistor 484 to be turned "on" through base resistor 487 and base 486. In the preferred embodiment, the emitter-collector circuit of transistor 484 is operatively connected to several devices a first of which is an LED 492, and current limiting resistor 494. The LED 492 is preferably mounted on the circuit board, of circuit means 340, and is useful as in troubleshooting thereof. Transistor 484 is also operatively connected as via conductor means 74-4 (continued in FIG. 5-A) to sensory signal generating means 370, filter capacitor 368 and terminal 210a which has been described as being electrically connected to terminal 210 of FIG. 4. In the preferred embodiment, the signal generating means 370 comprises a piezoelectric sonic transducer which, when activated functions as an alarm producing an intense auditory warning signal. Preferably, such an alarm 370 is operatively carried by each of the radar units 56, 58, 60 and 62.

In the foregoing it was described that when the voltage on conductor means 212 (FIG. 4) became "high" (+12.0 volts) NAND gate 648 (FIG. 5-C) would oscillate. This oscillation is a test signal which exercises all the components from NPN transistor 522 (FIG. 5-B) to the output on pin "9" of I.C. timer 440.

Conductor means 636 (FIG. 5-B) operatively connects pin "9" of I.C. timer 440 to input terminal 656 of NAND gate 650 (FIG. 5-C) through resistor 654. Input terminal 658, of gate 650, is operatively connected, via resistor 662, conductor means 660 and conductor means 74-1, to terminal 204a (FIG. 5-A) which was previously described as being in circuit with terminal 204 and conductor 212 (FIG. 4). When the voltage on conductor means 212 and 74-1 initially becomes "high" (+12.0 volts signal), the input at 658 of NAND gate 650 (FIG. 5-C) is "low" because the output on pin "9" of I.C. timer 440 is of "low"; at this time the input at terminal 658 of NAND gate 650 is "high". Consequently, the output at 672 of NAND gate 650 is, at this time, "high". NAND gate 652 is operatively connected to NAND gate 650 as to function as an inverter thereby having its output at 700 be "low" when the output at 672 is "high" and be "high" when 672 is "low".

The output at 700 is operatively connected, via conductor means 706 and blocking diode 708, as at 710, to input terminal 656 of NAND gate 650. Gates 650 and 652, thusly electrically interconnected, comprise a latch so that when the input on terminal 656 becomes "high", in response to pin "9" of I.C. timer 440 becoming "high", the output at 700 of gate 652 becomes "high" and remains "high" even if the output on pin "9" becomes "low". Capacitor 712 prevents the latching of gates 650 and 652 due to spurious voltage spikes. As soon as the output at 672 of gate 650 becomes "low", in response to the output at pin "9" of I.C. timer 440 becoming "high", the terminal of resistor 690, as at point 694, becomes "low" because it is connected to output terminal 672 of gate 650 through blocking diode 680.

Still referring to FIG. 5-C, when either the output at pin "9" of I.C. timer 440 or the output at 700 of NAND gate 652 is "high", the output at 736 of OR gate 704 is "high". The output terminal 736 of OR gate 704 is operatively connected, as via conductor means 742 and resistor 744, to both input terminals 766 and 738 of XNOR gate 740. As shown, input terminal 738 is actually operatively connected to output terminal 736 of gate 704 through a delay network comprised of the resistor 744 and capacitor 746.

When both inputs at terminals 766 and 738 of gate 740 are either "high" or "low" the output at 770 of gate 740 is "high". If one of the inputs at terminals 766 or 738 is "high" while the other input is "low", the output at 770 is "low". Therefore, when the output at pin "9" of I.C. timer 440 (FIG. 5-B) becomes "high", thereby producing a "high" output at terminal 736 of OR gate 704 (FIG. 5-C), the output at 770 of XNOR gate 740 momentarily becomes "low" until capacitor 746 charges to again make both inputs 766 and 738 equal and thereby have output 770 of XNOR gate 740 again become "high". Such momentary "low", thusly produced at 770, triggers I.C. timer 768 causing terminal or pin "5" thereof to have a "high" output. I.C. timer 768 functions in the same manner as does I.C. timer 440 (FIG. 5-B). That is, the "on" time of I.C. timer 768 is determined by the time constant of resistor 834 and capacitor 836 which, in the preferred embodiment, is approximately 4.0 seconds. Capacitor 772 is functionally analagous to capacitor 632 (I.C. timer 440 FIG. 5-B).

When the output at pin "5" of I.C. timer 768 becomes "high" a like signal is applied, via conductor means 774 and 776, to input terminal 780 of OR gate 784. Regardless of the signal applied to terminal 790, the "high" input thusly applied to terminal 780 assures that the output at 826 of OR gate 784 is "high". Whenever the output at 826 of OR gate 784 is "high", point 639, as on conductor 638 (also continued in FIG. 5-B), is effectively disconnected from the output terminal 826 of OR gate 784 by diode 824. If the output at 826 is "low", point 639 is also held "low" since at that time diode 824 can conduct. Therefore, the signal applied to input terminal 464 of OR gate 462 (FIG. 5-B) cannot cause the output at 466 of OR gate 462 to be "high" if the output at 826 of OR gate 784 (FIG. 5-C) is "low".

AND gate 812 (FIG. 5-C), capacitor 828 and resistor 830 function as an oscillator in generally the same manner as NAND gate 648, capacitor 732 and resistor 734. The output terminal 818 of NAND gate 812 is electrically connected, as via resistor 820, to input terminal 464 of OR gate 462 (FIG. 5-B) and to terminal 826 of OR gate 784 (FIG. 5-C) with such being through said resistor 820 and diode 824. If the output at 826 of OR gate 784 is "high", then the output at 818 of AND gate 812 is applied, via conductor means 638 (continued in FIG. 5-B) to input terminal 464 of OR gate 462 which places transistor 484 into conduction whereby LED 492, alarm means 370 and conductor means 74-4 (FIGS. 5-B and 5-A) are sequentially turned "on" and "off" at the frequency of oscillation of oscillator 812. This frequency is controlled by capacitor 828 and resistor 830 and, in the preferred embodiment, is set about 3.0 hz.

If the output at 826 of OR gate 784 is "low", point 639 is held low" thereby inhibiting the pulsing or cyclic energization of alarm 370. Input 790 of OR gate 784 is electrically connected as via conductor means 792, 678 to point 694 and through resistor 690 to conductor means 74-1 as at point 668. Whenever the signal on conductor means 74-1 becomes "high" (as previously described) the output at 826 of OR gate 784 also becomes "high" thereby allowing AND gate 812 to energizingly pulse alarm 370 if, at that time, the output on pin "9" of I.C. timer 440 is "low". A "high" output at terminal or pin "9", of I.C. timer 440, will produce continuous electrical energization of the alarm 370.

XNOR gate 754 and OR gate 782 function to prevent any energization of the alarm 370 due to the detection of an object, in the related radiation field, if the vehicle's loading or off-loading lights (in the preferred embodiment such being red lamps 24, 26, 36 and 38) are "off"

(de-energized) and both I.C. timer 440 and I.C. timer 768 have completed their cycles. When this is the situation the output at 808 of OR gate 782 (FIG. 5-C) is "low" and such "low" is applied to the reset pins "10" and "4" of I.C. timers 440 and 768, respectively. Such an applied "low" to reset pins "10" and "4" functions to override any other inputs to I.C. timers 440 and 768 and immediately makes the output on terminal or pin "9", of I.C. timer 440, become "low" and, at the same time, immediately makes the output on terminal or pin "5", of I.C. timer 768, become "low". However, XNOR gate 754 and OR gate 782 must also allow an output to the alarm means 370 (via 74-4, FIGS. 5-B and 5-A) when the loading lamp means 24, 26, 36 and 38 are being energized, or, if such lamp means have just been turned "off" and I.C. timer 768 is in the process of timing out.

If the output on terminals or pins "5" and "9" of I.C. timers 768 and 440, respectively, is "low" and the loading lamp assemblies 249 269 36 and 38 are not "on", the input on terminal 682 of XNOR gate 684 (FIG. 5-C) is "low". With the inputs on both terminals 686 and 682 of XNOR gate 684 being 11 low", the output at terminal 748 thereof is "low" and such is applied, as via conductor means 750, to input terminal 752 of XNOR gate 754. With the inputs on both terminals 760 and 752 being "low" the output at 788, of XNOR gate 754, is also "low". The "low" output at 788, applied to input terminal 786 of OR gate 782, and the "low" output at pin "5" (of I.C. timer 768), applied to input terminal 778 of OR gate 782, the output at terminal 808 of OR gate 782 must be "low" and such, applied to terminals or pins "10" and "4", of I.C. timers 440 and 768, respectively, as via conductor means 634 (FIGS. 5-C and 5-B) and 800 (FIG. 5-C) hold I.C. timers 440 and 768 in reset. If, in such reset state, the loading lamps or lights 24, 26, 36 and 38 are turned "on" the input at terminal 682 of XNOR gate 684 becomes "high" thereby making the output at terminal 748, thereof, "low". This, in turn, makes the inputs at both terminals 760 and 752, of XNOR gate 754, be "low" causing the output at terminal 788, thereof to be "high". Such "high" is applied to input terminal 786, of OR gate 782, causing the output at terminal 808, thereof, to be "high". The "high" from terminal 808 is applied, as via conductor means 800 and 634 to external reset pins "4" and "10", of respective I.C. timers 768 and 440, thereby taking such I.C. timers out of their reset state and allowing the I.C. timers 440 and 768 to respond to related and appropriate input signals.

As hereinbefore described, when the loading lights or lamps 24, 26, 36 and 38 are turned "on", NAND gate 648 (FIG. 5-C) initially oscillates resulting in an output at pin "9" (of I.C. timer 440) and setting of the latch, i.e., NAND gate 650 and NAND gate 652, previously described. Setting of said latch makes the output at 672 of gate 650 become "low" and the output at 700 of gate 652 become "high". The "low" output at 672 of gate 650, via conductor means 720, makes NAND gate 648 stop oscillating and to have its output at 726 be "high" in order to keep the microwave generator 498 (FIG. 5-B) operating. As far as XNOR gate 754 and OR gate 782 are concerned, the effect of setting said latch (i.e., NAND gates 650 and 652) is that the input at terminal 682 of XNOR gate 684 becomes "low" thereby making its output, at terminal 748 thereof, "high" which, as via conductor means 750, makes the input at terminal 752 of XNOR gate 754 also "high". Simultaneously, the input at terminal 702 of OR gate 704 becomes "high" (via conductor means 698) thereby resulting in the output at 736 thereof becoming "high" with such, in turn, being applied, via conductor means 742 and 756, resistor 758 and diode 762 to input terminal 760 of XNOR gate 754. Capacitor 764 must be charged to change the gate which it quickly does in the transition of "low" to "high" signals being applied to input terminal 760. During such transition diode 762 acts as an electrical short around resistor 758. With the inputs to both terminals 760 and 752 now being "high" the output at 788, thereof, becomes "high" resulting in the input at terminal 786, of OR gate 782, becoming "high" as well as the output at 808 thereof becoming "high". The "high" output at 808 of OR gate 782 maintains the reset pins "10" and "4" of I.C. timers 440 and 768, respectively, "high" thereby allowing such I.C. timers to respond to other inputs.

What may be considered the next significant event for XNOR gate 754 and OR gate 782 is the turning "off" of the loading lights or lamp assemblies 24, 26, 36 and 38. When this occurs, the input terminal 658 of NAND gate 650 becomes "low" which releases said latch (i.e., NAND gates 650 and 652) resulting in the output at 672 of gate 650 becoming "high" and the output at 700 of gate 652 becoming "low". At this time the input at 682 of XNOR gate 684 remains "low" and its output at 748 becomes "high" as does the input at 752 of XNOR gate 754 with such staying "high". However, the input at terminal 702 of OR gate 704 changes from "high" to "low".

When the output at 736 of OR gate 704 becomes "low", this immediately makes the output at 770 of XNOR gate 740 become "low" thereby triggering I.C. timer 768 and making output pin "5" thereof become "high" for approximately 4.0 seconds. At the same time, capacitor 764 starts to discharge through resistor 758 to a value equal to the "low" output at 736 of OR gate 704. In the preferred embodiment, the time constant of capacitor 764 and resistor 758 is about 100.0 ms., after which time the output at 788 of XNOR gate 754 becomes "low". Without such a delay introduced by capacitor 764 and resistor 758, the output of XNOR gate 754 could have become "low" before pin "5", of I.C. timer 768, became "high" which, if such were to happen, would have caused I.C. timer 768 to be put into external reset.

As soon as I.C. timer 768 times out, it's output on pin "5" becomes "low" as does the input at terminal 778 of OR gate 782. With inputs to both terminals 786 and 778, of OR gate 782, now being "low" the output at 808 thereof is also made "low" resulting in both I.C. timers 440 and 768 being placed in external reset thereby making them inoperative until the loading lamp assemblies 24, 26, 36 and 38 are again turned "on".

If during the shut-down phase of the entire system, Initiated by the turning "off" of the loading lights 24, 26, 36 and 38 and with the output on pin "5" of I.C. timer 768 still being "high", an object is detected in the related radiation field (106 of FIG. 3), the output on pin "9" of I.C. timer 440 will become "high". Conductor means 636 and 637 (FIG. 5-B) operatively interconnects pin "9" with the base terminal 850 of NPN transistor 846 (FIG. 5-C) as through a resistor 852. Accordingly, when the output on pin "9" becomes "high", NPN transistor 846 is turned "on" causing capacitor 836 to discharge to ground potential. When the object is no longer detected as being in the field 106, and the output on pin "9" becomes "low", transistor 846 is turned "off"

thereby allowing capacitor 836 to become charged. If no objects are detected, I.C. timer 768 times out in approximately 4.0 seconds and the entire system, comprising circuit means 340, shuts down. During such period of shut-down, as well as during the start-up period, the oscillator, comprised of AND gate 812, capacitor 828 and resistor 830, pulses the alarm means 370 "on" and "off" and likewise pulses LED 492 (FIG. 5-B) and, via conductor means 74-4, 238, 240 and 242 (FIG. 4), LED 258 and alarm means 272.

A comparator 854 (FIG. 5-C) and its associated components comprise a low-voltage (condition) alarm and shut-down means. When conductor means 74-1 (FIGS. 5-A and 5-C) and 212 become "high", in response to lamp assemblies 24, 26, 36 and 38 being turned "on" (as previously explained), NPN transistor 646 is turned "on". A filter capacitor 894 prevents transistor 646 from being turned "on" by spurious signals.

When NPN transistor 646 is thusly turned "on" a voltage divider comprised of resistors 874 and 876 is established as from a +12.0 volt supply 398 to ground potential 350. A point electrically between resistors 874 and 876 is connected to the inverting input terminal 856 of comparator 854 and a filter capacitor 884 is provided to prevent spurious inputs to be applied to terminal 856.

Another voltage divider comprised of resistor 870 and zener diode 868 is established as from a +8.0 volt supply 394 to ground potential and a point electrically between resistor 870 and zener diode 868 is connected to the non-inverting input terminal 858 of comparator 854. In the preferred embodiment the zener diode 868 has a zener voltage of 5.1 volts. The resistances of resistors 874 and 876 are selected so that a voltage appearing at the inverting input terminal 856, of comparator 854, of less than 5.1 volts is indicative of a system voltage too low for reliable operation.

With the voltage at the inverting input terminal 856 being greater than 5.1 volts, the output at 860 of comparator 854 is "low". Resistor 886 is a pull up resistor for the open collector of the comparator 854. When the magnitude of the system voltage becomes too low, the output at 860 of comparator 854 becomes "high" which, through base resistor 890 and base 888, turns NPN transistor 798 "on". Capacitor 892 is a filter capacitor functioning in the manner of capacitors 884 and 894.

With NPN transistor 798 being "on", external reset pin "4", of I.C. timer 768, is made "low" via conductor means 634 and 800, and, the external reset pin "10" of I.C. timer 440 (FIG. 5-B) is made "low" via conductor 634 and, further, the outputs at pin "5" of I.C. timer 768 (FIG. 5-C) and at pin "9" of I.C. timer 440 are also held as to be "low". Consequently, the system, comprising circuit means 340, is rendered unresponsive to detection of targets or objects. Resistor 806 limits the current flow from OR gate 782 and through the collector 794 and emitter 796, of transistor 798, to a safe value for both gate 782 and transistor 798. At this time, with the output of comparator 854 being "high" and the output at "5" of I.C. timer 768 being "low", current will flow through blocking diode 864 and resistor 779 making the input at 780, of OR gate 784, "high" and, consequently, the output at 826, of gate 784, "high". With the output of gate 784 being "high", point 639 (conductor means 638 and 822, FIG. 5-C) is pulsed by oscillator 812 and an auditory warning signal is given with such warning signal being given for as long as the system voltage is too low in magnitude and the lamp means 24, 26, 36 and 38 are turned "on".

As already indicated, in the preferred embodiment the circuitry 340 of FIGS. 5-A, 5-B and 5-C is typical for all of the assemblies 58, 56, 60 and 62 (FIGS. 2 and 3). In the description of the circuitry 340, it was assumed that such comprised a portion of assembly 58. In this respect, it may be assumed that circuitry corresponding to 340 could be operatively connected to terminal means 168 (FIG. 4) thereby being able to energize alarm means 272 and LED 252 thereby comprising a portion of assembly 56. It may also be assumed that circuitry corresponding to 340 could be operatively connected to terminal means 164 (FIG. 4) thereby being able to energize alarm means 272 and LED 254 thereby comprising a portion of assembly 60. Further, it may be assumed that circuitry corresponding to 340 could be operatively connected to terminal means 166 (FIG. 4) thereby being able to energize alarm means 272 and LED 256 thereby comprising a portion of assembly 62.

FIGS. 8, 9 and 10 illustrate radar unit 58 and such, in the preferred embodiment, is to be considered as typical of the other radar-sensor assemblies 56, 60 and 62 (FIGS. 2 and 3).

Referring in greater detail to FIGS. 8, 9 and 10, the overall radar, sensor and warning assembly 58 is illustrated as comprising an outer housing 900 having a main body 902 and a removable cover 904. In the preferred embodiment the circuitry 340 of FIGS. 5-A, 5-B and 5-C comprises a printed circuit board 906 (FIG. 10) which is suitably secured to housing 900 as by screws 908 engaging a rear wall portion 912 of body 902. The radar transceiver 498 is carried by the printed circuit board 906 as are, in the main, the other elements and/or components disclosed in FIGS. 5-A, 5-B and 5-C. For ease and clarity of disclosure only a few of such other elements and/or components are depicted, generally, at 910. The main body 902 comprises a generally inwardly situated wall-like portion 914 extending beyond the plane of a generally transverse surface 915 serving as an abutment surface against which the cover 904 is secured. The cover 904 has a recess formed therein, of a configuration as that of projecting wall portion 914. When the cover 904 is applied to body 902 the projecting wall portion 914 is received in the recess as to bear against resilient sealing means carried within such recess to thereby seal the interior of housing 900 from ambient conditions. The cover 904 is secured to housing body 902 as by screws 916—916 respectively threadably engaging apertures 918—918.

Further, in the preferred embodiment, the piezoelectric sensory warning assembly 370 (also FIG. 5-A) is carried by the front wall 920 of cover 904. In accordance with FIG. 5-A, the auditory warning means 370 is electrically connected to the components of the printed circuit board 906 by flexible electrical conductor means of a length sufficient to permit removal of the cover 904 and obtain working access to the interior of housing means 900. Passages 922, 924, 926 and 928 may be employed for respectively receiving therethrough suitable screws or bolts as for operatively securing the sensor and warning assembly 58 to related support or mounting means. Preferably, housing 900 is comprised of molded polycarbonate.

Referring in particular to FIG. 8 and 10, in the preferred embodiment, means are provided for each overall radar, sensor and warning assembly 58, 56, 60 and 62, whereby extraneous interference and signal bounce are prevented from adversely effecting reliable operation of such units 56, 58, 60 and 62. This is best illustrated in FIGS. 8 and 10 as comprising an insulating member 930 which comprises microwave absorption material. Among others, one such absorption material found effective is called "Eccosorb AN73" commercially available from Emerson & Cuming, Inc. having an address of: 869 Washington Street, Canton, Mass. Performance data of the material "Eccosorb AN73" appears in "Technical Bulletin 8-2-4" of Emerson & Cuming, Inc. bearing a United States of America copyright notice and revised date of January, 1986. As generally depicted in FIG. 8 the width of the absorption or shielding member 930, as measured from edge 930a to edge 930b, is preferably sufficient to span, in that direction, radar transceiver 498. Further, as generally depicted in FIG. 10, the absorption or shielding member 930 is preferably placed within the housing body 902 as to be generally bowed or arcuate in side view with the radar transceiver 498 being situated generally inwardly of the arcuately inner surface of shielding means 930. The absorption or shielding member 930 may be held in position within housing 900 as by suitable mechanical fastening means and/or by a suitable adhesive. An adhesive or cement could be applied as at the areas generally indicated at 9323 934 and 936 thereby holding the shielding or absorption means 930 against the inner surface portions of housing 902 and maintaining an arcuate configuration as generally depicted.

Figure 11:
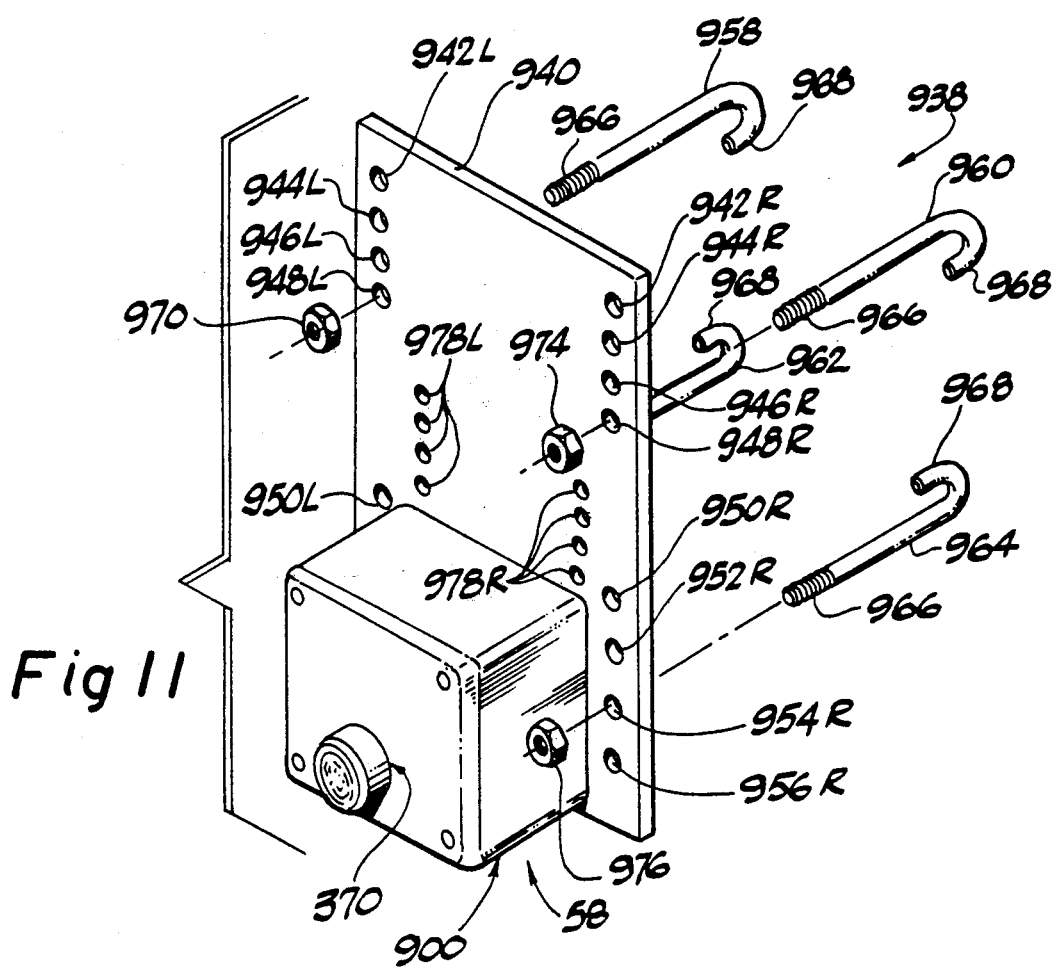
FIG. 11 is a perspective view, with certain of the elements shown in exploded fashion, of a radar and sensor unit and cooperating adjustable mounting means for detachably mounting such radar and sensor unit to the bus or vehicle of FIGS. 1, 2, 3, and 12-17.

In the preferred embodiment of the invention, the radar and/or sensor assemblies 56, 58, 60 and 62 are secured to the associated vehicle 10 as by associated mounting means. Referring in greater detail to FIG. 11, as well as to FIG. 10, the mounting means 938 is depicted as comprising a plate-like member 940, preferably comprised of aluminum, with a first plurality of vertically spaced apertures or passages 942R, 944R, 946R, 948R, 950R, 952R, 954R and 956R formed therethrough. Similarly, a second plurality of vertically spaced apertures or passages 942L, 944L, 946L, 948L and 950L (passages 952L, 954L and 956L, corresponding to 952R, 954R and 956R, being hidden by the assembly 58) are formed through plate 940.

The arrangement depicted in FIG. 11 also illustrates four "J" type bolts 958, 960, 962 and 964 each provided with a threaded shank portion 966 and a hook-like opposite end portion 968. In the preferred embodiment, the shanks of bolts 958 and 962 may be selectively received through any of apertures 944L to 956L while the shanks of bolts 960 and 964 may be selectively received through any of apertures 942R to 956R, and then respectively secured as by cooperating nuts 970, 972, 974 and 976, as to fasten the entire mounting assembly 938 and radar or sensing assembly 58 to associated structure of the bus or vehicle 10.

Figure 13:
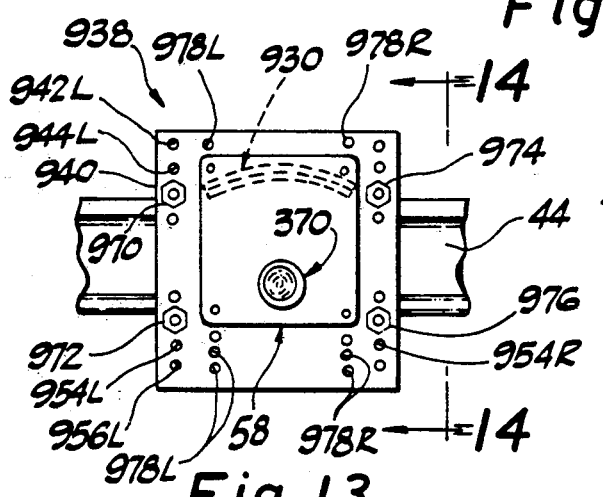
FIG. 13 is an enlarged view of a fragmentary portion of the view of FIG. 12.
Figure 16:
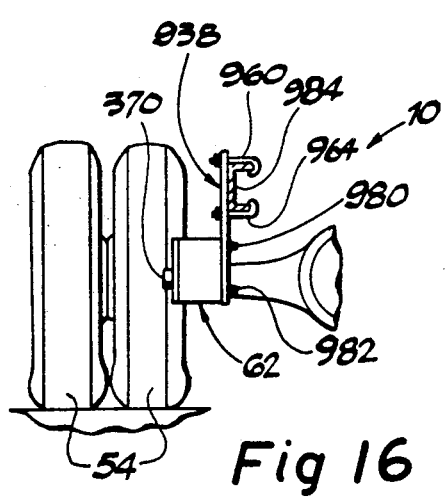
FIG. 16 is a fragmentary portion of a view taken generally on the plane of line 16—16 of FIG. 15 and looking in the direction of the arrows.

Still referring primarily to FIG. 11, the plate or mounting member 940 is also provided with two additional rows of vertically spaced apertures or passages 978R and 978L which rows may extend as generally depicted in FIG. 13. The spacing of apertures 978R and 978L (vertically as shown in FIGS. 11 and 13) is such as to match the spacing of passages or apertures 924, 928 and 922, 926 in housing 900 (FIG. 10). Consequently, suitable screws or bolts (as partly depicted at 980 and 982 of FIG. 16) may be placed into respective passages 922, 926, 924 and 928 and then extended into or through selected pairs of apertures 978L and selected pairs of apertures 978R to thereby secure the sensor assembly, as 58, at any selected location along plate 940. The plate 940 may then be selectively positioned, relative to cooperating support structure, as by use of the "J" bolts 958, 960, 962 and 964 already described.

Figure 12:
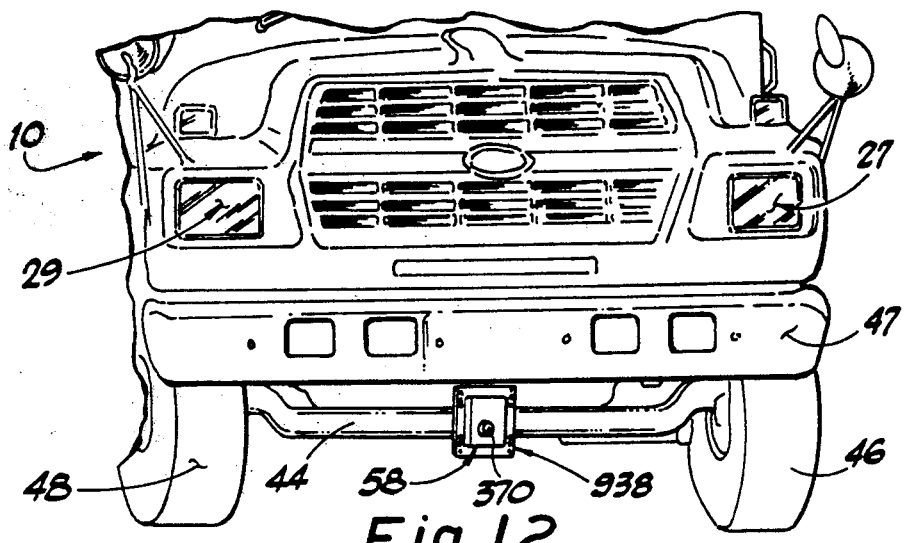
FIG. 12 is a view similar to that of FIG. 1 and illustrating the preferred location for the mounting of the forwardly functioning radar and sensor unit of the invention.
Figure 14:
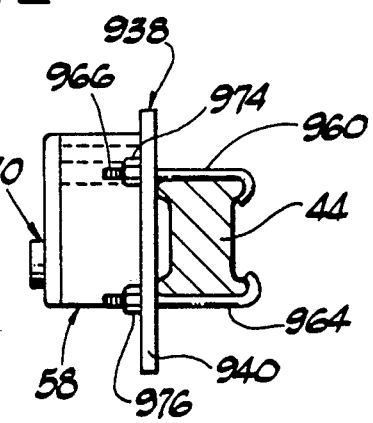
FIG. 14 is a partly cross-sectional view taken generally on the plane of line 14—14 of FIG. 13 and looking in the direction of the arrows.

FIG. 12 illustrates the preferred location of the radar and sensor assembly 58, carried by mounting means 938, as being midway between opposite sides of the vehicle 10 and, further, being supported by the front axle 44 of the bus 10 (also see FIGS. 2 and 3). FIG. 13 is a relatively enlarged view of a fragmentary portion of FIG. 12 and FIG. 14 is a view taken generally on the plane of line 14—14 of FIG. 13 and looking in the direction of the arrows.

Figure 15:
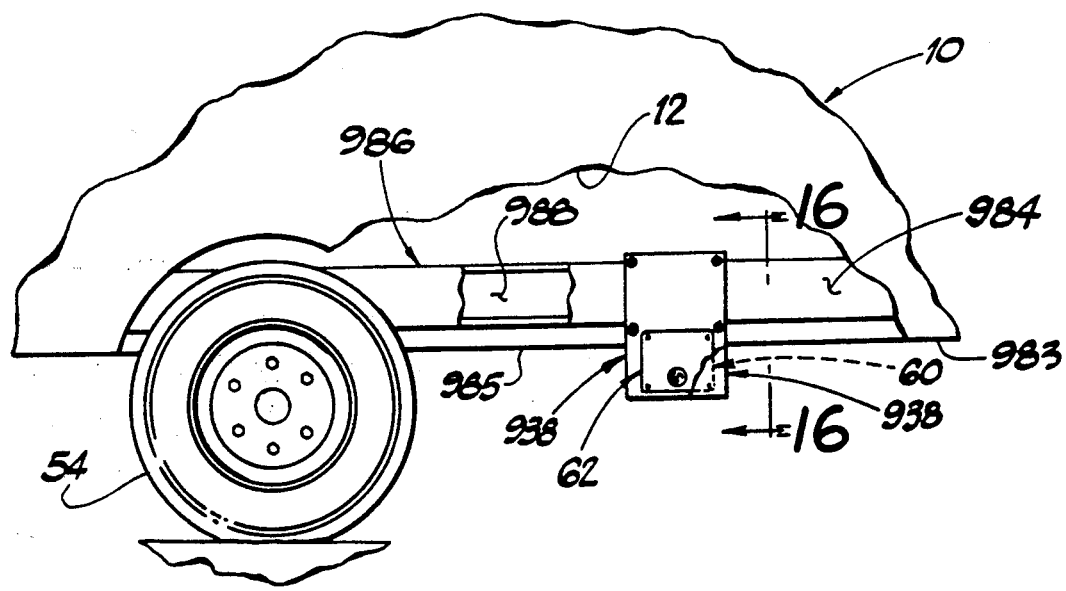
FIG. 15 is a view depicting the vehicular right-side mounting of the sensor means of the invention wherein a fragmentary portion of the vehicle is shown and, further, additional portions thereof are broken away for clarity of disclosure.

FIG. 15 depicts the right-side mounting of the sensor means. More particularly, in the preferred embodiment the radar-sensor unit 62 (also see FIGS. 2 and 3) is shown secured, through mounting means 938, to a "C" Channel portion 984 of the chassis 986 of the bus or vehicle 10. A portion of the body panel means 12, of the bus 10, is broken away to better illustrate the side mounting of radar and sensor assembly 62. A portion of the radar sensor assembly 62 and its cooperating mounting means 938 is broken away as to show a portion of radar and sensor assembly 60 (also see FIGS. 2 and 3) and its cooperating mounting means 938 secured to the opposite "C" channel portion 988 of the chassis 986.

Figure 17:
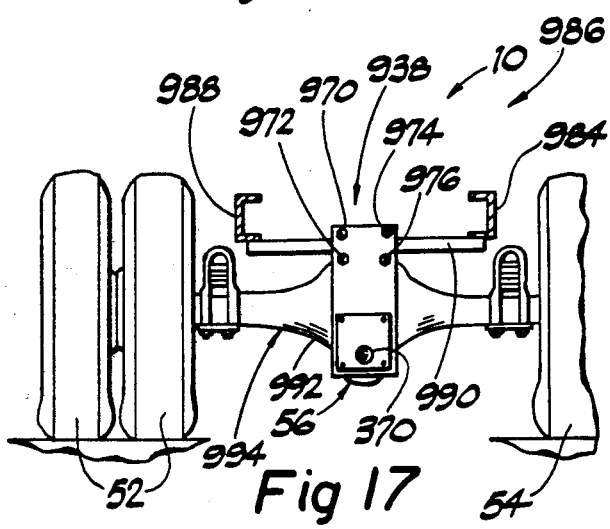
FIG. 17 is a cross-sectional view taken transversely of the longitudinal axis of bus 10 at a location generally aft of the wheel assemblies 52 and 54 and passing through the side frame members comprising a portion of the vehicular chassis.

FIG. 17 is a cross-sectional view taken transversely of the longitudinal axis of bus 10 at a location generally aft of the wheel assemblies 52 and 54 and passing through the side frame members 988 and 984. In FIG. 17 the radar and/or sensor assembly 56 (also see FIGS. 2 and 3), carried by its mounting means 938 which, in turn, as through "J" bolts and nuts 970, 972, 974 and 976, is secured to the chassis by engagement with a cross-member 990 which is secured to channel members 988 and 984.

The mounting means 938 of FIGS. 11, 12, 13, 14, 15, 16 and 17 enable the respective radar and sensor assemblies 56, 58, 60 and 62 to be selectively located, and carried by the bus 10 (or other vehicle) as to produce the radiation fields 106, 108, 110 and 112 as generally depicted in FIG. 3, without the necessity of in any way having to form mounting holes through any portion of the bus or vehicle body or through any portion of the chassis 986 or any portion of the bumpers of the bus or vehicle 10. The mounting means 938 enables the selective placement of such units onto the bus 10 without in any way effecting the structural integrity of the bus 10. In the preferred embodiment, the mounting means 938 and the respective radar transceiver assemblies 56, 58, 60 and 62 are mounted as to have the lowest portions thereof at an elevation equal to or higher than the lowest portion of the housing 992 comprising the bus drive axle assembly 994.

In the remote event that one of the assemblies 56, 58, 60 and 62 were to fail, such failed assembly: (1) in no way detracts from the continued proper operation of the remaining assemblies and (2) may be easily detached from the bus 10 and replaced by another functioning sensor assembly which could be plugged-into the related and associated circuitry as herein disclosed.

In the preferred embodiment of the invention the headlamps and tail lamps are also employed for generating signals as to motorists who are still a substantial distance away from the stopped bus 10 but who are approaching such stopped bus 10.

FIG. 2 also depicts, in simplified manner vehicular tail and/or stop light assemblies 35 and 37, as at the rear 32 of bus 10, and forwardly situated headlamp assemblies 27 and 29.

Figure 18:
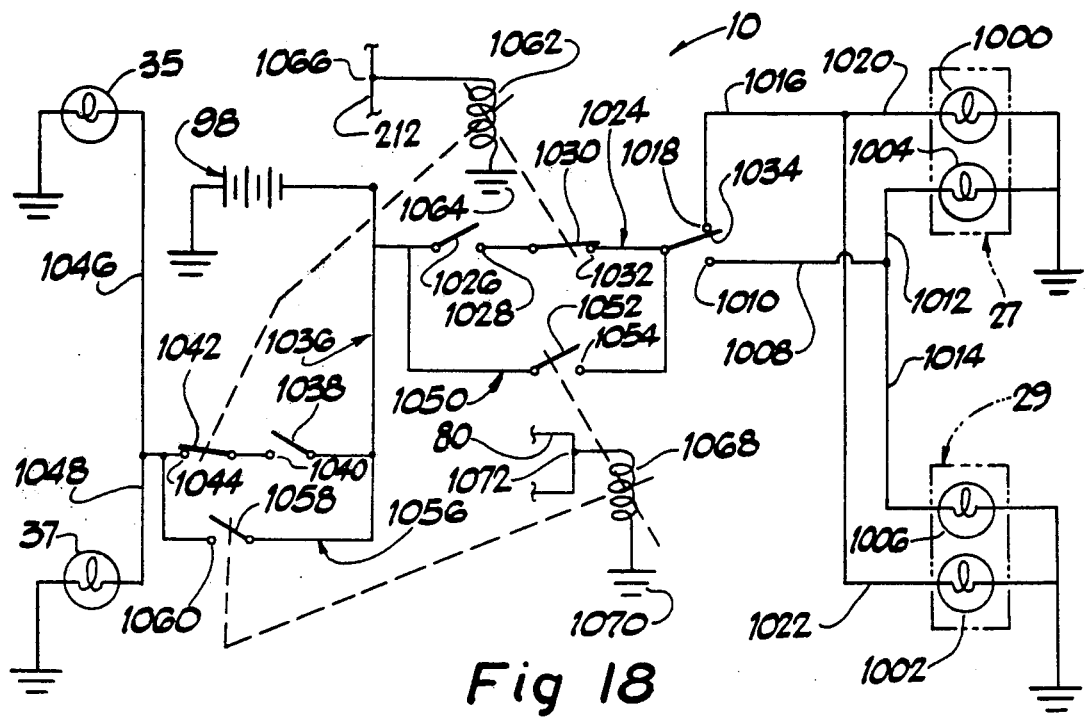
FIG. 18 is a schematic diagram of circuitry employable in the practice of the invention.

FIG. 18 schematically depicts a system whereby the headlamp assemblies 27 and 29 and the stop lamp or tail lamp assemblies 35 and 37 are made to flash "on" and "off" during periods when the bus 10 has stopped for loading and/or unloading. The headlamp assemblies 27 and 29 are each comprised of what is commonly referred to as an "upper beam" lamp or filament and "lower beam" lamp or filament. The "upper beam" lamps are depicted at 1000 and 1002 while the "lower beam" lamps are depicted at 1004 and 1006. As is well known, such "upper beam" and "lower beam" lamps or filaments may be separately packaged, thereby forming separate headlamps, or packaged within the same single headlamp. Both of such possibilities are contemplated in FIG. 18 wherein headlamp means 27 is shown as comprising 1000 and 1004 while headlamp means 29 is shown as comprising 1002 and 1006.

Still referring to FIG. 18, a conductor 1008, having a contact 1010, is connected to conductor means 1012 which is in series with lamp or filament 1004, in turn, going to ground; conductor 1008 is also connected to conductor means 1014 which is in series with lamp or filament 1006, in turn, going to ground.

Somewhat similarly, a conductor 1016, having a contact 1018, is connected to conductor means 1020 which is in series with lamp or filament 1000, in turn, going to ground; conductor 1016 is also connected to conductor 1022 which is in series with lamp or filament 1002, in turn, going to ground.

A conductor means 1024 is depicted as comprising normally open switch member 1026 and cooperating electrical contact 1028, normally closed switch member 1030 and cooperating electrical contact 1032, and, switch member 1034 for selectively closing against either contact 1010 or contact 1018. The switch means comprised of switch member 1034 and cooperating contacts 1018 and 1010 is intended to represent what is well known in the art and often referred to as a headlamp dimmer switch by which the energization of either the upper beam or lower beam headlamps is selectively made. In FIG. 18, it will be assumed that switch member 1034 is manually, by the bus driver 118, actuated to either selected position wherein a circuit is closed through contact means 1018 or through contact means 1010.

Still referring to FIG. 18, a conductor 1036 connected to the source of vehicular electrical potential 98 and comprising a normally open switch member 1038 and cooperating electrical contact 1040, and further comprising a normally closed switch member 1042 and cooperating electrical contact 1044, is connected to a conductor 1046 which is in series with tail lamp or stop lamp 35, in turn, going to ground. Conductor means 1036 is also connected to conductor 1048 which is in series with tail lamp or stop lamp 37, in turn, going to ground. The switch means comprised of normally open switch member 1038 and cooperating electrical contact 1040 is intended to represent what is well known in the art and often referred to as a vehicular stop light or brake light switch which is actuated upon manual energization of the vehicular braking system causing the stop or brake light(s) to be energized and thereby create a visual signal thereof to anyone viewing the bus or vehicle 10 as from a point aft of the rear 32 of such bus or vehicle.

Additional conductor means 1050, connected at one end as to switch member 1034 of conductor means 1024, is connected at its other end as to be in closed circuit with the source of electrical potential 98 and is depicted as comprising a normally open switch member 1052 and cooperating electrical contact 1054 thereby, effectively placing conductor means 1050, switch member 1052 and contact 1054 in parallel relationship relative to switch members 1026 and 1030 and their respective cooperating contacts 1028 and 1032.

A further additional conductor means 1056, connected at one end, as through conductor 1036, in closed circuit with the source of electrical potential 98 and at its other end connected in closed circuit with both brake lights 35 and 37, is depicted as comprising a normally open switch member 1058 and cooperating electrical contact 1060 thereby, effectively placing conductor means 1056, switch member 1058 and contact 1060 in parallel relationship relative to switch members 1042 and 1038 and their respective cooperating contacts 1044 and 1040.

A first electrical relay assembly 1062, grounded as at 1064, is connected as at a point 1066 to conductor means 212 (also shown in FIGS. 2 and 4). As illustrated, the relay assembly 1062 is operatively connected to switch members 1042 and 1030 which, are normally closed that being when relay assembly 1062 is not energized.

A second electrical relay assembly 1068, grounded as at 1070, is connected as at a point 1072 to conductor means 80 (also shown in FIG. 2). Instead of conductor means 80, any of conductor means 78, 88 and 86 (FIG. 2) may be employed to provide the connection at 1072 with relay assembly 1068.

It is to be remembered that conductors 78, 80, 86 and 88 are respectively connected to the red light lamps 24, 26, 36 and 38 for the purpose, as already described, of energizing and de-energizing such lamps 24, 26, 36 and 38 and, therefore, electrical energy is intermittently or cyclically applied to such conductors 78, 80, 86 and 88. As illustrated relay assembly 1068 is operatively connected to switch members 1054 and 1058 which are normally open, that being when relay assembly 1068 is not energized.

In the embodiment of FIG. 18, switch member 1026 represents the usual manually operated headlamp switch so that when, during usual operation of the vehicle, it is desired to have the headlamps 27 and 29 energized ("on"), the driver merely closes switch member 1026 thereby completing a circuit from source 98 of electrical power, through closed switch members 1026 and 1030, through switch member 1034, contact 1018, conductor 1016, conductors 1020 and 1022 and through lamps or filaments 1000 and 1002 and to ground.

If the dimmer switch member 1034 were positioned closed against contact 1010, the current flow would not be through 1000 and 1002 but rather through conductors 1008, 1012 and 1014 and through lamps or filaments 1004 and 1006, and to ground.

Let it now be assumed that the bus 10 is traveling and that the driver has turned "on" headlamps 1000 and 1002 by having the dimmer switch member 1034 in the position depicted and by having closed the headlamp switch member 1026.

As the bus 10 is slowing in its travel, in preparation to stop, switch 1038 is closed in response to the driver applying the vehicular brakes thereby energizing the stop lamps 35 and 37.

When the bus 10 is brought to a stop for the loading and/or unloading of passengers, as previously described, the red lamps 26, 24, 36 and 38 are caused to operate in a flashing mode, as through respective conductors 80, 78, 86 and 88 (FIG. 2). This, of course, means that such conductors will intermittently carry current to the respective red lamps. In FIG. 18, the relay 1068 is shown connected to conductor 80 even though the relay 1068 could be operatively connected to any of conductors 80, 78, 86 or 88 (or even to any other source of intermittent electrical energization as within flasher controller 76) since what is wanted is the intermittent energization of relay 1068.

Also, as already disclosed and explained, a voltage is applied to conductor means 212 (also see FIGS. 2, 4 and 5-A) whenever the red lamp assemblies 26, 24, 36 and 38 are caused to be in their flashing mode. The relay assembly 1062 is shown operatively connected to conductor means 212 thereby causing relay assembly 1062 to be energized, and remain energized, for the same length of time as conductor means 212 is supplying the voltage. When relay assembly 1062 is in its energized state, switch members 1030 and 1042 (normally closed; i.e., when relay assembly 1062 is not in its energized state) are opened by relay 1062.

Consequently, with the bus in its stopped condition and with the flasher controller 76 causing the intermittent flashing of red lamp assemblies 26, 24, 36 and 38, even if the manually actuated headlamp switch 1026 is closed and even if the driver of the bus 10 continues to manually apply the vehicular braking system causing 1038 to be closed, the circuit comprised of switch member 1026, contact 1028, and switch member 1030, contact 1032 is made electrically open by the energized relay 1062 keeping switch member 1030 electrically open.

Therefore, the only path available for current flow, from source 98 to headlamps 1000 and 1002, is through circuit means 1050. However, such current flow through circuit means 1050 is made to be intermittent as a consequence of relay assembly 1068 being intermittently energized and causing switch member 1052, as well as member 1058, to be likewise intermittently electrically closed.

In view of the foregoing, it can be seen that under the stopped condition of the bus, (loading and/or unloading), the headlamps 1000 and 1002 are made to be intermittently turned "on" and turned "off".

Further, because of switch member 1042 being held electrically open by energized relay 1062, any current to stop lamps 35 and 37 must flow, from source 98, through circuit means 1056 in which the switch member 1058 is being intermittently electrically closed and opened by intermittently energized relay 1068. Consequently, it can also be seen that under the stopped condition of the bus 10 (loading and/or unloading), stop lamps or tail lamps 35 and 37 are made to be intermittently turned "on" and turned "off".

The foregoing was described employing headlamps 1000 and 1002, by way of example, as being the headlamps which were being intermittently turned "on" and intermittently turned "off". It should now be apparent that if the switch member 1034 were to be closed against contact 1010, it would be headlamps 1004 and 1006, and not 1000 and 1002, which would be intermittently turned "on" and turned "off".

In FIG. 18, when the voltage applied to conductor means 212 ceases to be applied and when the intermittent current flow applied to conductor means 80 ceases, both relay assemblies 1062 and 1068 become de-energized resulting in switch members 1042 and 1030 being made closed and switch members 1058 and 1052 open.

Figure 19:
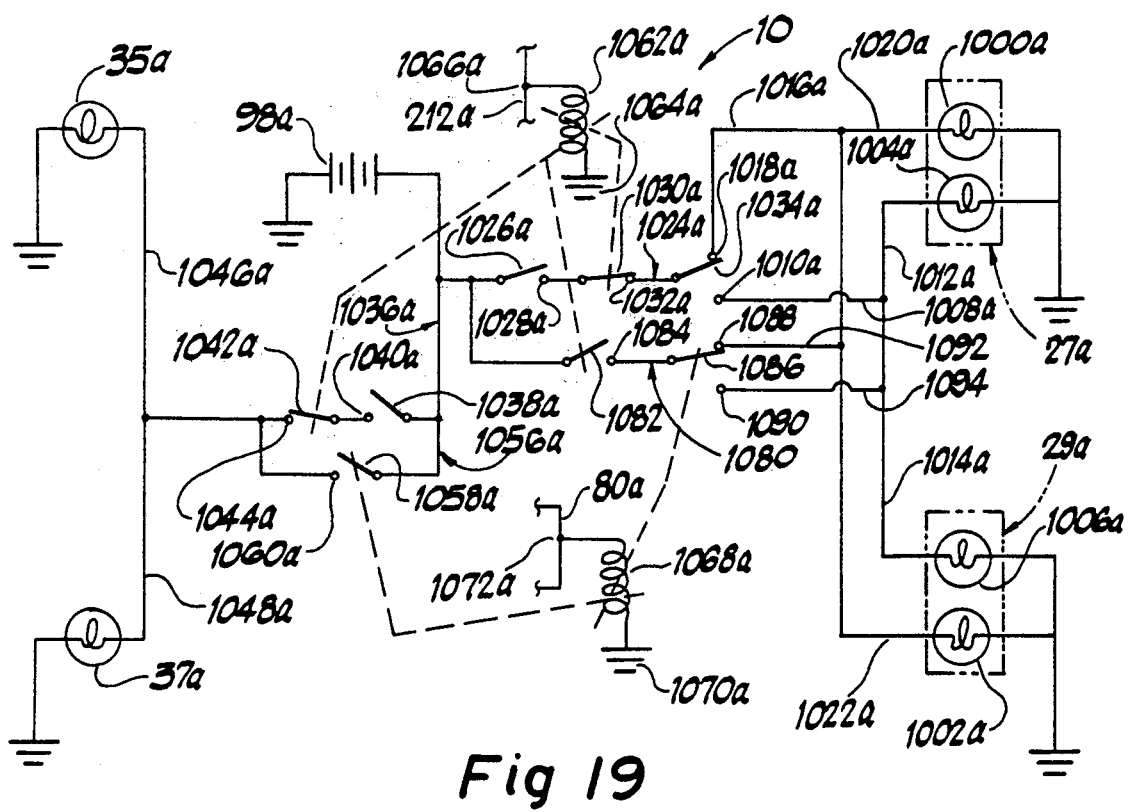
FIG. 19 is a schematic diagram of other circuitry employable in the practice of the invention.

Even though the electrical system of FIG. 18 is considered to be preferred, FIG. 19 discloses an electrical system as an alternate to that of FIG. 18 and which is also employable in practicing the invention.

In FIG. 19 all elements therein which are like or similar to those of FIG. 18 are identified with like reference numerals provided with a suffix "a".

Referring in greater detail to FIG. 19, a conductor means 1080, comprised as of normally open switch member 1082 and cooperating contact 1084 and of a switch member 1086, is arranged, generally in parallel with conductor means 1024a. Switch member 1086, as will be described, is alternately closed against contact 1088 and contact 1090. Contact 1088 is electrically connected to conductor 1022a through conductor means 1092 while contact 1090 is electrically connected to conductors 1012a and 1014a through conductor 1094.

During normal traveling, if the driver chooses to have the headlamps "on" the driver controlled headlamp switch 1026a is closed thereby completing a circuit from source 98a, conductor means 1024a, switch member 1034a, contact 1018a, conductors 1020a and 1022a, and through headlamps 1000a and 1002a to ground. Switch member 1034a being a driver positionable switch member, may be placed as depicted, or placed as against contact 1010a thereby, through conductor means 1008a, 1012a and 1014a energizing the headlamps 1004a and 1006a.

Let it now be assumed that the bus 10 is traveling and that the driver has turned "on" headlamps 1000a and 1002a by having the dimmer switch member 1034a in the position depicted and by having closed the headlamp switch member 1026a.

As the bus 10 is slowing in its travel, in preparation to stop, switch 1038a becomes closed in response to the driver applying the vehicular brakes, thereby energizing the stop lamps 35a and 37a through switch member 1042a and conductors 1046a and 1048a.

When the bus 10 is brought to a stop for the loading and/or unloading of passengers, as previously described, the red lamps 26, 24, 36 and 38 are caused to operate in a flashing mode, as through respective conductors 80, 78, 86 and 88 (FIG. 2). With the bus 10 in its stopped condition and with the flasher controller 76 causing the intermittent flashing of red lamp assemblies 26, 247 36 and 38, even if the manually actuated headlamp switch 1026a is closed and even if the driver of the bus 10 continues to apply the vehicular braking system causing 1038a to be closed, the circuit comprised of switch member 1026a, contact 1028a, and switch member 1030a, contact 1032a, is made electrically open by the energized relay 1062a keeping switch member 1030a electrically open.

Therefore, the only path available for current flow, from source 98a to headlamps 1000a and 1002a (as well as to 1004a and 1006a), is through circuit means 1080 in which the switch member 1082 has been electrically closed in response to relay 1062a being energized. However, such current flow through circuit means 1080 is made to be somewhat intermittent in that switch member 1086 is alternately closed against contact 1088 and contact 1090.

That is, as previously explained with regard to FIG. 18, relay assembly 1068a is intermittently energized and during such periods of energization relay 1068a moves switch member 1086 (from its depicted position) to an electrically closed position against contact 1090 thereby completing a circuit from source 98a through conductor means 1080, 1094, 1012a and 1014a and thereby supplying current to headlamps 1004a and 1006a which, for purposes of description are considered to be "low beam" headlamps and/or filaments. When the relay 1068a is next de-energized, switch member 1086 moves back to an electrically closed position against contact 1088 thereby completing a circuit from source 98a through conductor means 1080, 1092, 1020a and 1022a supplying current to "high beam" headlamps and/or filaments 1000a and 1002a.

In view of the foregoing, it can be seen that under the stopped condition of the bus (loading and/or unloading), the headlamps 1000a and 1002a and the headlamps 1004a and 1006a are, as pairs, alternately turned "on" and turned "off" thereby creating an effect, to anyone approaching the bus, from in front of the bus, of seeing, intermittently and cyclically, comparatively very bright lights (1000a and 1002a being energized while 1004a and 1006a are de-energized) and then lights of lesser intensity (1004a and 1006a being energized while 1000a and 1002a are de-energized).

Further, because of switch member 1042a being held electrically open by energized relay 1062a, any current to stop lamps 35a and 37a must flow, from source 98a, through circuit means 1056a in which the switch member 1058a is being intermittently electrically closed and opened by intermittently energized relay 1068a. Consequently, it can also be seen that under the stopped condition of the bus 10 (loading and/or unloading), stop lamps or tail lamps 35a and 37a are made to be intermittently turned "on" and turned "off".

As in FIG. 18, so too, in FIG. 19, when the voltage applied to conductor means 212a ceases to be applied and when the intermittent current flow applied to conductor means 80a ceases, both relay assemblies 1062a and 1068a become de-energized resulting in switch members 1042a and 1030a being made closed while switch members 1058a and 1082a are being made open.

Generally, in the preferred embodiment, the invention is activated whenever the red lights or lamp assemblies 24, 26, 36 and 38 are flashingly activated as via flasher controller means 76, and the invention continues to be in its active state for as long as the red lights or lamp assemblies 24, 26, 36 and 38 are flashingly active as through the action and control of the flasher controller means 76.

When the safety system, comprising flasher controller 76, the circuitry of FIG. 4 and the circuitry of FIGS. 5-A, 5-B and 5-C comprising respective assemblies 56, 58, 60 and 62, is initially activated, as set-out above, the safety system first goes into a self test mode the function of which is to test the microwave transceiver 498 and its associated detection circuitry (hereinafter referred to as "Test Mode"). This test lasts for approximately 1.0 second during which time the sensory signal generating means 272 as well as 370 (in each of the units 56, 58, 60 and 62) and all the LED's in the driver's read-out structure 70 are energized as to be in a continuously activated state. This period of self test is hereinafter referred to as "Test Mode Time".

Immediately following the "Test Mode Time", the safety system of the invention next goes into a scanning mode (hereinafter referred to as "Scan Time") which, in turn, is comprised of a number of phases. In what may be called the "Initial Phase" of the "Scan Time" the sensory signal generating means 272, as well as each of the sensory signal generating means 370—370 and all the LED's 252, 254, 256 and 258, in the driver's read-out structure 70 are electrically energized in a pulsed or cyclic manner, preferably at a rate of three cycles or pulses per second and, preferably, for approximately four seconds, as to thereby cause all of the signal generating means 272, 370—370, 252, 254, 256 and 258 to be cyclically turned on if (energized) and turned "off" (de-energized). This intermittent or pulsed energization of the sensory signal generators 272 and 370—370 and of the LED's 252, 254, 256 and 258 serves to inform the driver that the inventive safety system is working or operating properly.

If during the "Initial Phase", no one is detected as being in any of the "Danger Zones" 106, 108, 110 or 112, the cyclic operation of the signal generating means continues until the expiration of the said four seconds at which time the "Initial Phase" ends.

If, at the ending of the "Initial Phase", no one is detected in any of the "Danger Zones", the safety system ceases having the sensory signal generators cyclically energized and de-energized, and, consequently the sensory signal generators 272 and 370—370 become silent and LED's 252, 254, 256 and 258 become de-energized. For ease of reference, this phase of the overall "Scan Time" may be considered the "Silent Phase".

If during the silent phase no one is detected within any of the "Danger Zones", and if the loading and/or unloading of passengers is completed, energization of the flashing red lights 26, 24, 36 and 38 is terminated, as by the closure of door 16, and the safety system immediately ceases its "Silent Phase" and enters into what may be considered its "Shutting-Down Phase". In the "Shutting-Down Phase" the safety system functions in the same manner, and preferably for the same length of time, as when in its "Initial Phase". That is, upon ceasing its "Silent Phase", the sensory signal generating means 272, 370—370 and all of the LED's 252, 254, 256 and 258 are electrically energized in a pulsed or cyclic manner, preferably at a rate of three cycles or pulses per second and, preferably, for approximately four seconds thereby causing all of 272, 370—370, 252, 254, 256 and 258 to be cyclically turned "on" and turned "off". This intermittent or pulsed energization of the sensory signal generators 272 and 370—370 and the LED's 252, 254, 256 and 258 serve to indicate to both the driver and anyone externally of and in proximity to the bus, that the safety system is in its "Shutting-Down Phase" at the expiration of which (the approximate four seconds) the entire inventive safety system does become shut-down.

If during any of the phases comprising the "Scan Time", i.e., the "Initial Phase", "Silent Phase" or "Shutting-Down Phase", someone is detected as being in a "Danger Zone", the safety system immediately, appropriately, responds. For example, let it be assumed that: (a) someone is detected in "Danger Zone" 106 and (b) no one is detected in any of "Danger Zones" 108, 110 and 112. Since no one is detected in any of "Danger Zones" 108, 110 and 112, the assemblies or units 56, 60 and 62 continue to function as previously described. That is, if, at the time of detecting someone in "Danger Zone" 106, sensor assemblies 56, 60 and 62 were in any of the phases of the "Scan Time" ("Initial Phase", "Silent Phase" or "Shutting-Down Phase"), the sensor assemblies 56, 60, and 62, signal generators 260 and 370 (within 56, 60 and 62) and LED's 252, 254 and 256 would continue in that phase in the manner hereinbefore described. The only portion of the inventive safety system which alters its then existing operation or state, because of the detection of someone (assumed to be) in "Danger Zone" 106, (in this example) would be sensor assembly 58 and related portions of assembly 70 (FIG. 4) namely, warning horn or buzzer 272 and LED 258. That is, auditory signal means or buzzer 370, of sensor assembly 58, and buzzer 272, within operator read-out structure 70, would become energized in a generally continuous manner (not cyclically "on" and "off") providing non-segmented auditory signals to both the driver and to the person or persons in the assumed "Danger Zone" 106. Also, the LED 258 in the driver read-out structure 70, would be continuously energized (and not cyclically turned "on" and "off") thereby providing a visual indication, and warning, to the driver as to the location of the detected person, in this example such being "Danger Zone" 106.

The continuous (not cyclically "off "and "on") energization of buzzer 272 and of buzzer 370 and of LED 258 continues not only for so long as the detected person in assumed "Danger Zone" 106 continues to be detected, but continues for that length of time plus an additional time) preferably 1.0 to 2.0 seconds after detection of such person ceases. Such continuous energization of buzzers 272 and 370 and of LED 258, for as long as the person in the "Danger Zone continues to be detected, may be considered a "Warning Phase while the additional time of 1.0 to 2.0 seconds, immediately following the cessation of detection of such person within "Danger Zone" 106, may be considered a "Warning-Extension Phase".

The "Warning-Extension Phase" addresses itself to at least two conditions which not infrequently occur. That is, first, the person who was detected in the "Danger Zone" 106, causing sensor assembly 58 and the described sensory signal generating means to go into the "Warning Phase", may step back into the same "Danger Zone". Also, a detected child in such "Danger Zone" may drop a book or the like onto the roadway and then stop to pick up that which was dropped. In both situations at those moments the "Warning Phase" may well terminate because no movement of any object or person within that "Danger Zone" is sensed (movement being necessary for creation of the Doppler effect).

It has been found that providing the "Warning-Extension Phase" overcomes such possible erroneous sensing or rather the not-sensing of the person still in the "Danger Zone". Further, if the sensor assembly, as for example 58, is maintained in its "Warning Phase" its sensitivity to movement (within the "Danger Zone") is considerably higher than its initial sensing in detecting the presence of someone in the "Danger Zone".

When the "Warning Phase" and the "Warning-Extension Phase" are completed, the sensor assembly 58 and its related sensory signal generating means revert to the condition of said "Initial Phase" wherein buzzers 272 and 370 and LED 258 are again pulsed "on" and "off" for approximately four seconds at the expiration of which the pulsing of "on" and "off" stops and sensor assembly 58 and its related sensory signal generating means again go into its "Silent Phase".

The foregoing was presented as an example employing sensor assembly 58, its related and associated signal producing elements or components and employing the related "Danger Zone" 106. The same would apply to each of the other sensor assemblies 56, 60 and 62, along with their respective related signal producing elements and the "Danger Zones" 108, 110 and 112, respectively.

Further, let it now be assumed that the loading and/or unloading of passengers is completed and that the safety system of the invention is in its "Silent Phase". The driver then de-energizes the flashing red lights 26, 24, 36 and 38, as by closing door 16 and opening switch means 114, which eliminates the previously existing voltage signal of conductor 212, causing the safety system of the invention to change from its "Silent Phase" and go into its "Shutting-Down Phase" in which, as already described, the sensory signal generating means are cyclically pulsed preferably at a rate of three cycles per second and, preferably, for about four seconds. Also, as previously described, such "Shutting-Down Phase" serves to indicate to both the driver and anyone externally of and in proximity to the bus, that the safety system is in its "Shutting-Down Phase" at the expiration of which (the approximate four seconds) the entire inventive safety system does become shut-down.

Let it be further assumed that in the above-described "Shutting-Down Phase" a person enters one of the "Danger Zones". If this should occur, the inventive safety system senses the presence of that person in the "Danger Zone" (assumed to be 106) and immediately causes the sensor assembly 58 and its associated sensory signal generating means, as previously described, to go out of its "Shutting-Down Phase" and go into its "Warning Phase", also previously described, wherein the sensory signal generating means associated with sensor assembly 58 become continuously energized. This then warns the driver not to permit further movement of the bus until the person within that "Danger Zone" leaves the "Danger Zone". Also as previously described, as soon as the person is no longer detected in the "Danger Zone" the "Warning Phase" ends and the "Warning-Extension Phase" again begins. Following the completion of the "Warning-Extension Phase", the involved system (assumed to be sensor assembly 58 and its related sensory signal generating means) again goes into its "Shutting-Down Phase" wherein the related sensory signal generating means are again cyclically pulsed at a preferred rate of three cycles per second and preferably for four seconds, before it becomes actually shut-down.

In view of the foregoing, it should be apparent that regardless of the phase or "Time" in which, for example, sensory assembly 58 and its related sensory signal generating means may be existing, the then sensing of a person in the associated "Danger Zone" (assumed 106), will cause that portion of the inventive safety system to immediately change to its "Warning Phase" as already defined and described.

In the preferred embodiment herein disclosed, each of the sensor assemblies 58, 56, 60 and 62, and their respective associated sensory signal generating means, are effectively independent of each other and the various conditions, actions, phases, and Times hereinbefore discussed and described employing sensor assembly 58 (and its associated sensory signal generating means) as a typical example apply equally well to each of sensor assemblies 56, 60 and 62 and their respective related sensory signal generating means.

As already presented, the start of the flashing red lights 26, 24, 36 and 38 creates the electrical signal via conductor means 212 to cause the safety system of the invention to enter into its operating mode. That electrical signal may be generated as a consequence of the driver opening door 16 and thereby closing switch 114 or, in some vehicles no such switch 114 is presented for actuation by the door 16 and instead, separate switch means are situated in proximity to the driver for direct actuation by the driver. It should be obvious that the practice of the invention is not limited to either of such buses or vehicles and will operate equally well in both of such environments.

As should be apparent, proper operation of the inventive safety system requires proper voltage. As has been disclosed, proper voltage is achieved in two ways. A step-up voltage supply is preferably located in the driver's module or read-out structure 70 and is distributed via 214 to each of the sensor assemblies 56, 58, 60 and 62 each of which comprise the circuitry of FIGS. 5-A, 5-B and 5-C.

If the bus supply voltage drops below 12.0 volts, the step-up supply via 214 continues to supply 12.0 volts to the assemblies 56, 58) 60 and 62. Under extremely low voltage conditions, however, even the step-up supply via 214 may be unable to produce adequate voltage. Internally situated within each assembly 56, 58, 60 and 62, there is an 8.0 volts regulator 348 (FIG. 5-A) which is supplied from the 12.0 volts of the step-up supply (FIG. 4). This 8.0 volts (FIG. 5-A) supplies all of the electronics except the circuits which drive the auditory signal generators 272 and 370 and the LED's 252, 254, 256 and 258. A low voltage detection circuit is incorporated into each of the radar sensor assemblies 56, 58, 160 and 62. When it is detected that adequate voltage is not available for reliable operation of a radar generator and receiver means, the sensory signal generators 272 and 370 and said LED's are electrically cyclically pulsed at a rate of three cycles per second with such continuing for as long as the low voltage condition exists and the flasher controller 76 is activated.

In the preferred embodiment, the respective "Danger Zones" 106, 108, 110, and 112 are really determined by the respective radar transceivers in the assemblies 56, 58, 60 and 62. That is, such zones or areas depict the respective fields of radiation produced by the related radar transceivers 498. The size and to some degree the shape of the fields of radiation ("Danger Zones") may be selectively established by manual adjustment of either potentiometers 512 or 586 (both of which are located in each of the assemblies 56, 58, 60 and 62) thereby adjusting, in effect, the sensitivity of each of such radar transceivers 498.

Through experience, it has been determined that the sensor assemblies 56, 58, 60 and 62 will not provide accurate signals if such are mounted generally externally of the bus body, such as on grilles, bumpers or on front, rear or side body panels. Therefore, in the preferred modular embodiment of the invention, such modular sensor assemblies 56, 58, 60 and 62 are mounted onto the bus in manners as disclosed in FIGS. 11, 12, 13, 14, 15, 16 and 17 whereby the path of radiation is actually at a level or elevation below the lower edges 983 and 985 of the body panels as well as below the bumper 47.

If a bus has only red flasher lights, the safety system of the invention will become active only when the red flasher lights start flashing. Whether a bus has a four light, or an eight light warning system, there is no difference in how the inventive safety system will work.

In the embodiment disclosed, the driver read-out structure 70 has been illustrated as an assembly which is added to the instrument and control panels previously provided in the bus. It should be apparent that a functionally equivalent read-out structure 70 may be integrally formed as in the original instrument and/or control panels of the bus for viewing by the driver.

Although not specifically disclosed, it is also contemplated that the switch for energizing and de-energizing the windshield wipers of the bus could be interconnected as to, for example, conductor means 212 to thereby cause conductor means 212 to become electrically open in the event a very heavy rain should be experienced which would cause a bounce-back of the radar waves, off of the rain, thereby creating a signal as if a person or persons were within one or more "Danger Zones" when in fact no one was in any "Danger Zone."

Figure 20:
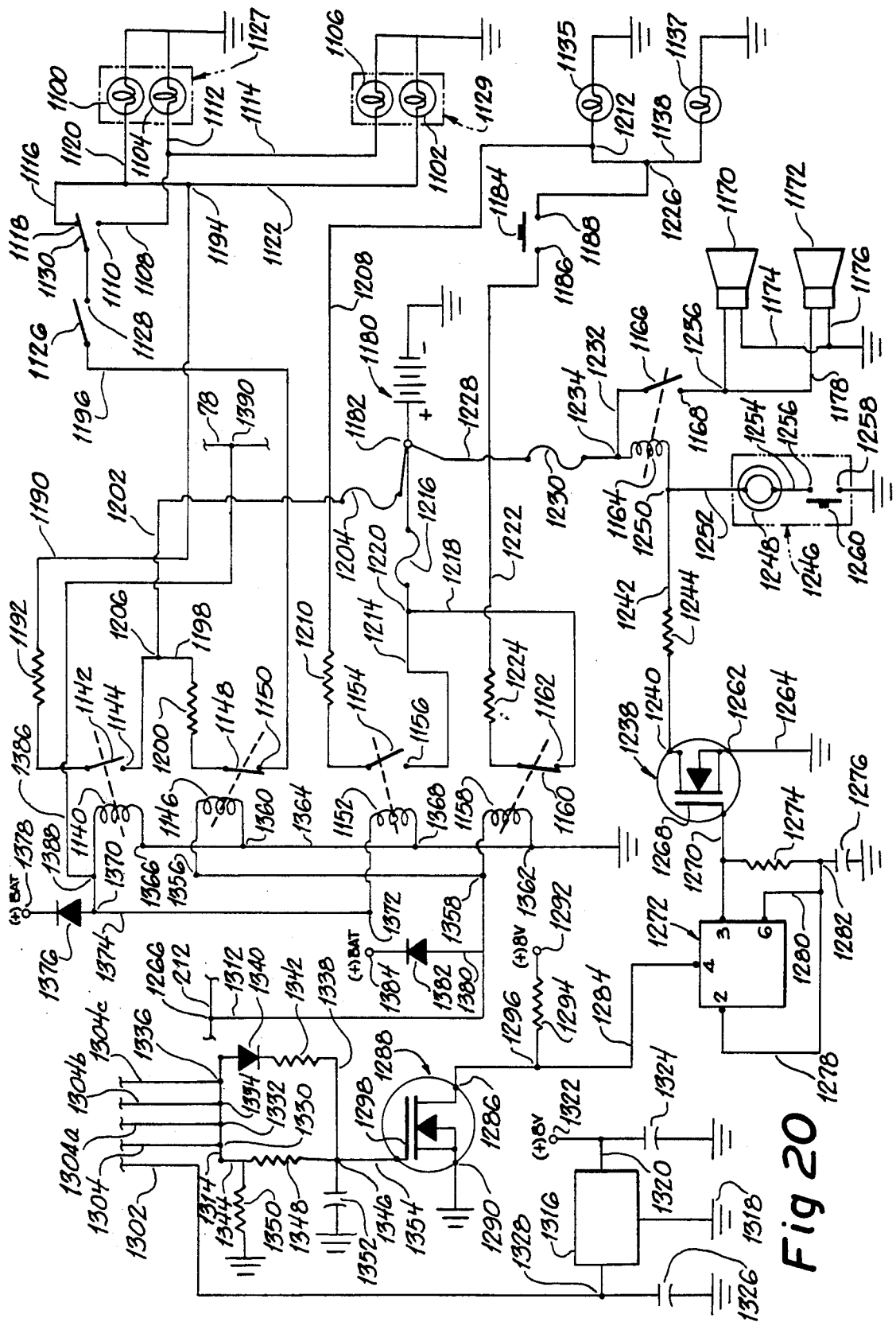
FIG. 20 is a schematic diagram of circuitry of a further embodiment of the invention.

FIG. 20 schematically depicts still another system, contemplated by the invention, wherein not only do the headlamps and stop lamps or tail lamps flash "on" and "off" during periods when the bus 10 has stopped for loading and/or unloading, but also the usual traffic warning horn, or the like, is made to be cyclically energized during such periods of loading and/or unloading.

Referring in greater detail to FIG. 20, the headlamp assemblies 1127 and 1129 are each preferably comprised of what is commonly referred to as an "upper beam" lamp or filament and "lower beam" lamp or filament. The "upper beam" lamps are depicted at 1100 and 1102 while the "lower beam" lamps are depicted at 1104 and 1106. As is well known, such "upper beam and "lower beam" lamps or filaments may be separately packaged, thereby forming separate headlamps, or packaged within the same single headlamp. Both of such possibilities are contemplated in FIG. 20 wherein headlamp means 1127 is shown comprising 1100 and 1104 while headlamp means 1129 is shown as comprising 1102 and 1106.

Still referring to FIG. 20, a conductor 1108, having a contact 1110, is connected to conductor means 1112 which is in series with lamp or filament 1104, in turn, going to ground; conductor 1108 is also connected to conductor means 1114 which is in series with lamp or filament 1106, in turn, going to ground.

Somewhat similarly, a conductor 1116, having a contact 1118, is connected to conductor means 1120 which is in series with lamp or filament 1100, in turn, going to ground; conductor 1116 is also connected to conductor means 1122 which is in series with lamp or filament 1102, in turn, going to ground.

A conductor means 1196 is depicted as comprising normally open switch member 1126 and cooperating electrical contact 1128 along with a switch member 1130 which can be selectively closed against contacts 1110 and 1118. The switch member 1130 and cooperating contacts 1118 and 1110 are intended to represent what is well known in the art and often referred to as a headlamp dimmer switch by which the energization of either the upper beam or lower beam headlamps is selectively made. In FIG. 20, it will be assumed that switch member 1130 is manually, by the bus driver 118, actuated to either selected position wherein a circuit is closed through contact means 1118 or through contact means 1110.

Still referring to FIG. 20, the tail lamps or stop lamps 1135 and 1137 are depicted as being electrically interconnected as by conductor means 1138 with each of such lamps 1135 and 1137 also going to ground.

A plurality of schematically illustrated relay switch assemblies are provided. A first relay is shown as comprising a relay coil 1140 and controlled switch member 1142 which is normally electrically open. When coil 1140 is energized, switch member 1142 is caused to be closed against cooperating contact 1144. A second relay is shown as comprising a relay coil 1146 and controlled switch member 1148 which is normally electrically closed as against cooperating contact 1150. When coil 1146 is energized, switch member 1148 is caused to become open by moving away from contact 1150. A third relay is shown as comprising a relay coil 1152 and controlled switch member 1154 which is normally electrically open. When coil 1152 is energized, switch member 1154 is caused to be closed against cooperating contact 1156. A fourth relay is shown as comprising a relay coil 1158 and controlled switch member 1160 which is normally electrically closed against cooperating electrical contact 1162. When coil 1158 is energized, switch member 1160 is caused to become open by moving away from contact 1162. A fifth relay is shown as comprising a relay coil 1164 and controlled switch member 1166 which is normally electrically open. When coil 1164 is energized, switch member 1166 is caused to be electrically closed against cooperating contact 1168.

In the preferred embodiment, two or more horns 1170 and 1172, comprising, for example, the normal complement on or in the bus 10, each go to ground as via conductors 1174 and 1176 and, further are interconnected by conductor means 1178 through which energization of such horn means is achieved.

A source of vehicular carried electrical potential such as battery means 1180 is shown having its negative terminal grounded and a positive output terminal, or the like, as at 1182.

The illustrated normally open electrical switch member 1184 and cooperating contacts 1186 and 1188 are intended to depict the bus driver's manually actuated, brake lamp or tail lamp, switch means so that whenever the vehicular brakes are being applied switch member 1184 will be electrically closed against contacts 1186 and 1188.

Conductor means 1190, comprising resistor means 1192, is electrically connected to switch member 1142 and to conductor 1122 as at 1194.

Conductor means 1196 electrically interconnects contact 1150 and switch member 1126. Conductor means 1198, comprising resistor means 1200, electrically interconnects contact 1144 and switch member 1148. Conductor means 1202, preferably comprising a fuse 1204, is electrically connected to the terminal 1182 of battery 1180 and to conductor means 1198 as at 1206 electrically generally between resistance 1200 and contact 1144.

A conductor 1208, comprising resistor means 1210, is electrically connected to switch member 1154 and to conductor 1138, as at 1212, leading to stop or tail lamps 1135 and 1137.

A conductor 1214, preferably comprising a fuse 1216, electrically interconnects contact 1156 and battery terminal means 1182.

A conductor 1218 electrically interconnects contact 1162 to conductor 1214 as at a point 1220 generally electrically between contact 1156 and fuse 1216.

A conductor 1222, comprising resistor means 1224 and switch contacts 1186 and 1188, is electrically connected to switch member 1160 and to conductor 1138 as at 1226.

A conductor 1228 preferably comprising a fuse 1230, electrically interconnects battery terminal means 1182 to one electrical end of relay coil 1164. A conductor 1232, and comprising relay actuated switch member 1166 and contact 1168, is electrically connected to conductor 1228 as at a point 1234, electrically generally between fuse 1230 and relay coil 1164, and to conductor 1178 as at a point 1236.

A field-effect transistor 1238 has its drain 1240 connected to conductor means 1242, comprising resistor means 1244, which is also electrically connected to the other end of relay coil 1164. The field-effect transistor 1238 may be of the type or model MTP3055EL.

The bus driver's manually actuated vehicular horn button arrangement is schematically depicted at 1246. A slip contact ring 1248, as may be carried by the vehicular steering wheel assembly, is electrically connected to conductor 1242, as at a point 1250 generally electrically between relay coil 1164 and resistor 1244, by conductor means 1252. The slip ring contact 1248 is also connectable to ground via conductor means 1254 which comprises electrical contacts 1256 and 1258. The normally open switch member 1260 is actuated by the vehicular driver, when desired, as to close the circuit through contacts 1256 and 1258.

A source terminal 1262, of field-effect transistor 1238, is brought to ground as via conductor means 1264. The gate 1268 of transistor 1238 is connected, as via conductor means 1270, to terminal or pin "3" of an integrated circuit (I.C.) device 1272. In the preferred embodiment, device 1272 is a CMOS version of a "555" type timer which, when electrically connected as shown, becomes an oscillator circuit with the time constant being determined by a resistor 1274 and capacitor 1276 connected to ground and, as depicted, to conductor 1270. The I.C. device 1272 may be the generally well known type LMC555 integrated circuit manufactured by and commercially available as from Texas Instruments Incorporated of Dallas, Tex. Another source of such I.C. timers or oscillators may include National Semiconductor Co. of Santa Clara, Calif.

As shown, terminals or pins "2" and "6" of I.C. oscillator 1272 are electrically connected, as via conductor means 1278 and 1280, to and between resistor 1274 and capacitor 1276 as at a point 1282. Terminal or pin "4" of oscillator 1272 is electrically connected, as via conductor means 1284, to the drain terminal 1286 of a field-effect transistor 1288 which has its source terminal 1290 to ground. A terminal 1292, at +8.0 volts is electrically connected through a resistor 1294 to both drain terminal 1286 and pin "4" of oscillator 1272 as by its depicted connection, as at 1296, to conductor means 1284.

A plurality of electrical conductors are shown as at 1302, 1304, 1304a, 1304b, 1304c and 1312. Conductor means 1302 leads to integrated circuit (I.C.) voltage regulator means 1316 grounded as at 1318 and having output conductor means 1320 which, in turn, is electrically connected as between terminal means 1322, providing a regulated +8 volt supply, and one electrical side of capacitor means 1324. A capacitor 1326 electrically connected to conductor means 1302, as at 1328, leads to ground. The voltage regulator may be type (or model) 78L08 readily commercially available.

Conductors 1304, 1304a, 1304b and 1304c are each respectively connected to conductor means 1314 as at 1330, 13327 1334 and 1336. Further, a conductor means 1338 comprising a diode 1340 and resistor 1342 is electrically connected at one end to conductor 1314 and, at its other end, connected to a conductor means 1344, as at 1346, with such conductor 1344 comprising resistance means 1348 and, at its other end, connected to conductor 1314. A resistor 1350 having one end at ground, is electrically connected to conductor means 1344 as at a point generally between resistor 1348 and connection 1330. Also, a capacitor 1352, connected as to point 1346, leads to ground. Gate 1298 of transistor 1288 is electrically connected, as via conductor means 1354, to point 1346.

Conductor 1312 is electrically connected to respective one electrical ends of relay coils 1146 and 1158 as at 1356 and 1358. The other electrical ends of relay coils 1146 and 1158 are respectively connected as at 1360 and 1362 to a conductor means 1364 leading to ground. Relay coils 1140 and 1152 also have their respective one ends 1366 and 1368 connected to ground, as via conductor 1364, while their respective other ends 1370 and 1372 are connected to conductor means 1374 which, comprising a diode 1376, is electrically connected, as via 1378, to the battery terminal means 1182. Similarly, a conductor means 1380, comprising a diode 1382 and connected to conductor means 1312, is electrically connected, as via 1384, to the battery terminal means 1182.

A further conductor means 1386 is electrically connected, as at 1388, to the one end 1370 of relay coil 1140 and, via conductor means 1374, to end 1372 of relay coil means 1152. The other end of conductor 1386 is depicted as being electrically connected to conductor 78 (also see FIGS. 2 and 4) as at 1390. As previously described, conductor means 78 becomes cyclically energized causing the external warning lamp 24 of the bus to be cyclically energized. Instead of conductor 78, any of conductor means 80, 827 847 862 88, 90 or 92 could be employed for providing the pulsed or cyclic voltage to conductor 1386. The end of conductor means 1312 is electrically connected to point or terminal 1266 as to be energized with the energization of conductor 212. As previously described, conductor 212 (FIGS. 2 and 4) becomes energized and stays energized, as at +12.0 volts, during the time that bus door 16 is open for loading and unloading.

Figure 21:
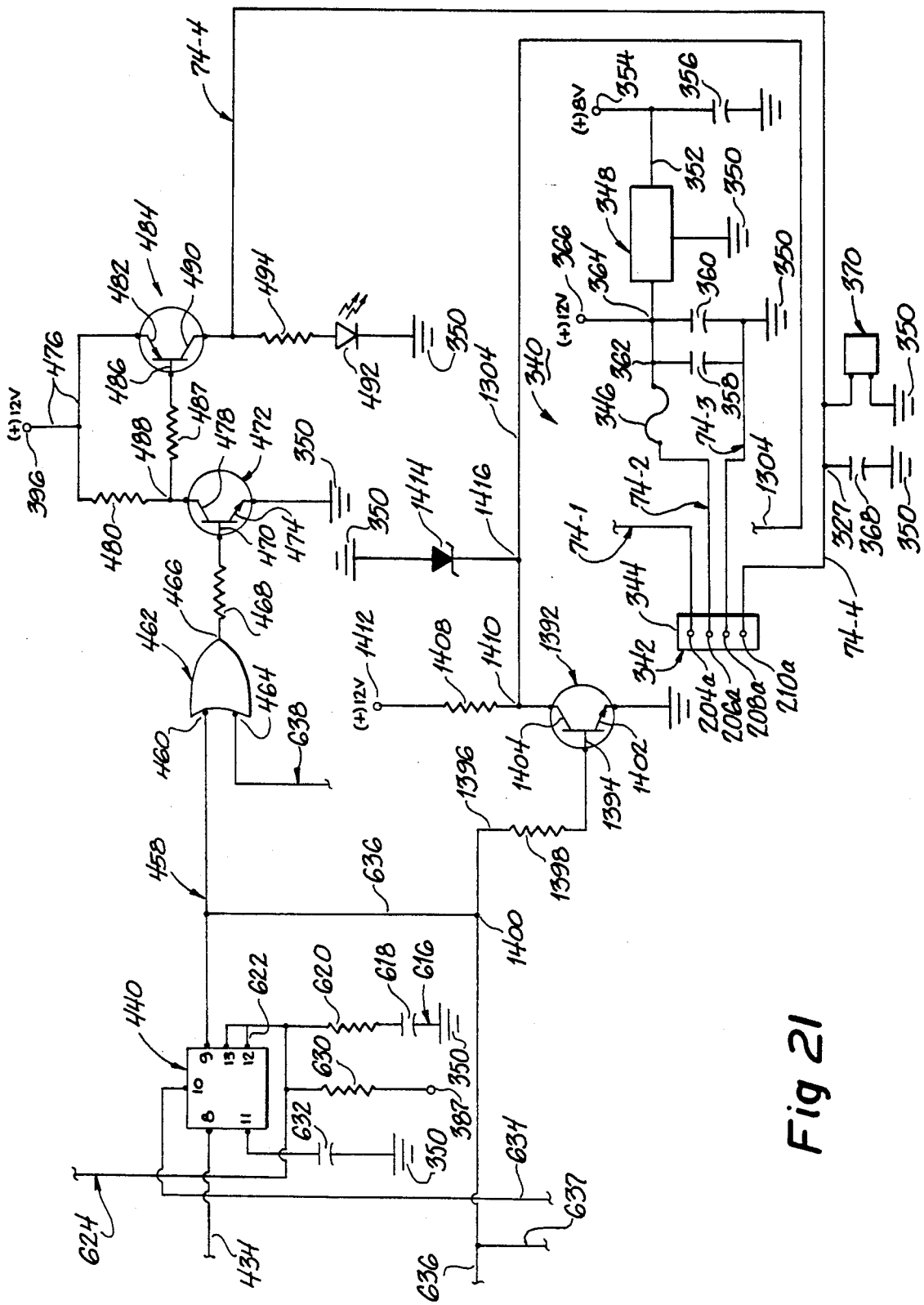
FIG. 21 is a schematic diagram of circuitry employable in combination with the circuitry of FIG. 20.

FIG. 21 is a schematic wiring diagram illustrating portions of the wiring diagram of FIG. 5-A and of FIG. 5-B along with additional circuitry employable as in combination with that of FIG. 20.

Referring in greater detail to FIG. 21, the elements thereof which correspond to such portions of FIGS. 5-A and 5-B are identified with like reference numbers and the operations and relationships thereof are as already herein described.

An NPN transistor 1392 has its base terminal 1394 electrically connected to conductor means 1396, which comprises resistor means 1398, electrically connected as at 1400 to conductor means 636. The emitter 1402 is at ground while the collector 1404 is connected to conductor means 1304. A resistor 1408 has one electrical end connected to conductor means 1304, as at 1410, and has its other end connected as to terminal 1412 which, connected to a suitable source, is at +12.0 volts potential. A zener diode 1414, connected to conductor means 1304 as at 1416, goes to ground 350. Conductor 1304 (continued in FIG. 20) is connected to conductor 1314 at 1330.

Still referring to FIG. 21, resistors 1398 and 1408 and transistor 1392 comprise inverting buffer amplifier which provides a logic "low" whenever pin "9" of timer 440 is "high". The buffer amplifier is employed in order to provide a low impedance to conductor means 1304 which is exposed to electrical noise from the electric system of the bus 10. The buffer prevents any electrical noise on conductor 1304 from getting back into the detector circuitry of FIGS. 5-A, 5-B and 5-C, and, such buffer also reduces the amplitude of any such noise on conductor 1304 which goes to the circuitry of FIG. 20.

Pin "9" of timer 440 is "high" when a person is sensed as being within the associated monitored danger zone. Referring to FIG. 21, it can be seen that pin "9" is electrically connected to base terminal 1394 of NPN transistor 1392. Therefore, when pin "9" is "high" transistor 1392 is turned "on" and because emitter 1402 is to ground, conductor means 1304 is made to be "low".

However, when pin "9" of timer 440 is a logic "low", transistor 1392 is turned "off" and conductor means 1304 is brought, through resistor 1408, to +12.0 volt source 1412. When transistor 1392 is "off" the voltage on conductor means 1304 is limited to 5.0 volts by zener diode 1414 in order to thereby prevent an excessive voltage on conductor means 1304 from damaging any of the logic devices which may be connected to conductor means 1304.

The circuitry of FIG. 21, of course, is repeated for each of the radar assemblies employed. The circuitry of FIG. 21, with conductor means 1304, relates to the forward radar assembly 58, as generally depicted in FIGS. 1, 2 and 3.

Conductors 1304a, 1304b and 1304c (FIG. 20) would each be functionally equivalent to conductor 1304 but respectively comprising circuits as shown in FIG. 21 (as well as FIGS. 5-A, 5-B and 5-C) associated with the other radar-sensor assemblies. For example: conductor means 1304a may be part of the circuitry of or for radar-sensor (detector) assembly 56; conductor means 1304b may be part of the circuitry of or for radar-sensor (detector) assembly 60 and conductor means 1304c may be part of the circuitry of or for radar-sensor (detector) assembly 62.

Referring primarily to FIG. 20, if any one of the conductor means 1304, 1304a, 1304b or 1304c is "low", conductor 1314 will also be "low". As already described, conductor 1304 is "low" when a person is detected within the associated danger zone. The same, of course, applies to each of conductor means 1304a, 1304b and 1304c. When a person is thusly detected, the horn means 1170 and 1172 of bus 10 are energized in a pulsed manner.

The output at pin "3", of oscillator 1272, is a square wave with a frequency of 1.0 Hz. The gate 1268 of field-effect transistor 1238 is connected to pin "3" so that when pin "3" is "high" the drain terminal 1240 of transistor 1238 is "low" causing one end of horn relay coil 1164 to go to ground (via 1262) 1264 and 1266) thereby closing normally open switch 1166 and energizing horn means 1170 and 1172 for creating a relatively loud audible signal. Of course, when pin "3" is low", the drain terminal 1240 of transistor 1238 is "high" and opposite ends of the horn relay coil 1164 are "high" thereby causing switch member 1166 to be in its normally open position or condition and horns 1170 and 1172 to be de-energized.

Even when the switch 1166 is in its normally open position, the bus operator can energize horns 1170 and 1172 by closing switch member (horn button) 1260 thereby causing current flow through horn relay coil 1164, conductor 1252, ring contact 1248, contacts 1256 and 1258 to ground. Such current flow closes switch member 1166 energizing horns 1170 and 1172 for as long as contact or switch 1260 is held closed.

Pin "4" of oscillator 1272 is a reset. When pin "4" is "high" the oscillator 1272 will oscillate (the square wave of pin "3" being thereby produced). When pin "4" is "low" the oscillator will not oscillate.

Assuming the condition to be one wherein no person is detected in any of the established danger zones, all of conductor means 1304, 1304a, 1304b and 1304c will be "high", as will conductor 1314, and capacitor 1352 becomes charged to 5.0 volts through diode 1340 and resistors 1342 and 1348. Consequently, gate 1298 causes the field-effect transistor 1288 to be turned "on" with pin "4" of oscillator 1272 effectively being brought to ground as via conductor 1284, drain 1286 and source 1290 and thereby preventing oscillator 1272 from oscillating.

When next a person is detected in any of the defined danger zones, the conductor means associated with such danger zone (i.e., 1304, 1304a, 1304b or 1304c) becomes "low", as does conductor means 1314, resulting in capacitor 1352 discharging through resistors 1348 and 1350; discharge through resistor 1342 is prevented by diode 1340. The discharge time constant is such that transistor 1288 turns "off" in about 2.0 seconds 1292 resistor 1294 and conductor means 1284, becomes "high".

When the conductor means 1304, 1304a, 1304b or 1304c, which previously went "low", again becomes "high" (indicating no person within the danger zones), capacitor 1352 is charged, primarily through diode 1340 and resistor 1342 with a time constant of 0.01 seconds. In the preferred embodiment of FIGS. 20 and 21, the purpose of having a comparative delay in the turning "off" of transistor 1288 is to prevent the horns 1170 and 1172 from being energized during the hereinbefore defined "Initial Phase" and "Shutting-Down Phase".

Now, regarding the headlamp assemblies and tail lamp assemblies of FIG. 20, it can be seen that switch members 1142 and 1154 are each normally open and that switch members 1148 and 1160 are normally closed. Switch 1126, to the headlamp assemblies, is any manually operated switch, closed and opened by the driver 118 of the vehicle 10. When switch 1126 is closed, a circuit is completed as from terminal 1182, through conductor means 1202 to 1206, through resistor 1200, normally closed switch 1148, conductor 1196, manually closed switch 1126, through switch 1130 and, if in the position depicted, through conductor 1116 and conductors 1120 and 1122 energizing upper beam headlamps 1100 and 1102. If the beam (or brightness) selector switch 1130 were to be closed against contact 1110, then lower beam headlamps 1104 and 1106 would have been energized via conductor means 1108, 1112 and 1114.

When the driver of the vehicle 10 prepares to bring the vehicle 10 to a stop, the driver applies the vehicular brakes causing switch member 1184 to be closed against contacts 1186 and 1188. Consequently, a circuit is completed as from terminal 1182 through conductor 1214 to 1220, along conductor 1218 and normally closed switch 1160, through resistor 1224, conductor 1222, through then closed switch 1184 and, via 1226 and conductor 1138, energizing tail lamps 1135 and 1137.

Now, let it be assumed that the manually actuated headlamp switch 1126 is open and that the vehicle 10 is at rest (stopped) with the driver 118 holding the vehicular brakes applied thereby maintaining tail lamp switch 1184 closed.

As previously described, when the controller 76 is actuated and the loading lights are cyclically energized, conductor means 78 carries a pulsed voltage while conductor means 212 becomes continuously energized. As depicted in FIG. 20, a conductor means 1386 suitably connected as at point 1390 to conductor means 78 (or any other suitable source of such pulsed voltage) in turn connected as at 1388 to relay coil 1140 provides, in a pulsed fashion, current flow through relay coil 1140 and through conductor means 1364 to ground.

Relay coil 1140, being intermittently energized, causes normally open switch 1142 to be accordingly closed and opened thereby sequentially completing and opening the circuit from source 1182, through conductor 1202, to point 1206, through contact 1144, switch member 1142, conductor means 1190, point 1194 and, in the preferred embodiment, headlamps 1100 and 1102 of assemblies 1127 and 1129. During this time, as previously described, conductor 212 is made continuously energized resulting in relay coils 1146 and 1158 being continuously energized and respective switch members 1148 and 1160 being made open. Consequently, while switch member 1142 is being cyclically opened and closed, switch member 1148, being held open, prevents current flow through conductor means 1196 and through switch member 1126 (if closed) and switch member 1130 to either conductors 1116 or 1108. This would continue until, as previously described, conductor 212 ceased to be energized and the voltage pulses, as at 1390, ceased to be provided.

Still assuming the vehicle 10 to be at rest (stopped) with the driver holding the vehicular brakes applied, tail lamp switch 1184 will be closed. During this stopped condition, as previously described with reference to FIGS. 2 and 4, for example, conductor means 78 carries a pulsed voltage while conductor means 212 becomes continuously energized. Consequently, relay coil 1152 is cyclically energized, via conductors 1386 and 1374, causing switch member 1154 to be accordingly cyclically closed and opened. During this time, relay coil 1158 is continuously energized, via 212, 1312 and 1358, thereby holding switch member 1160 continuously open. Because of switch member 1160 being held open, the circuit through switch 1184 is opened even though the driver of vehicle 10 continues to hold switch 1184 against contacts 1186 and 1188. As switch member 1154 is cyclically closed, a circuit is completed from source 1182 through conductor 1214 (conduction through 1218 being prevented by open switch member 1160), cyclically closed switch member 1154, conductor 1208 and resistor 1210 to conductor 1138, as at 1212, and through tail lamps 1135 and 1137. Of course, when switch member 1154 is cyclically opened, such circuit through conductor means 1208 is also open and tail lamps 1135 and 1137 are de-energized. This would continue until, as previously described, conductor 212 ceased to be energized and the voltage pulses, as at 1390, ceased to be provided.

Figure 22:
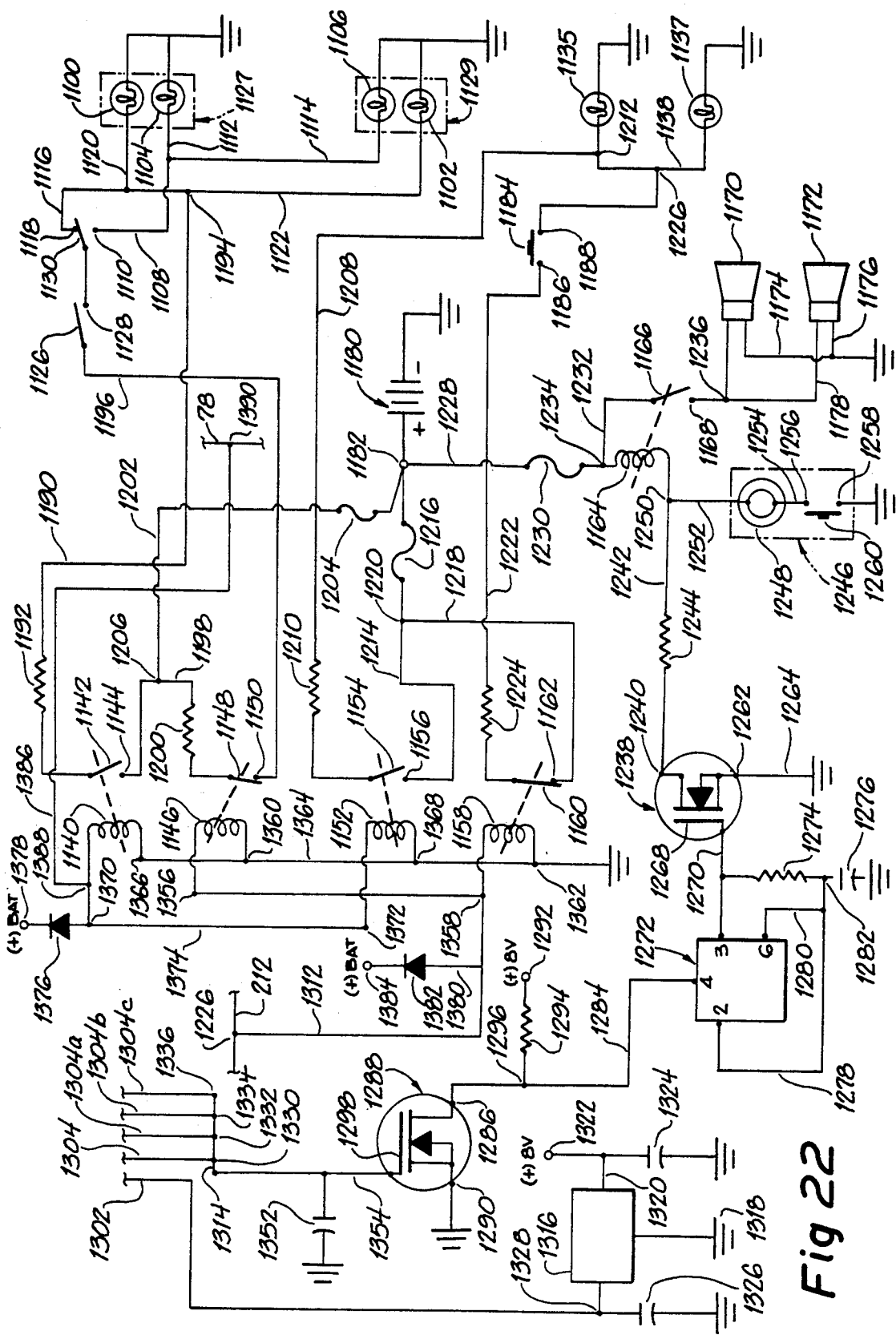
FIG. 22 is a schematic diagram of circuitry of a still further embodiment of the invention.

FIG. 22 schematically depicts still another system contemplated by the invention. In FIG. 22 all elements which are functionally like or similar to those of FIG. 20 are identified with like reference numbers. In comparing FIGS. 20 and 22, it can be seen that, in the main, the difference therebetween resides in relation to certain of the elements generally associated with field-effect transistor 1288. More particularly, the conductor 1338, resistor 1342, diode 1340, resistor 1350, resistor 1348 and capacitor 1352 of FIG. 20 are not employed in association with field-effect transistor 1288 of FIG. 22 where the gate 1298 is directly connected to conductors 1304, 1304a, 1304b and 1304c as via conductor means 1354.

As should be remembered, whenever any or all of conductors 1304, 1304a, 1304b or 1304c provide a "low" signal, as at 1330, 1332, 1334 or 1336, such indicates that the corresponding or related radar transceiver means has sensed or detected a person in the corresponding defined danger zone or zones. When a person is thusly detected, the horn means 1170 and 1172 of bus 10 are energized in a pulsed manner.

The operation of field-effect transistor 1238 and oscillator 1272 of FIG. 22 is as described with regard to their counterparts in FIG. 20. As described with regard to FIG. 20, when pin "3" is "high" switch member 1166 is closed (via 1164) thereby energizing horn means 1170, 1172 and when pin "3" is "low" the drain terminal 1240 is "high" thereby causing switch member 1166 to be open and horn means 1170, 1172 to be de-energized. When reset pin "4" is "low" the oscillator 1272 will oscillate and when pin "4" is "high" oscillator 1272 will not oscillate.

As previously described with regard to FIG. 20, so too with regard to FIG. 21, when no person is detected in any of the defined or established danger zones, all of conductor means 1304, 1304a, 1304b and 1304c will be "high" and such "high" will be conducted via conductors 1314 and 1354 to gate 1298 causing the field-effect transistor 1288 to be turned "on" bringing pin "4" of oscillator 1272 to ground via 1284 and 1290. Pin "4" thusly being made "low" prevents oscillator 1272 from oscillating.

Still referring to FIG. 22, when any or all of conductors 1304, 1304a, 1304b or 1304c are "low" such "low" is transmitted via 1354 to the gate 1298 of field-effect transistor 1288 keeping 1286 out of conduction. As a consequence pin "4" of oscillator becomes "high", via conductor means 1284, resistor 1294 and +8.0 v. source or terminal 1292, and prevents oscillator 1272 from oscillating.

Figure 23:
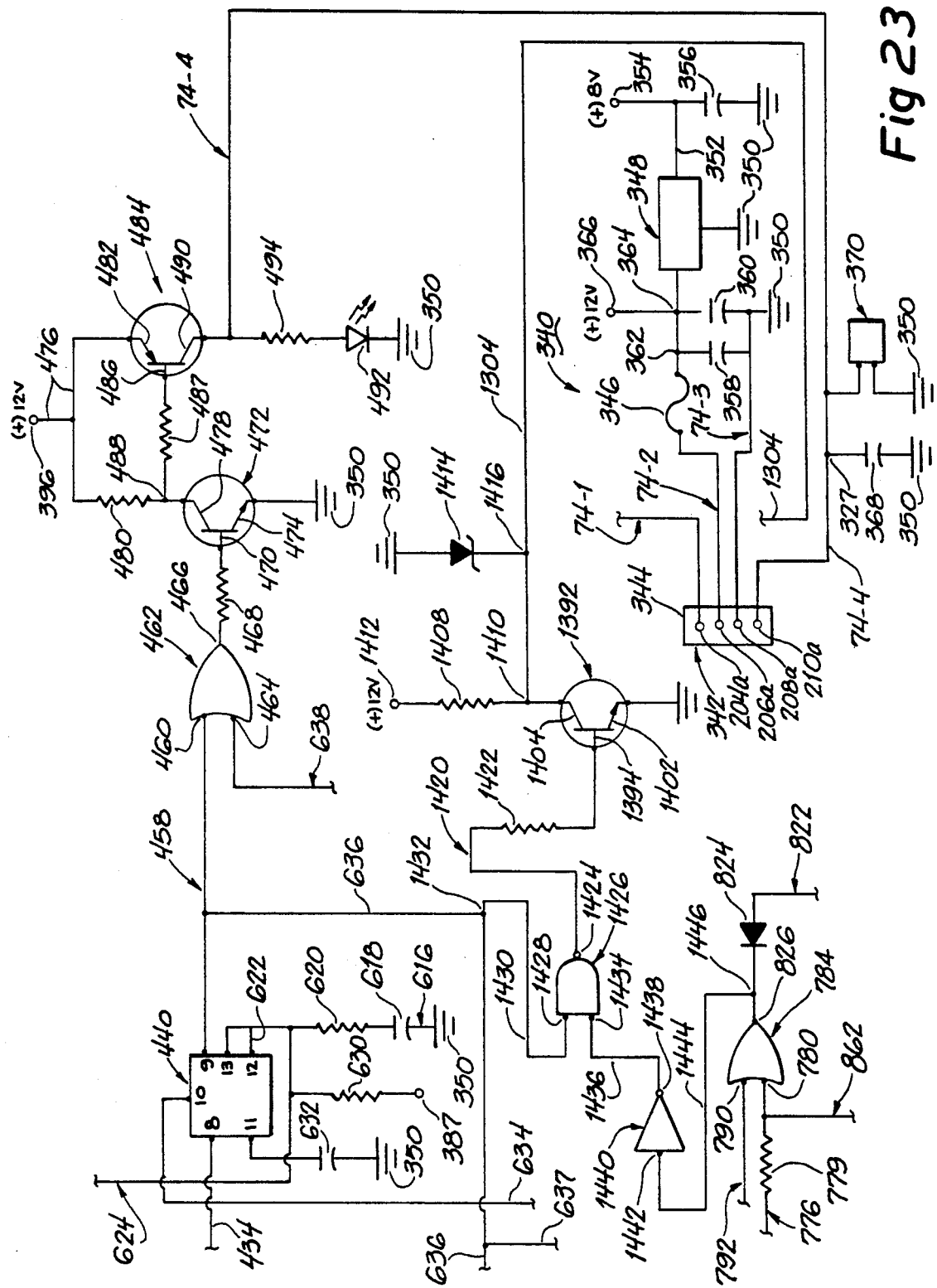
FIG. 23 is a schematic diagram of circuitry employable in combination with the circuitry of FIG. 22.

FIG. 23 is a schematic wiring diagram illustrating portions of the wiring diagrams of FIGS. 5-A, 5-B, and 5-C along with additional circuitry employable as in combination with that of FIG. 22. In FIG. 22, the elements thereof which correspond to portions of FIGS. 5-A, 5-B, or 5-C or to FIG. 21 are identified with like reference numbers and the operations and relationships thereof are as already herein described.

Referring in greater detail to FIG. 23, the base 1394 of NPN transistor 1392 is electrically connected via conductor means 1420, comprising resistor means 1422, to the output 1424 of an AND gate 1426. One of the input terminals 1428 of AND gate 1426 is electrically connected, as via conductor means 1430, to conductor 636 as at point 1432. The other input terminal 1434 of AND gate 1426 is electrically connected, as via conductor means 1436, to the output terminal 1438 of an inverter 1440. The input terminal 1442 of inverter 1440 is electrically connected, as via conductor means 1444, to the output of OR gate 784 as at a point 1446 shown generally between output 826 and diode 824.

As already herein described, especially with regard to FIG. 5-C, the output at 826 of OR gate 784 is "high" during the hereinbefore defined "Scan Time" and the "Shutting-Down-Phase" as also previously defined. The output of inverter 1440 is "high" if the entire system is not in either the "Scan Time" mode or the "Shutting-Down-Phase". if in "9" is "high" thereby indicating the detection of a person in the associated danger zone, and the output of inverter 1440 is "high" thereby indicating that the system is not in either "Scan Time" mode or the "Shutting-Down-Mode", then the output of AND gate 1426 will be "high". Such "high" output applied to the base 1394 of transistor 1392 causes transistor 1392 to become conductive thereby causing conductor means 1304 to be brought to "low" or ground. Referring to FIG. 22, the "low" of conductor 1304 is applied as to conductor 1314 and, via conductor 1354 terminating conduction through field-effect transistor 1288 and thereby causing pin "4" of oscillator 1272 to become "high" via conductor 1284, resistor 1294 and +8.0 volt source 1292. As previously described, when pin "4" becomes "high" the oscillator 1272 will be permitted to oscillate and cyclically energize the horns 1170 and 1172. However, as should now become apparent, when a person is not detected within the associated defined danger zone, the output of pin "9" is "low" while the output of gate 1440 is "high" (indicating the system as not being in either the "Initial Phase", the "Silent Phase" or the "Shutting-Down-Phase"), the output at gate 1426 will be "low" and transistor 1392 (FIG. 23) will not be driven into conduction thereby having conductor 1304 become "high" via point 1440, resistor 1408 and +12.0 volt source 1412. The "high" of conductor 1304, applied to conductor 1314, is applied via conductor means 1354 to gate 1298 thereby completing communication between terminals 1286 and 1290 to ground and thereby causing pin "4" of oscillator 1272 to become "low" and preventing the oscillator 1272 from oscillating and preventing the cyclic energization of horns 1170 and 1172.

In view of the foregoing it can be seen that the modification of the invention as depicted by FIGS. 22 and 23 prevents cyclic energization of horns 1170 and 1172 when the conditions are such that the entire system is in either said "Initial Phase", said "Silent Phase" or said "Shutting-Down-Phase" and no person is detected within the related or associated danger zone.

It should now also be apparent that the circuitry of FIG. 23 is repeated for each of the radar assemblies employed. The circuitry of FIG. 23, with conductor means 1304, relates to the forward radar assembly 58, as generally depicted in FIGS. 1, 2 and 3.

Conductors 1304a, 1304b and 1304c (FIG. 22) would each be functionally equivalent to conductor 1304 but respectively comprising circuits as shown in FIG. 23 (as well as FIGS. 5-A, 5-B and 5-C) associated with the other radar-sensor assemblies. For example: conductor means 1304a may be part of the circuitry of or for radar-sensor (detector) assembly 56; conductor means 1304b may be part of the circuitry of or for radar-sensor (detector) assembly 60 and conductor means 1304c may be part of the circuitry of or for radar-sensor (detector) assembly 62.

In the preferred embodiment of the circuitry of FIG. 22, a capacitor 1352 is provided as between conductor 1354 and ground to assure the bypassing of any electrical noise induced in or on any of conductors 1304, 1304a, 1304b or 1304c.

Also, in both of the embodiments of FIGS. 20 and 22, diodes 1376 and 1382 are provided to short the inductive kick from the "turn off" of the relay coils.

Figure 24:
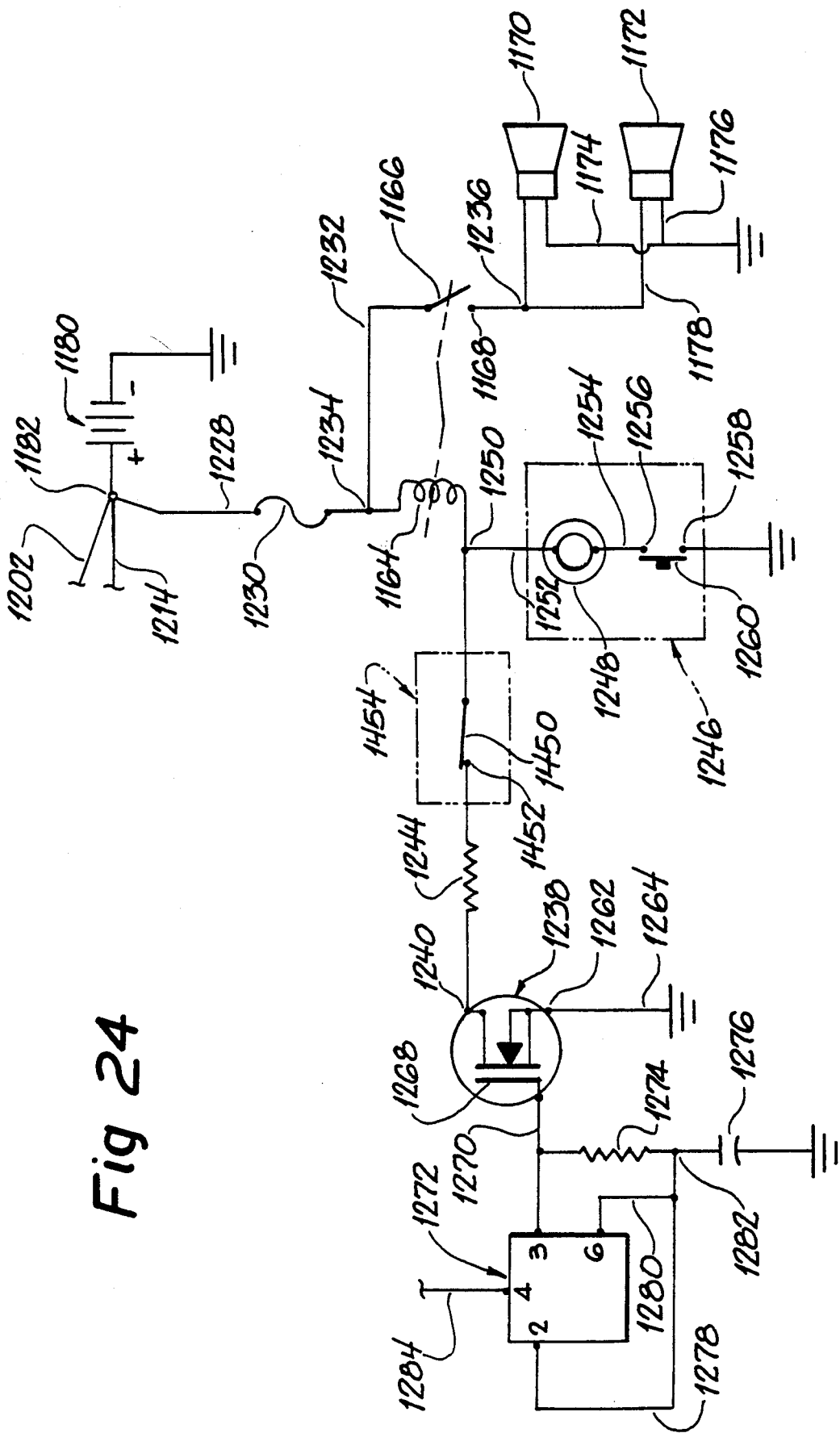
FIG. 24 is a schematic diagram of a portion of the circuitry of FIG. 20 or 22 illustrating a contemplated modification thereof.

FIG. 24 illustrates a modification of the circuitry of either FIG. 20 or FIG. 22 and only so much of the circuitry of either FIGS. 20 or 22 is shown, in FIG. 24, as is necessary to completely disclose such modification. All elements in FIG. 24 which are functionally like or similar to those of either FIGS. 20 or 22 are identified with like reference numbers.

The modification of FIG. 24 contemplates the provision of switch means whereby the cyclic energization of the horn means 1170 and 1172, as previously described, may be prevented. FIG. 24 illustrates such switch means as comprising a normally closed manually openable switch member 1450 and cooperating contact 1452 placed in series in conductor means 1228 and positioned as between point 1250 and resistor 1244. It has already been described how, when oscillator 1272 is made to oscillate, horn means 1170 and 1172 are cyclically energized and de-energized. In the embodiment depicted in FIG. 24, when switch member 1450 is opened, as by the driver of vehicle 10, the circuit from point 1250 to the field-effect transistor 1238 is also opened. Therefore, regardless of whether transistor 1238 is made to oscillate, the opened switch member 1450 prevents current flow through relay coil 1164 with the result that normally open switch member 1166 prevents energization of horn means 1170 and 1172.

Having switch member 1450 does not prevent the manual actuation or energization of horn means 1170 and 1172. That is, the normally open horn switch 1260 can be momentarily closed against contacts 1256 and 1258 thereby resulting in current flow through relay coil 1164, closure of normally open switch means 1166 and energization of horn means 1170 and 1172.

The defeat switch means 1450, 1452 is provided, in the modification of FIG. 24, so that the switch member 1450 may, at times, be opened by the driver of vehicle 10 as in those situations wherein the bus 10 has a route through a city or in close proximity to a hospital or the like where the use of vehicular horns is prohibited or severely restricted. In those situations the bus driver may defeat the otherwise cyclic energization of horn means 1170 and 1172. Other defeat means and other placement thereof is, of course, possible.

In the preferred embodiment of the modification of FIG. 24, the defeat or switch means 1450, 1452 is situated within locked enclosure means 1454 so that the defeat means or normally closed switch member 1450 may not be accessed by the bus driver. Such enclosure means 1454 would be opened or removed only as by a non-driver supervisor as to thereby provide access to switch means 1450, 1452 for only such bus or buses as will, that day or that trip, have a route through such noise abatement areas. Instead of a locked enclosure as depicted at 1454, the defeat switch means 1450, 1452 may itself be suitably locked against the opening thereof.

It should be made clear that in each and every instance within this application and claims wherein reference is made to an to object" being detected within any of said "Danger Zones" that such "object", in fact, is an animate object and more particularly a person providing the preselected density or mass required to bring about the desired radio signal bounce back and Doppler shift.

Although only preferred embodiments and one modification of the invention have been disclosed and described, it is apparent that other embodiments and modifications are possible within the scope of the appended claims.

What is claimed is:

1. A safety system for use in combination with a motor vehicle which transports personnel and which has periods of time during which said vehicle is stopped and undergoes loading or unloading of personnel, said safety system comprising first means for sensing the presence of a person within an area at least in close proximity to said vehicle and externally thereof, wherein said area is considered as a danger zone whereby any person within said danger zone is at risk of being injured by said vehicle if said vehicle should start into motion from its stopped condition, second means for creating a first sensory warning signal whenever said first means senses the presence of a person within said danger zone, wherein said first sensory warning signal is created within said vehicle as to thereby make the driver of said vehicle aware of a person being detected in said danger zone, third means for creating a second sensory warning signal whenever said first means senses the presence of a person within said danger zone, wherein said second warning signal is created generally externally of said vehicle as to thereby make the person within said danger zone aware that said person's presence within said danger zone has been detected and that said person is in said danger zone, wherein said second means continues creating said first sensory warning signal and said third means continues creating said second sensory warning signal at least for as long as said person is detected by said first means as being in said danger zone, and further comprising traffic horn means carried by said motor vehicle for manual actuation by said driver as during operation of said motor vehicle during normal traffic operation as to thereby create a horn warning sound to drivers of other vehicles in such traffic, and additional means responsive to said motor vehicle being stopped and undergoing loading or unloading of personnel and effective for automatically causing cyclic energization and de-energization of said vehicular traffic horn means when a person is detected as being within said danger zone.

2. A safety system according to claim 1 wherein said first means comprises radar generator and receiver means, wherein said radar generator means produces radar waves, and wherein said danger zone in size corresponds substantially to the distance that said radar waves are effective to be returned and sensed by said receiver means.

3. A safety system according to claim 1 wherein said first sensory warning signal comprises an auditory signal.

4. A safety system according to claim 1 wherein said second sensory warning signal comprises an auditory signal.

5. A safety system according to claim 1 wherein said first sensory warning signal comprises a first auditory signal, and wherein said second sensory warning signal comprises a second auditory signal.

6. A safety system according to claim 1 wherein said first sensory warning signal comprises a first auditory signal, wherein said second sensory warning signal comprises a second auditory signal, and wherein said third means comprises piezoelectric horn means.

7. A safety system according to claim 1 wherein said first sensory warning signal comprises a first auditory signal, wherein said second sensory warning signal comprises a second auditory signal, wherein said second means comprises an electrically driven horn-like assembly, and wherein said third means comprises piezoelectric horn means.

8. A safety system according to claim 1 wherein said first means comprises radar generator and receiver means, wherein said radar generator means produces radar waves, wherein said danger zone in size corresponds substantially to the distance that said radar waves are effective to be returned and sensed by said receiver means, and wherein said first sensory warning signal comprises an auditory signal.

9. A safety system according to claim 1 wherein said first means comprises radar generator and receiver means, wherein said radar generator means produces radar waves, wherein said danger zone in size corresponds substantially to the distance that said radar waves are effective to be returned and sensed by said receiver means, wherein said first sensory warning signal comprises an auditory signal, and wherein said second sensory warning signal comprises an auditory signal.

10. A safety system according to claim 1 wherein said first means comprises radar generator and receiver means, wherein said radar generator means produces radar waves, wherein said danger zone in size corresponds substantially to the distance that said radar waves are effective to be returned and sensed by said receiver means, wherein said first sensory warning signal comprises a first auditory signal, wherein said second sensory warning signal comprises a second auditory signal, and wherein said third means comprises piezoelectric horn means.

11. A safety system according to claim 1 wherein said first means comprises radar generator and receiver means, wherein said radar generator means produces radar waves, wherein said danger zone in size corresponds substantially to the distance that said radar waves are effective to be returned and sensed by said receiver means, wherein said first sensory warning signal comprises a first auditory signal, wherein said second sensory warning signal comprises a second auditory signal, wherein said second means comprises an electrically driven horn-like assembly, and wherein said third means comprises piezoelectric horn means.

12. A safety system according to claim 1 and further comprising fourth means for creating a third sensory warning signal whenever said first means senses the presence of a person within said danger zone, wherein said third sensory warning signal is created generally internally of said vehicle, wherein said first and second sensory warning signals are auditory, and wherein said third sensory warning signal is visual.

13. A safety system according to claim 12 and further comprising lamp means situated generally within said vehicle, and wherein light emitted by said lamp means comprises said third sensory warning signal.

14. A safety system according to claim 13 wherein said lamp means comprises a light emitting diode, and wherein said light emitting diode remains in an energized state for so long as said first means detects the presence of a person within said danger zone.

15. A safety system according to claim 14 wherein said light emitting diode is cyclically energized and de-energized after said first means ceases to detect any person within said danger zone.

16. A safety system according to claim 15 wherein said second means for creating a first sensory warning signal and wherein said third means for creating a second sensory warning signal remain in an energized state for so long as said first means detects the presence of a person within said danger zone.

17. A safety system according to claim 16 wherein said second means and said third means are cyclically energized and de-energized after said first means ceases to detect any person within said danger zone.

18. A safety system according to claim 17 and further comprising a first plurality of warning-type lamp assemblies carried by said vehicle generally externally thereof and at a rearward portion of said vehicle and positioned as to when energized emit a warning light generally rearwardly of said vehicle, a second plurality of warning-type lamp assemblies carried by said vehicle generally externally thereof and at a forward portion of said vehicle and positioned as to when energized emit a warning light generally forwardly of said vehicle, wherein said first plurality of warning-type lamp assemblies and said second plurality of warning-type lamp assemblies are energized generally simultaneously when said vehicle is stopped, and wherein said first means said second means and said third means can become operative only upon energization of said first and second pluralities of warning-type lamp assemblies.

19. A safety system according to claim 18 and further comprising a flasher controller assembly, wherein when said first plurality of warning-type lamp assemblies and said second plurality of warning-type lamp assemblies are energized the energization thereof is through said flasher controller assembly which causes said first and second pluralities of warning-type lamp assemblies to be cyclically energized and de-energized in the time that said vehicle is stopped.

20. A safety system according to claim 18 and further comprising headlamp assemblies carried by said vehicle generally externally of said vehicle and at a forward portion of said vehicle, and control circuit means operatively connected to said headlamp assemblies to thereby cyclically energize said headlamp assemblies in the time that said vehicle is stopped.

21. A safety system according to claim 20 wherein said control circuit means is responsive to a first cyclic electrical signal received from said first and second pluralities of warning-type lamp assemblies that such first and second pluralities of warning-type lamp assemblies are being cyclically energized, wherein said control circuit means is responsive to a second continuous electrical signal received from said flasher controller assembly, and whereupon receiving said first cyclic electrical signal and said second continuous electrical signal said control circuit means becomes effective to cyclically energize said headlamp assemblies in a manner whereby the high beam component of the headlamp assemblies is energized and then the low beam component of the headlamp assemblies is energized with such alternate energization of the high beam and low beam components continuing for at least as long as said first and second pluralities of warning-type lamp assemblies are energized.

22. A safety system according to claim 18 and further comprising headlamp assemblies carried by said vehicle generally externally of said vehicle and at a forward portion of said vehicle and positioned as to emit light when energized generally forwardly of said vehicle, stop-lamp assemblies carried by said vehicle generally externally of said vehicle and at a rearward portion of said vehicle and positioned as to emit a warning light when energized generally rearwardly of said vehicle, and control circuit means operatively connected to said headlamp assemblies and to said stop-lamp assemblies to thereby cyclically energize said headlamp assemblies and said stop-lamp assemblies during the time that said vehicle is stopped.

23. A safety system according to claim 1 and further comprising defeat means selectively made operable to prevent the cyclic energization and de-energization of said vehicular traffic horn means.

24. A safety system according to claim 1 wherein in the absence of any person being sensed as present within any of said danger zones, said vehicular traffic horn means ceases to be energized.

25. A safety system according to claim 1 wherein cyclic energization and de-energization of said vehicular traffic horn means does not occur during said "Initial Phase" of said "Scan Time" or during said "Shutting-Down-Phase" of said safety system.

26. A safety system for use in combination with a motor vehicle which transports personnel and which has periods of time during which said vehicle is stopped and undergoes loading or unloading of personnel, said safety system comprising first means for sensing the presence of a person within an area at least in close proximity to said vehicle and externally thereof, wherein said area is considered as a danger zone in that any person within said danger zone is at risk of being injured by said vehicle if said vehicle should start into motion from its stopped condition, second means for creating a first sensory warning signal whenever said first means senses the presence of a person within said danger zone, third means for creating a second sensory warning signal whenever said first means senses the presence of a person within said danger zone, wherein at least one of said first and second sensory warning signals is created within said vehicle as to thereby make the driver of said vehicle aware of a person being detected in said danger zone, wherein said second means continues creating said first sensory warning signal and said third means continues creating said second sensory warning signal at least for as long as said person is detected by said first means as being in said danger zone, and further comprising traffic horn means carried by said motor vehicle for manual actuation by said driver as during operation of said motor vehicle during normal traffic operation as to thereby create a horn warning sound to drivers of other vehicles in such traffic, and additional means responsive to said motor vehicle being stopped and undergoing loading and unloading of personnel and effective for automatically causing cyclic energization and de-energization of said vehicular traffic horn means when a person is detected as being within said danger zone.

27. A safety system according to claim 26 wherein said second means and said third means respectively continue to create said first and second sensory warning signals for a preselected span of time next following the cessation of sensing the presence of a person within said danger zone.

28. A safety system according to claim 26 and further comprising a first plurality of warning-type lamp assemblies carried by said vehicle at a rearward portion of said vehicle and positioned as to when energized emit a warning light generally rearwardly of said vehicle, a second plurality of warning-type lamp assemblies carried by said vehicle at a forward portion of said vehicle and positioned as to when energized emit a warning light generally forwardly of said vehicle, wherein said first plurality of warning-type lamp assemblies and said second plurality of warning-type lamp assemblies are energized when said vehicle is stopped, and wherein said first and second means are operative when said first and second pluralities of warning-type lamp assemblies are energized.

29. A safety system according to claim 28 and further comprising a flasher controller assembly, wherein when said first plurality of warning-type lamp assemblies and said second plurality of warning-type lamp assemblies are energized the energization thereof is through said flasher controller assembly which causes said first and second pluralities of warning-type lamp assemblies to be cyclically energized and de-energized in the time that said vehicle is stopped.

30. A safety system according to claim 28 and further comprising headlamp assemblies carried by said vehicle at a forward portion of said vehicle, and control circuit means operatively connected to said headlamp assemblies to thereby cyclically energize said headlamp assemblies when said vehicle is stopped for loading or unloading personnel.

31. A safety system according to claim 28 and further comprising headlamp assemblies carried by said vehicle at a forward portion of said vehicle and positioned as to emit when energized light generally forwardly of said vehicle, stop-lamp assemblies carried by said vehicle and at a rearward portion of said vehicle and positioned as to emit a warning light when energized generally rearwardly of said vehicle, and control circuit means operatively connected to said headlamp assemblies and to said stop-lamp assemblies to thereby cyclically energize said headlamp assemblies and said stop-lamp assemblies in the time that said vehicle is stopped.

32. A safety system according to claim 26 and further comprising electrical circuit means operatively connected to said first means, and wherein said electrical circuit means comprises diagnostic means for determining if a functional failure has occurred in said electrical circuit means and for determining if a functional failure has occurred in said first means.

33. A safety system according to claim 32 and further comprising indicator means for indicating that said functional failure in either said first means or said electrical circuit means has occurred.

34. A school bus for the transport of school age children, said bus comprising a bus body structure, said bus body structure comprising left side and right side exterior body panel means, said body structure further comprising front exterior body panel means operatively connected to both said left and right side exterior body panel means, said body structure further comprising rear exterior body panel means operatively connected to both said left and right side exterior body panel means, a bus interior defined generally by and between said left and right side exterior body panel means and between said front and rear exterior body panel means, a door opening formed in at least one of said side exterior body panel means for access to said bus interior as well as egress from said bus interior, a bus door effective for opening and closing said door opening, a bus driver's area within said bus interior and provided with driver controlled bus steering means and with an array of operating controls, a first plurality of warning-type lamp assemblies carried by said bus body structure at a rearward portion of said bus body structure and positioned as to when energized emit a warning light generally rearwardly of said bus body structure, a second plurality of warning-type lamp assemblies carried by said bus body structure at a forward portion of said bus body structure and positioned as to when energized emit a warning light generally forwardly of said bus body structure, a flasher controller situated generally in said bus driver's area and operatively connected to said first plurality of warning-type lamp assemblies and to said second plurality of warning-type lamp assemblies, said flasher controller being effective when actuated to energize said first plurality of warning-type lamp assemblies and to energize said second plurality of warning-type lamp assemblies, electrical switch means effective to be electrically closed when said bus is stopped to permit loading or unloading of said children, said electrical switch means when electrically closed being effective to actuate said flasher controller and cause energization of said first and second pluralities of warning-type lamp assemblies, wherein said energization of said first and second pluralities of warning-type lamp assemblies is cyclic thereby causing said first and second pluralities of warning-type lamp assemblies to operate in a flashing mode and emit a flashing light, a plurality of sensor assemblies carried by said bus, a first of said plurality of sensor assemblies being carried generally beneath said bus body structure and near a forward portion thereof and situated as to be operationally forwardly directed, a second of said plurality of sensor assemblies being operatively carried by said bus body structure and situated as to be operationally rearwardly directed, a third of said plurality of sensor assemblies being operatively carried by said bus body structure generally inwardly of said left side exterior body panel means and situated as to be operationally directed leftward of said bus body structure, a fourth of said plurality of sensor assemblies being operatively carried by said bus body structure generally inwardly of said right side exterior body panel means and situated as to be operationally directed rightward of said bus body structure, wherein each of said first second third and fourth sensor assemblies comprises a housing, wherein said housing comprises printed circuit means electrically connected to a K-band radar transceiver and carrying electrical components for both controlling the operation of said K-band transceiver and for responding to the operation of said K-band transceiver, adjustment means carried within said housing for selectively adjusting and establishing the field of radar radiation to which said transceiver will be responsive, read-out means situated in said driver's area, said read-out means comprising at least four energizable light sources, wherein a first of said at least four light sources is functionally related to and operationally coupled to said first sensor assembly, wherein a second of said at least four light sources is functionally related to and operatively coupled to said second sensor assembly, wherein a third of said at least four light sources is functionally related to and operatively coupled to said third sensor assembly, wherein said fourth of said at least four light sources is functionally related to and operatively coupled to said fourth sensor assembly, whereby when said flasher controller is actuated electrical power is supplied to each of said at least first second third and fourth sensor assemblies for energization thereof including all of said K-band radar transceivers, when energized the radar transceiver of said first sensor assembly being effective to monitor a first area generally forwardly of said bus body structure in order to detect the presence of any person in said first area, when energized the radar transceiver of said second sensor assembly being effective to monitor a second area generally rearwardly of said bus body structure in order to detect the presence of any person in said second area, when energized the radar transceiver of said third sensor assembly being effective to monitor a third area generally outwardly of said left side exterior body panel means in order to detect the presence of any person in said third area, when energized the radar transceiver of said fourth sensor assembly being effective to monitor a fourth area generally outwardly of said right side exterior body panel means in order to detect the presence of any person in said fourth area, upon detecting a person in said first area the radar transceiver of said first sensor assembly causing said first of said at least four light sources to be electrically energized thereby producing a first output light, upon detecting a person in said second area the radar transceiver of said second sensor assembly causing said second of said at least four light sources to be electrically energized thereby producing a second output light, upon detecting a person in said third area the radar transceiver of said third sensor assembly causing said third of said at least four light sources to be electrically energized thereby producing a third output light, upon detecting a person in said fourth area the radar transceiver of said fourth sensor assembly causing said fourth of said at least four light sources to be electrically energized thereby producing a fourth output light, said first output light serving to indicate to said driver that a person has been detected in said first area, Said second output light serving to indicate to said driver that a person has been detected in said second area, said third output light serving to indicate to said driver that a person has been detected in said third area, said fourth output light serving to indicate to said driver that a person has been detected in said fourth area, and further comprising bus carried traffic horn means for manual actuation by said driver as during operation of said bus during normal traffic operation as to thereby create a horn warning sound to drivers of other vehicles in such traffic, and additional means responsive to said bus being stopped and undergoing loading or unloading of personnel and effective for automatically causing cyclic energization and de-energization of said bus carried traffic horn means when a person is detected in any of said first second third or fourth areas.

35. A school bus according to claim 34 wherein said read-out means also comprises electrically energizable auditory signal generating means, said electrically energizable auditory signal means being energized to produce an auditory output signal for warning said driver that a person has been detected in any of said first second third or fourth areas.

36. A school bus according to claim 35 wherein said electrically energizable auditory signal generating means comprises a single generator of auditory sound, and wherein said single generator of auditory sound is energized whenever the radar transceiver of any of said first second third or fourth sensor assemblies detects a person in either the first second third or fourth areas.

37. A school bus according to claim 34 wherein said first output light is continuous and non-segmented and continues for at least as long as said radar transceiver of said first sensor assembly continues to detect a person in said first area.

38. A school bus according to claim 34 wherein said second output light is continuous and non-segmented and continues for at least as long as said radar transceiver of said second sensor assembly continues to detect a person in said second area.

39. A school bus according to claim 34 wherein said third output light is continuous and non-segmented and continues for at least as long as said radar transceiver of said third sensor assembly continues to detect a person in said third area.

40. A school bus according to claim 34 wherein said fourth output light is continuous and non-segmented and continues for at least as long as said radar transceiver of said fourth sensor assembly continues to detect a person in said fourth area.

41. A school bus according to claim 35 wherein said auditory output signal is continuous and non-segmented and continues for at least as long as said radar transceiver of said first sensor assembly continues to detect a person in said first area, and wherein said first output light is continuous and non-segmented and continues for at least as long as said radar transceiver of said first sensor assembly continues to detect a person in said first area.

42. A school bus according to claim 34 wherein each of said first second third and fourth light sources continue to be energized and respectively produce said first second third and fourth output lights for as long as the respective radar transceivers of said first second third and fourth sensor assemblies continue detecting a person in said respective first second third and fourth areas, and wherein said first second third and fourth light sources continue to be energized for a preselected span of time after said respective radar transceivers of said first second third and fourth sensor assemblies cease detecting a person in said respective first second third and fourth areas.

43. A school bus according to claim 34 wherein said electrical switch means is electrically closed in response to said door being opened.

44. A school bus according to claim 34 wherein said first second third and fourth sensor assemblies are electrically energized only upon said first and second pluralities of warning-type lamp assemblies being electrically energized.

45. A school bus according to claim 34 and further comprising a rear axle assembly for connection to ground engaging rear wheels of said bus, said rear axle assembly being situated in a rearward portion of said bus, wherein said bus body structure further comprises chassis means situated at an elevation generally below that of said bus interior and generally between said exterior body panel means as to be generally inwardly disposed relative thereto, and wherein said second of said plurality of sensor assemblies is operatively carried by said chassis as to be generally rearward of said rear axle assembly and operationally directed rearwardly of said rear axle assembly.

46. A school bus according to claim 34 wherein said bus body structure further comprises chassis means situated at an elevation generally below that of said bus interior and generally between said exterior body panel means as to be generally inwardly disposed relative thereto, and wherein said third of said plurality of sensor assemblies is operatively carried by said chassis generally inwardly of said left side exterior body panel means.

47. A school bus according to claim 34 wherein said bus body structure further comprises chassis means situated at an elevation generally below that of said bus interior and generally between said exterior body panel means as to be generally inwardly disposed relative thereto, and wherein said fourth of said plurality of sensor assemblies is operatively carried by said chassis generally inwardly of said right side body panel means.

48. A school bus according to claim 34 and further comprising a front axle assembly for connection to ground engaging front wheels of said bus, said front axle assembly being situated in a forward portion of said bus, and wherein said first of said plurality of sensor assemblies is operatively carried by said front axle assembly.

49. A school bus according to claim 34 wherein said read-out means further comprises a design carried thereby which visually represents the outer configuration of said bus, and wherein said first second third and fourth light sources are physically located with respect to said design as to thereby provide a sense of orientation to said driver whenever any of said light sources are electrically energized.

50. A school bus according to claim 34 and further comprising microwave absorber material placed in proximity to at least one of said radar transceivers of said first second third and fourth sensor assemblies to prevent spurious bounce-back of radar waves to said at least one of said radar transceivers.

51. A school bus according to claim 34 and further comprising microwave absorber material situated within at least one of said housings, and wherein said microwave absorber material is in proximity to the radar transceiver carried by said one housing.

52. A school bus according to claim 34 and further comprising microwave absorber material situated within at least one of said housings containing a radar transceiver, wherein said microwave absorber material is in proximity to said radar transceiver and formed as to have an arcuate configuration at least in part circumscribing said radar transceiver.

53. A school bus according to claim 34 and further comprising first additional electrically energizable auditory signal generating means, second additional electrically energizable auditory signal generating means, third additional electrically energizable auditory signal generating means, fourth additional electrically energizable auditory signal generating means, wherein said first additional electrically energizable auditory signal generating means is operatively connected to said first sensor assembly as to become energized and produce an auditory signal outside of said bus and generally toward said first area whenever said radar transceiver of said first sensor assembly detects the presence of any person in said first area, wherein said second additional electrically energizable auditory signal generating means is operatively connected to said second sensor assembly as to become energized and produce an auditory signal outside of said bus and generally toward said second area whenever said radar transceiver of said second sensor assembly detects the presence of any person in said second area, wherein said third additional electrically energizable auditory signal generating means is operatively connected to said third sensor assembly as to become energized and produce an auditory signal outside of said bus and generally toward said third area whenever said radar transceiver of said third sensor assembly detects the presence of any person in said third area, and wherein said fourth additional electrically energizable auditory signal generating means is operatively connected to said fourth sensor assembly as to become energized and produce an auditory signal outside of said bus and generally toward said fourth area whenever said radar transceiver of said fourth sensor assembly detects the presence of any person in said fourth area.

54. A school bus according to claim 34 wherein said electrical power is supplied by means of a power supply circuit comprising step-up switching regulator means for assuring that said electrical power being supplied does not decrease below a preselected magnitude of voltage.

55. A school bus according to claim 34 and further comprising headlamp assemblies carried by said bus at a generally forward portion of said bus, and control circuit means operatively connected to said headlamp assemblies to thereby cyclically energize said headlamp assemblies in that time that said bus is stopped.

56. A school bus according to claim 55 wherein said control circuit means is responsive to a first cyclic electrical signal received from said first and second pluralities of warning-type lamp assemblies indicative that such first and second pluralities of warning-type lamp assemblies are being cyclically energized, wherein said control circuit means is responsive to a second continuous electrical signal received from said flasher controller, and whereupon receiving said first cyclic electrical signal and said second continuous electrical signal said control circuit means becomes effective to cyclically energize said headlamp assemblies in a manner whereby the high beam component of the headlamp assemblies is energized and then de-energized with such alternate or cyclic energization and de-energization of said high beam component continuing for at least as long as said first and second pluralities of warning-type lamp assemblies are energized.

57. A school bus according to claim 55 wherein said control circuit means is responsive to a first cyclic electrical signal received from said first and second pluralities of warning-type lamp assemblies indicative that such first and second pluralities of warning-type lamp assemblies are being cyclically energized, wherein said control circuit means is responsive to a second continuous electrical signal received from said flasher controller, and whereupon receiving said first cyclic electrical signal and said second continuous electrical signal said control circuit means becomes effective to cyclically energize said headlamp assemblies in a manner whereby the high beam component of the headlamp assemblies is energized and then the low beam component of the headlamp assemblies is energized with such alternate energization of the high beam and low beam components continuing for at least as long as said first and second pluralities of warning-type lamp assemblies are energized.

58. A school bus according to claim 34 and further comprising headlamp assemblies carried by said bus generally at a forward portion of said bus and positioned as to emit light when energized generally forwardly of said bus, stop-lamp assemblies carried by said bus generally at a rearward portion of said bus and positioned as to emit a warning light when energized generally rearwardly of said bus, and control circuit means operatively connected to said headlamp assemblies and to said stop-lamp assemblies to thereby cyclically energize said headlamp assemblies and said stop-lamp assemblies during the time that said bus is stopped for loading or unloading.

59. A school bus according to claim 42 wherein each of said radar transceivers of said first second third and fourth sensor assemblies continues to act as if a person is detected in the respective areas for a preselected span of time after ceasing the detection of a person in the respective areas, and wherein if a person again enters any of said respective areas within said span of time the related sensor assembly and its radar transceiver continue operation as if no absence of a person had occurred.

60. A school bus according to claim 42 wherein each of said radar transceivers of said first second third and fourth sensor assemblies continues to act as if a person is still detected in the respective areas for a preselected span of time after ceasing the actual detection of a person in the respective areas, and wherein if a person does not again enter any of said respective areas within said span of time, the four energizable light sources are cyclically electrically pulsed "on" and "off" for a preselected length of time.

61. A school bus according to claim 60 wherein if within said preselected length of time no person enters any of said areas, the four energizable light sources stop being cyclically pulsed "on" and "off" and merely go into an "off" mode while all of said radar transceivers are in a mode to sense the presence of a person in said areas if a person should then enter any of said areas.

62. A safety system according to claim 34 and further comprising diagnostic testing means for automatically testing said plurality of sensor assemblies and producing an output signal to said driver that said sensor assemblies are functionally operative.

63. A school bus according to claim 34 and further comprising defeat means selectively made operable to prevent the cyclic energization and de-energization of said bus traffic horn means.

64. A school bus according to claim 34 wherein in the absence of any person being sensed as being present in any of said first second third and fourth areas, said bus traffic horn means ceases to be energized.

* * * * *

UNITED STATES PATENT AND TRADEMARK OFFICE
CERTIFICATE OF CORRECTION

PATENT NO. : 5,281,949
DATED : January 25, 1994
INVENTOR(S) : Durley, C.W. & Robson, J.A.

It is certified that error appears in the above-identified patent and that said Letters Patent is hereby corrected as shown below:

Column 5, line 8, change "irrespectively" to ---- respectively ----.

Column 6, line 53, change "269" to ---- 26, ----.

Column 7, line 35, change "1349" to ---- 134, ----.

Column 7, line 63, change "174)" to ---- 174, ----.

Column 7, line 68, change "1902" to ---- 190, ----.

Column 8, line 1, change "1983" to ---- 198, ----.

Column 8, line 33, change "246)" to ---- 246, ----.

Column 8, line 34, change "2547" to ---- 254, ----.

Column 8, line 37, change "2307" to ---- 230, ----.

Column 8, line 54, delete the solitary quotation mark before ---- electrical ----.

UNITED STATES PATENT AND TRADEMARK OFFICE
CERTIFICATE OF CORRECTION

PATENT NO. : 5,281,949

DATED : January 25, 1994

INVENTOR(S) : Durley, C.W. & Robson, J.A.

It is certified that error appears in the above-identified patent and that said Letters Patent is hereby corrected as shown below:

Column 10, line 63, change "74)" to ---- 74, ----.

Column 16, line 62, between "positive" and "12" insert ---- (+) ----.

Column 18, line 68, change "549" to ---- 254, ----.

Column 25, line 19, change "249" to ---- 24, ----.

Column 25, line 19, change "269" to ---- 26, ----.

Column 25, line 22, delete "11".

Column 25, line 22, change ---- low" ---- to ---- "low" ----.

Column 29, line 24, change "9323" to ---- 932, ----.

Column 34, line 46, change "247" to ---- 24, ----.

UNITED STATES PATENT AND TRADEMARK OFFICE
CERTIFICATE OF CORRECTION

PATENT NO. : 5,281,949  
DATED : January 25, 1994  
INVENTOR(S) : Durley, C.W. & Robson, J.A.

Page 3 of 5

It is certified that error appears in the above-identified patent and that said Letters Patent is hereby corrected as shown below:

Column 36, line 6, change ---- on ---- to ---- "on" ----.

Column 36, line 9, change "254)" to ---- 254, ----.

Column 37, line 21, change "time)" to ---- time, ----.

Column 37, line 24, change ---- "Danger Zone ---- to ---- "Danger Zone" ----.

Column 37, line 25, change ---- Warning Phase ---- to ---- "Warning Phase" ----.

Column 37, line 35, between "may" and "step" insert ---- momentarily step out of such "Danger Zone" and then quickly ----.

Column 39, line 15, change "58)" to ---- 58, ----.

Column 39, line 25, change "160" to ---- 60 ----.

UNITED STATES PATENT AND TRADEMARK OFFICE
CERTIFICATE OF CORRECTION

PATENT NO. : 5,281,949

DATED : January 25, 1994

INVENTOR(S) : Durley, C.W. & Robson, J.A.

It is certified that error appears in the above-identified patent and that said Letters Patent is hereby corrected as shown below:

Column 40, line 24, change ---- "upper beam ---- to ---- "upper beam" ----.

Column 42, line 60, change "13327" to ---- 1332, ----.

Column 43, line 28, change "827" to ---- 82, ----.

Column 43, line 28, change "847" to ---- 84, ----.

Column 43, line 28, change "862" to ---- 86, ----.

Column 44, line 50, change "1262)" to ---- 1262, ----.

Column 44, line 53, change ---- low" ---- to ---- "low" ----.

Column 45, line 21, between "seconds" and "1292" insert ---- at which time pin "4" of oscillator 1272, via voltage source ----.

UNITED STATES PATENT AND TRADEMARK OFFICE
CERTIFICATE OF CORRECTION

PATENT NO. : 5,281,949
DATED : January 25, 1994
INVENTOR(S) : Durley, C.W. & Robson, J.A.

It is certified that error appears in the above-identified patent and that said Letters Patent is hereby corrected as shown below:

Column 47, line 67, change "in" to ---- pin ----.

Column 49, line 54, change ---- object" ---- to ---- "object" ----.

Signed and Sealed this

Twentieth Day of September, 1994

Attest:

BRUCE LEHMAN

Attesting Officer     Commissioner of Patents and Trademarks